United States Patent
Mochizuki et al.

(10) Patent No.: US 12,471,111 B2
(45) Date of Patent: Nov. 11, 2025

(54) COMMUNICATION SYSTEM, BASE STATION AND COMMUNICATION TERMINAL

(71) Applicant: Mitsubishi Electric Corporation, Tokyo (JP)

(72) Inventors: Mitsuru Mochizuki, Tokyo (JP); Tadahiro Shimoda, Tokyo (JP); Noriyuki Fukui, Tokyo (JP); Masaaki Kusano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 18/542,885

(22) Filed: Dec. 18, 2023

(65) Prior Publication Data

US 2024/0121793 A1 Apr. 11, 2024

Related U.S. Application Data

(60) Continuation of application No. 17/649,974, filed on Feb. 4, 2022, now abandoned, which is a division of
(Continued)

(30) Foreign Application Priority Data

Dec. 22, 2016 (JP) ................................ 2016-249443

(51) Int. Cl.
*H04W 72/23* (2023.01)
*H04W 16/28* (2009.01)
(Continued)

(52) U.S. Cl.
CPC .......... *H04W 72/23* (2023.01); *H04W 16/28* (2013.01); *H04W 52/0209* (2013.01); *H04W 84/042* (2013.01)

(58) Field of Classification Search
CPC . H04W 72/23; H04W 16/28; H04W 52/0209; H04W 72/12; H04W 72/1289
See application file for complete search history.

(56) References Cited

U.S. PATENT DOCUMENTS 7,099,384 B1  8/2006  Jalali
2007/0224987 A1  9/2007  Ishii
(Continued)

FOREIGN PATENT DOCUMENTS

JP         2010-525725 A      7/2010
WO    WO 2006/030582 A1    3/2006
(Continued)

OTHER PUBLICATIONS

International Search Report issued Mar. 20, 2018 in PCT/JP2017/046054 filed on Dec. 22, 2017.
(Continued)

*Primary Examiner* — Sulaiman Nooristany
(74) *Attorney, Agent, or Firm* — PROCOPIO, CORY, HARGREAVES & SAVITCH LLP

(57) ABSTRACT

Provided is a communication system capable of suppressing increase in the power consumption of a communication terminal device, degradation in the communication quality, and reduction in the use efficiency of radio resources. A base station device (gNB) notifies a communication terminal device (UE) of information on the next reception timing. The UE receives, for example, a downlink control signal in a subframe. The UE obtains, from the downlink control signal, information on a piece of user data in the subframe, and the information on the next reception timing. The UE transmits and receives the piece of user data to and from the gNB. The information on the next reception timing indicates a subframe as the next reception timing of the UE. The UE receives a downlink control signal in the subframe.

5 Claims, 33 Drawing Sheets

Related U.S. Application Data application No. 16/340,228, filed as application No. PCT/JP2017/046054 on Dec. 22, 2017, now abandoned.

(51) Int. Cl.
  *H04W 52/02* (2009.01)
  *H04W 84/04* (2009.01)

(56) References Cited

U.S. PATENT DOCUMENTS

| | | | | |
|---|---|---|---|---|
| 2012/0026892 | A1* | 2/2012 | Nakao | H04L 1/1861 370/242 |
| 2014/0105164 | A1* | 4/2014 | Moulsley | H04W 72/21 370/329 |
| 2015/0244478 | A1 | 8/2015 | Shirakata et al. | |
| 2015/0365814 | A1 | 12/2015 | El Ayach et al. | |
| 2016/0234700 | A1 | 8/2016 | Wong et al. | |
| 2016/0234810 | A1 | 8/2016 | Wong et al. | |
| 2018/0092105 | A1* | 3/2018 | Lee | H04W 72/56 |
| 2018/0279294 | A1* | 9/2018 | Gao | H04L 5/0021 |

FOREIGN PATENT DOCUMENTS

| | | |
|---|---|---|
| WO | WO 2008/136616 A1 | 11/2008 |
| WO | 2016/144243 A1 | 9/2016 |

OTHER PUBLICATIONS

Nokia, Alcatel-Lucent Shanghai Bell, Verizon Wireless, "On the synchronization signal design principle in NR," 3GPP TSG-RAN WG1#86b, R1-1610287, Lisbon, Portugal, Oct. 14, 2016, Total 5 pages.
Technical Specification, "3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage" (Release 14), 3GPP TS 36.300 V14.0.0 (Sep. 2016), Total 314 pages.
Mustapha, M., "LS on HNB/HeNB Open Access Mode," 3GPP TSG-SA1 #42, S1-083461, Seoul, South Korea, Oct. 13-17, 2008, (Total 2 pages).
Technical Report, "3rd Generation Partnership Project; Technical Specification Group Radio Access Network; Evolved Universal Terrestrial Radio Access (E-UTRA); Further advancements for E-UTRA physical layer aspects", (Release 9), 3GPP TR 36.814 V9.0.0 (Mar. 2010), Total 315 pages.
Technical Report, "3rd Generation Partnership Project; Technical Specification Group Radio Access Network; Feasibility study for Further Advancements for E-UTRA (LTE-Advanced)", (Release 13), 3GPP TR 36.912 V13.0.0 (Dec. 2015), Total 62 pages.
"Scenarios, requirements and KPIs for 5G mobile and wireless system," Deliverable D1.1, Metis, Seventh Framework Programme, Document No. ICT-317669-METIS/D1.1. Apr. 29, 2013, Total 84 pages.
Technical Report, "3rd Generation Partnership Project; Technical Specification Group Services and System Aspects; Study on Architecture for Next Generation System", (Release 14), 3GPP TR 23.799 V1.1.0 (Oct. 2016), Total 501 pages.
Technical Report, "3rd Generation Partnership Project; Technical Specification Group Radio Access Network; Study on New Radio Access Technology; Radio Access Architecture and Interfaces", (Release 14), 3GPP TR 38.801 V0.4.0 (Aug. 2016), Total 36 pages.
Technical Specification, "3rd Generation Partnership Project; Technical Specification Group Radio Access Network; Study on New Radio (NR) Access Technology Physical Layer Aspects", (Release 14), 3GPP TR 38.802 V0.3.0 (Oct. 2016), Total 43 pages.
Technical Report, "3rd Generation Partnership Project; Technical Specification Group Radio Access Network; Study on New Radio Access Technology; Radio Interface Protocol Aspects", (Release 14), 3GPP TR 38.804 V0.3.0 (Aug. 2016), Total 22 pages.
Technical Specification, "3rd Generation Partnership Project; Technical Specification Group Radio Access Network; Study on New Radio Access Technology", (Release 14), 3GPP TR 38.912 V0.0.2 (Sep. 2016), Total 11 pages.
"Discussion on time domain structures", Huawei, HiSilicon, 3GPP TSG RAN WG1 Meeting #86, R1-166104, Gothenburg, Sweden, Aug. 22-26, 2016, Total 7 pages.
"Support for Beam Based Common Control Plane," Nokia, Alcatel-Lucent Shanghai Bell, 3GPP TSG-RAN WG1#85, R1-165364, Nanjing, P.R. China, May 23-27, 2016, Total 5 pages.
"Discussion on Maximum Code Block Size," Samsung, 3GPP TSG RAN WG1 #86bis, R1-1609068, Lisbon, Portugal, Oct. 10-14, 2016, Total 3 pages.
Extended European Search Report issued on Jun. 22, 2020 in Patent Application No. 17885215.8, 7 pages.
European Office Action issued Nov. 16, 2021 in European Patent Application No. 17 885 215.8, 6 pages.
Notice of Reasons for Refusal issued Jan. 11, 2022 in Japanese Patent Application No. 2018-558085 (with English language translation), 6 pages.
Indian Office Action issued Mar. 25, 2022 in Indian Patent Application No. 202148049611. 7 pages.
Indian Office Action issued Mar. 25, 2022 in Indian Patent Application No. 202148049545, 7 pages.
Indian Office Action issued Mar. 25, 2022 in Indian Patent Application No. 202148049526, 7 pages.
Indian Office Action issued Mar. 25, 2022 in Indian Patent Application No. 202148049515, 6 pages.
Combined Chinese Office Action and Search Report issued Jun. 29, 2022 in Chinese Patent Application No. 201780078073.4 (with unedited computer generated English translation), 12 pages.
Combined Chinese Office Action and Search Report issued Mar. 1, 2023 in Patent Application No. 201780078073.4 (with English machine translation), 10 pages.
Decision of Refusal issued Jul. 19, 2022 in Japanese Patent Application No. 2018-558085 (with English machine translation), 4 pages.
European Office Action issued Jul. 4, 2023 in European Patent Application No. 17885215.8, 6 pages.
Chinese Office Action dated Aug. 14, 2023, issued in Chinese Patent Application No. 201780078073.4 (with English translation).
Indian Office Action dated Jan. 29, 2021, issued in Indian Patent Application No. 201947021707.
Japanese Patent Office, Office Action, Application No. 2022-163761, dated Dec. 12, 2023, in 8 pages.
European Patent Office, Extended European Search Report, Application No. 23197280.3, dated Dec. 15, 2023, in 8 pages.
Chinese Patent Office, Office Action, Application No. 201780078073.4, dated Nov. 14, 2023, in 19 pages.

* cited by examiner

F I G. 1
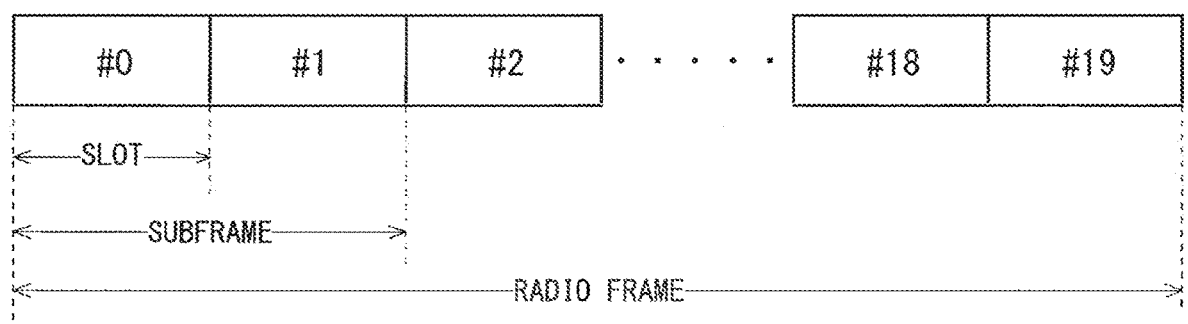

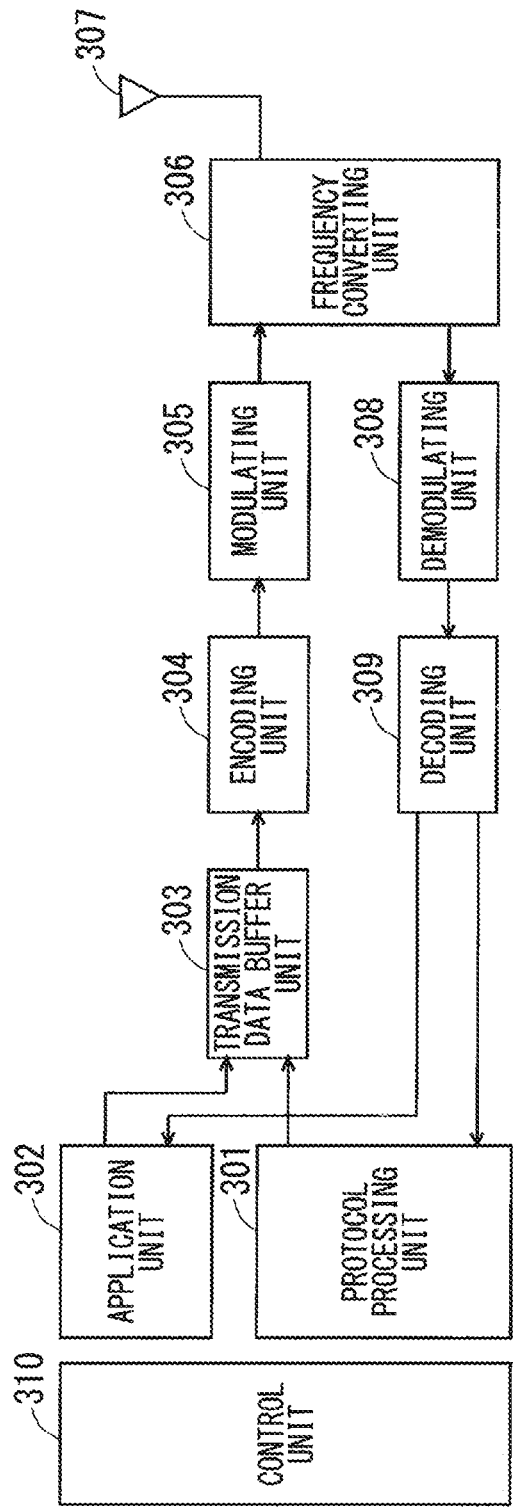

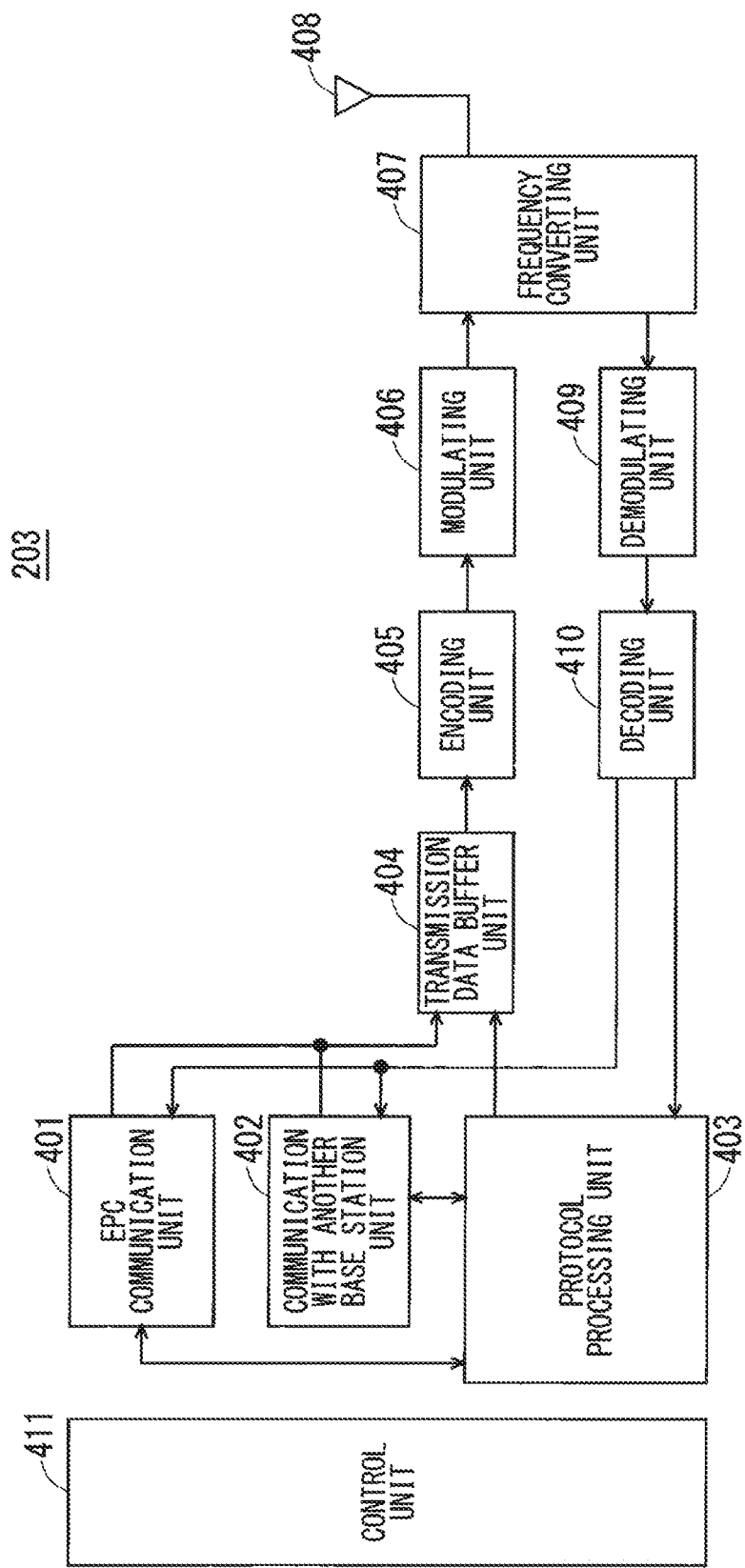

F I G . 6
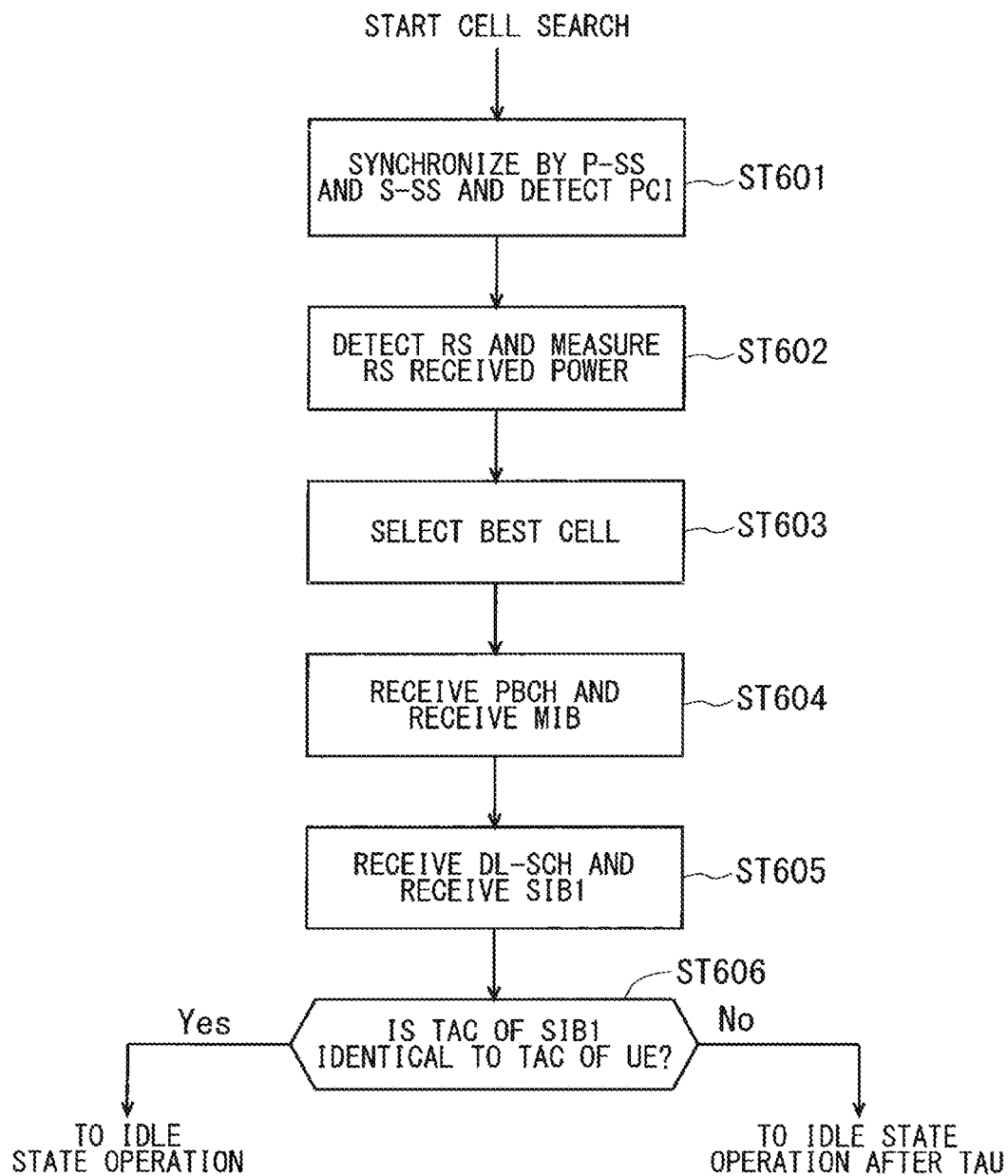

F I G . 2 3
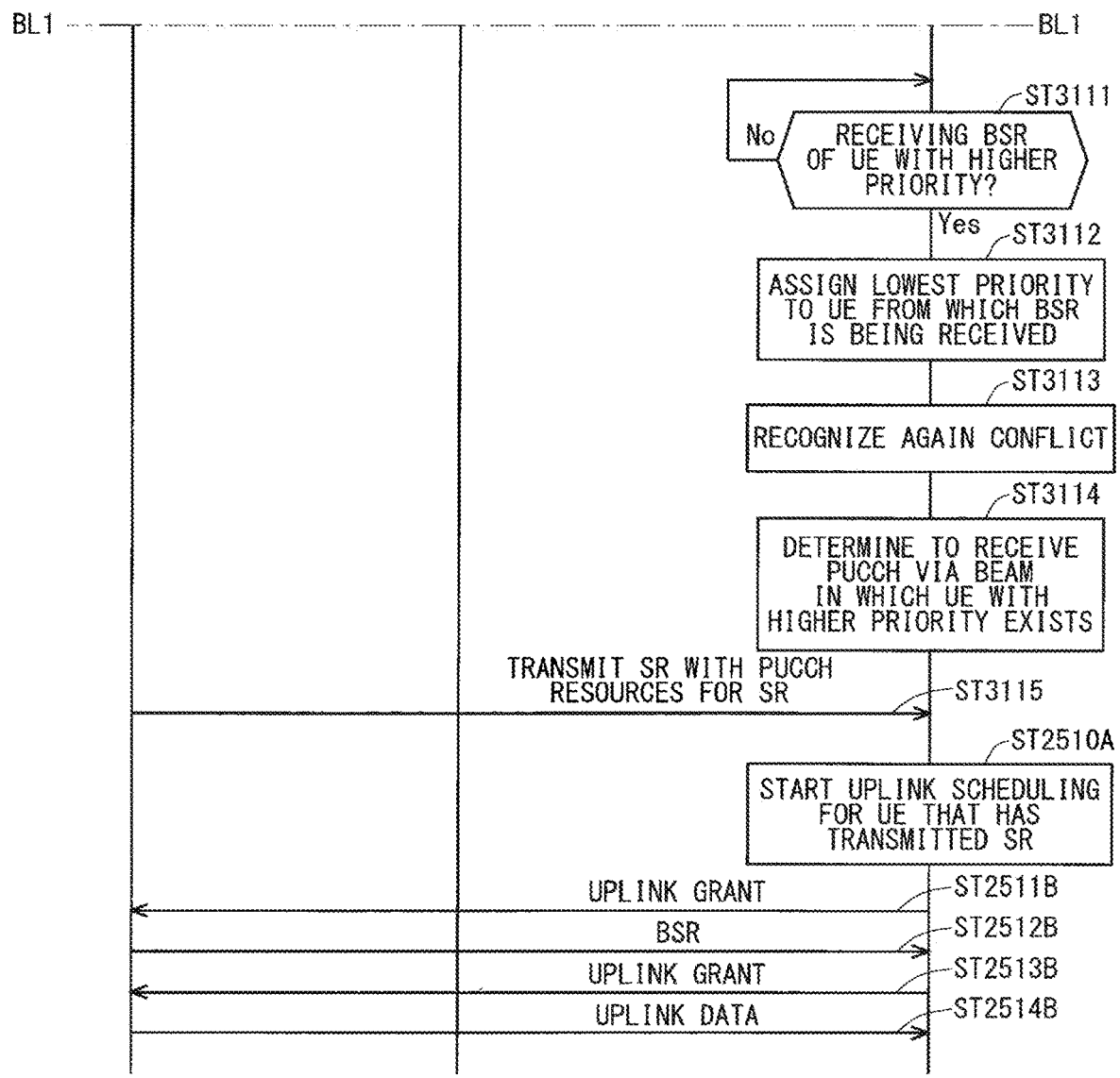

F I G. 2 6
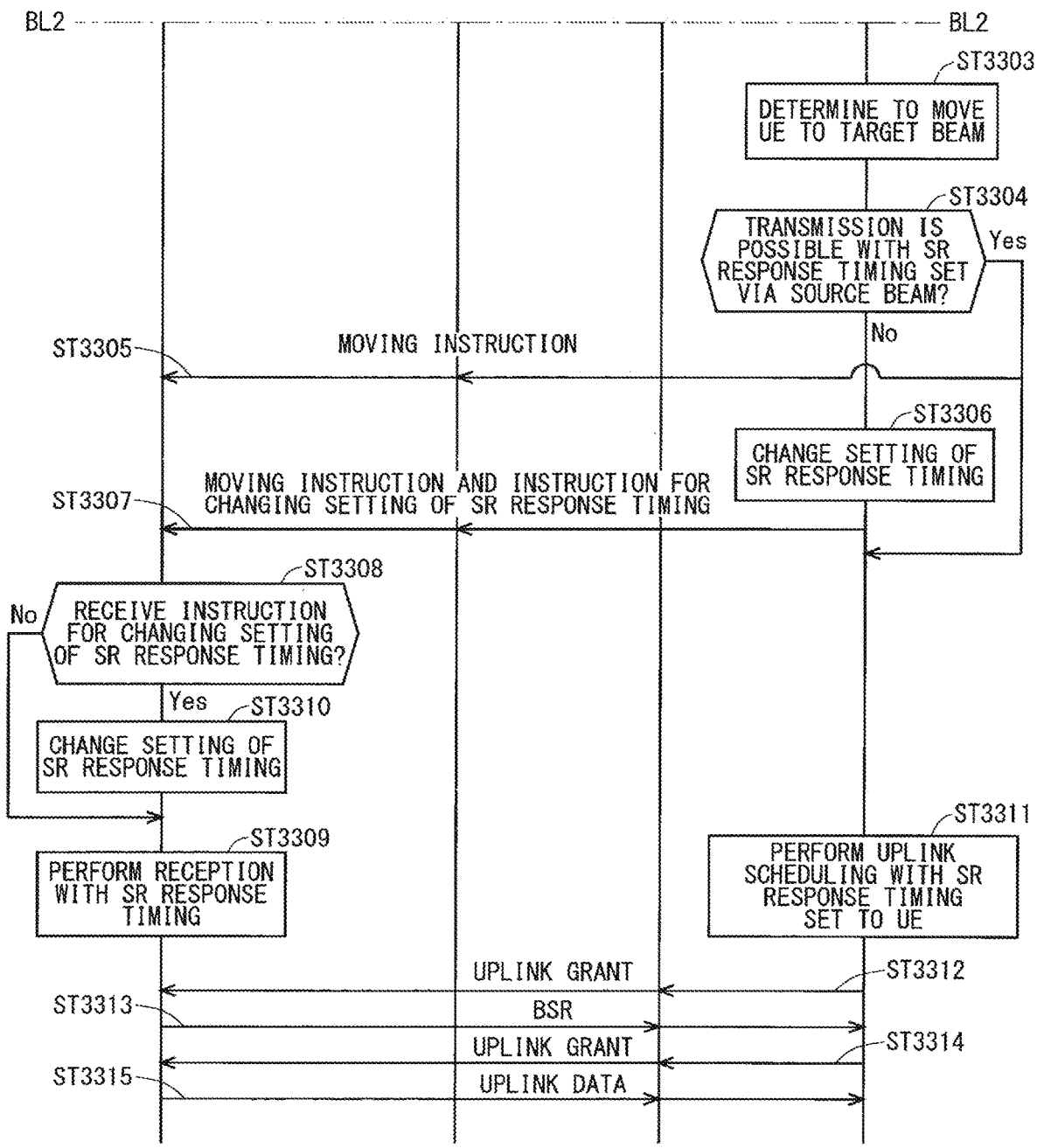

F I G . 2 8
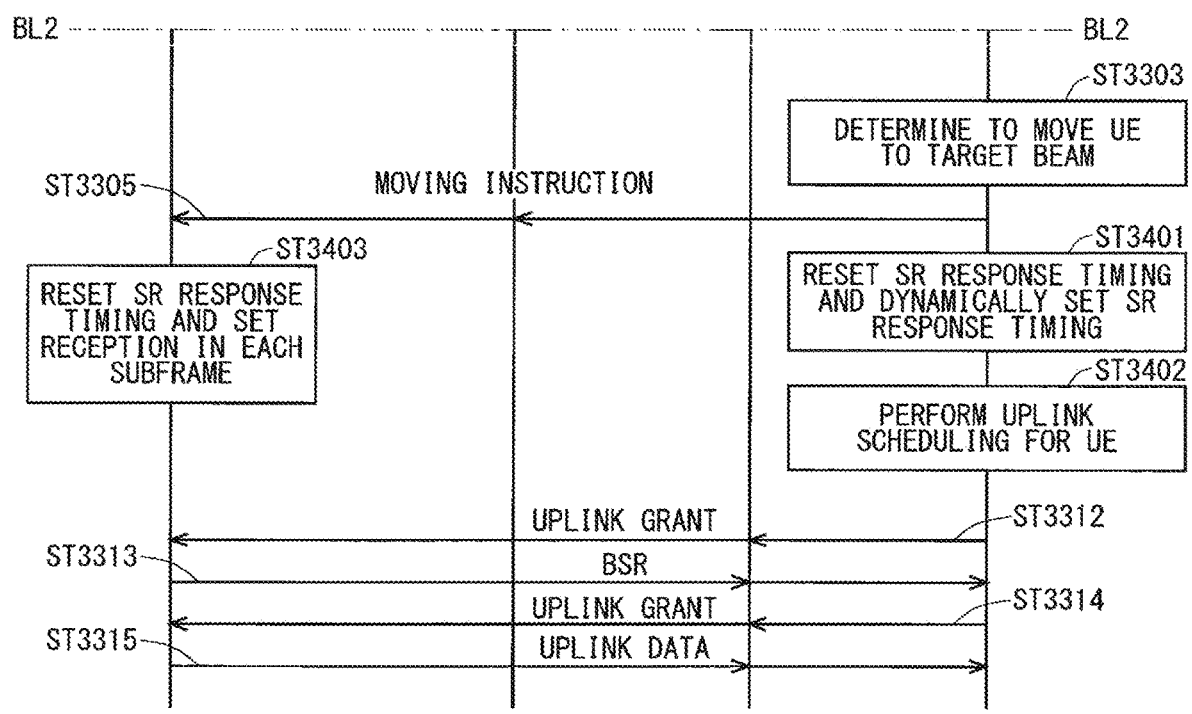

F I G . 2 9
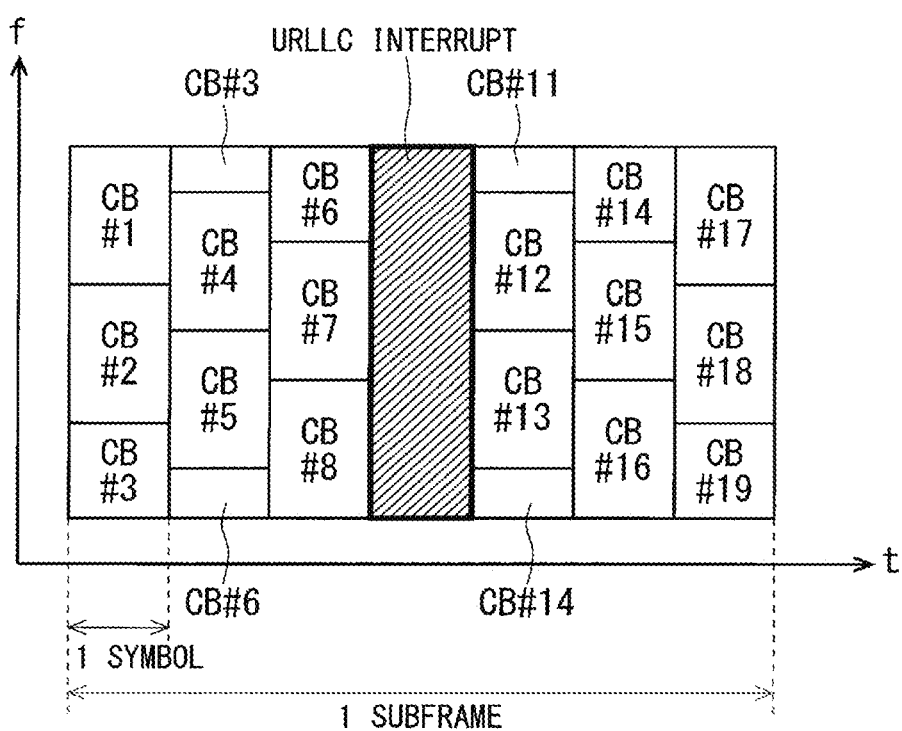

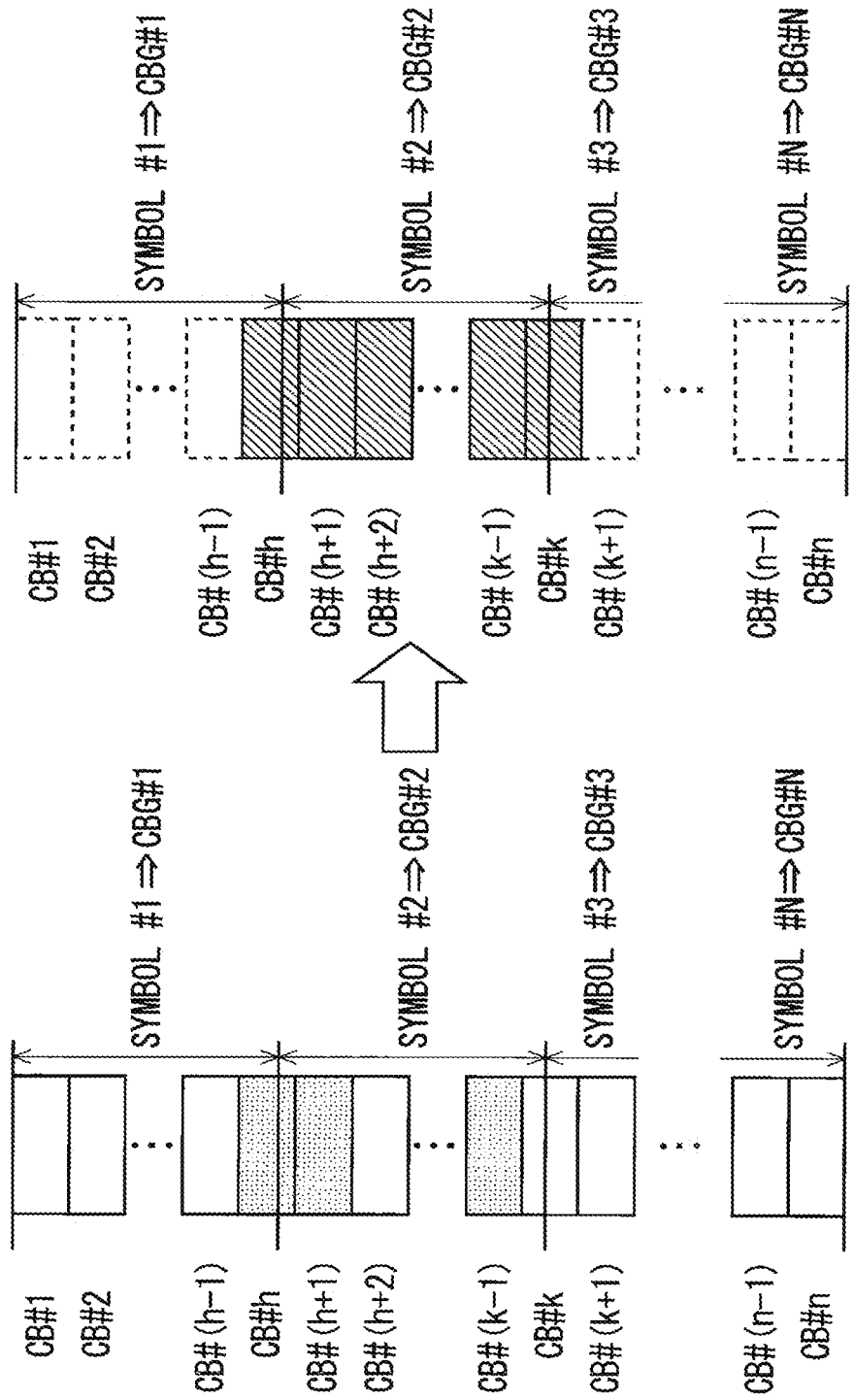

F I G . 3 1
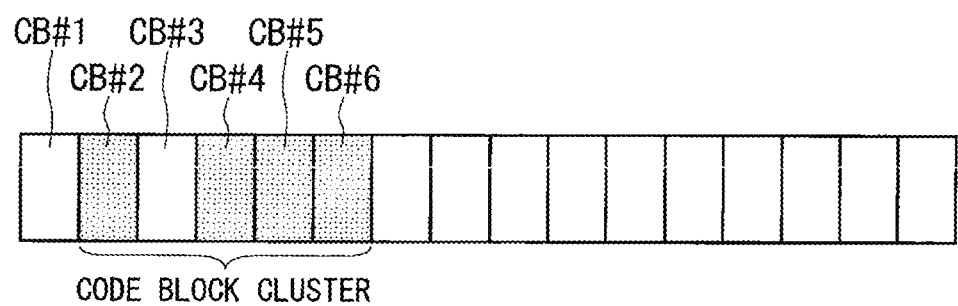

COMMUNICATION SYSTEM, BASE STATION AND COMMUNICATION TERMINAL

CROSS-REFERENCE TO RELATED APPLICATIONS

This application is a continuation and claims the benefit of U.S. application Ser. No. 17/649,974, filed on Feb. 4, 2022, which is a divisional of U.S. application Ser. No. 16/340,228, filed on Apr. 8, 2019, which is a National Stage Application of PCT/JP2017/046054, filed on Dec. 22, 2017, which claims the benefit of Japanese Patent Application No. 2016-249443, filed on Dec. 22, 2016.

TECHNICAL FIELD

The present invention relates to a communication system in which radio communication is performed between a communication terminal device such as a user equipment device and a base station device.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in the case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter, also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID) and broadcasts "TRUE" in a CSG indication. The authorized members of the subscriber group who have registered in advance access the CSG cells using the CSG ID that is the access permission information.

The CSG ID is broadcast by the CSG cell or cells. A plurality of CSG IDs exist in the LTE communication system. The CSG IDs are used by communication terminals (UEs) for making access from CSG-related members easier.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 2 discloses three different modes of the access to the HeNB and HNB. Specifically, an open access mode, a closed access mode, and a hybrid access mode are disclosed.

Further, 3GPP is pursuing specifications standard of long term evolution advanced (LTE-A) as Release 10 (see Non- Patent Documents 3 and 4). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz. Non-Patent Document 1 describes the CA.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, 3GPP is studying the use of small eNBs (hereinafter also referred to as "small-scale base station devices") configuring small cells to satisfy tremendous traffic in the future. In an example technique under study, etc., a large number of small eNBs will be installed to configure a large number of small cells, thus increasing spectral efficiency and communication capacity. The specific techniques include dual connectivity (abbreviated as DC) in which a UE communicates with two eNBs through connection thereto. Non-Patent Document 1 describes the DC.

Among eNBs that perform dual connectivity (DC), one of them may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate will be further increased when the operations of the LTE and the LTE-A are fully initiated.

For increasingly sophisticated mobile communications, the fifth generation (hereinafter also referred to as "5G") radio access system is studied, whose service is aimed to be launched in 2020 and afterward. For example, in the Europe, an organization named METIS summarizes the requirements for 5G (see Non-Patent Document 5).

Among the requirements in the 5G radio access system are a system capacity 1000 times as high as, a data transmission rate 100 times as high as, a data latency one tenth (1/10) as low as, and simultaneously connected communication terminals 100 times as many as those in the LTE system, to further reduce the power consumption and device cost.

To satisfy such requirements, 3GPP is pursuing the study of 5G standards as Release 14 (see Non-Patent Documents 6 to 10). The techniques on 5G radio sections are referred to as "New Radio (abbreviated as NR) Access Technology", and the several new techniques are being studied (see Non-Patent Documents 11 to 13). Examples of the techniques include a NR frame structure using a self-contained subframe, multi-beamforming (MBF) through analog beamforming or hybrid beamforming, beam sweeping in the MBF, and the maximum code block size in coding.

PRIOR-ART DOCUMENTS

Non-Patent Documents

Non-Patent Document 1: 3GPP TS36.300 V14.0.0
Non-Patent Document 2: 3GPP S1-083461
Non-Patent Document 3: 3GPP TR 36.814 V9.0.0
Non-Patent Document 4: 3GPP TR 36.912 V13.0.0
Non-Patent Document 5: "Scenarios, requirements and KPIs for 5G mobile and wireless system", [online], Apr. 30, 2013, ICT-317669-METIS/D1.1, [Searched on Dec. 13, 2016], Internet <https://www.metis2020.com/documents/deliverables/>
Non-Patent Document 6: 3GPP TR 23.799 V1.1.0
Non-Patent Document 7: 3GPP TR 38.801 V0.4.0
Non-Patent Document 8: 3GPP TR 38.802 V0.3.0
Non-Patent Document 9: 3GPP TR 38.804 V0.3.0
Non-Patent Document 10: 3GPP TR 38.912 V0.0.2
Non-Patent Document 11: 3GPP R1-166104
Non-Patent Document 12: 3GPP R1-165364
Non-Patent Document 13: 3GPP R1-1609068

SUMMARY

Problems to be Solved by the Invention

The multi-beamforming is being studied in the NR. In the multi-beamforming, the beam sweeping is performed with different timings using one or more beams to cover a necessary coverage when the number of beams formed by the cell at a time is less. Thus, each of the beams formed by the cell cannot be transmitted or received with all the timings.

In the LTE, the UE needs to receive a downlink control channel in each subframe, since the dynamic scheduling is normally performed. Since the beams cannot be transmitted or received with all the timings during the beam sweeping in the multi-beamforming as previously described, it is useless for the UE to continue to receive the downlink control channel in each subframe. Thus, unnecessary power consumption will be increased. Moreover, it is useless for the UE to transmit an uplink control channel with the timings of the beams that cannot be transmitted or received. The power consumption will be increased, and the uplink communication becomes impossible.

In the multi-beamforming, one cell forms a plurality of beams, and forms a coverage for each of the beams. Thus, the coverage of the beam is narrower than the coverage of the cell. Unless the coverage of the beam is appropriately formed, problems occur e.g., a coverage hole, and being susceptible to disconnection in communication during the movement of the UE between beams.

It is expected in the NR that the broadening of use frequency band increases the size of a transport block and also the number of code blocks. Since the Ack/Nack feedback scheme such as the LTE involves retransmission of the whole transport block including code blocks that have successfully been received, increase in the number of code blocks will cause substantial reduction in the use efficiency of radio resources.

Thus, retransmitting a code block that cannot be accurately decoded according to the HARQ is being studied in the NR. However, when a plurality of code blocks have reception errors due to being high in number, a problem of increase in the number of bits required for the feedback occurs. This will cause increase in the power consumption of the UE and reduction in the use efficiency of the radio resources.

The object of the present invention is to provide a communication system that can suppress increase in the power consumption of a communication terminal device, degradation in the communication quality, and reduction in the use efficiency of the radio resources.

Means to Solve the Problems

A communication system according to the present invention includes a base station device and at least one communication terminal device capable of radio communication with the base station device, wherein the base station device notifies the communication terminal device of information on a next reception timing, and the communication terminal device performs reception based on the information on the next reception timing that has been notified from the base station device.

Effects of the Invention

A communication system according to the present invention includes a base station device and at least one communication terminal device capable of radio communication with the base station device. The base station device notifies the communication terminal device of information on a next reception timing. The communication terminal device performs reception based on the information on the next reception timing that has been notified from the base station device. Since the communication terminal device can receive the information transmitted from the base station device with the notified reception timing, the power consumption required for the reception can be saved. Since retransmission can be promptly performed when the retransmission is necessary, the latency in the communication between the base station device and the communication terminal device can be reduced. Thus, increase in the power consumption of the communication terminal device, degradation in the communication quality, and reduction in the use efficiency of radio resources can be suppressed.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 3 is a block diagram showing the configuration of a user equipment 202 shown in FIG. 2, which is a communication terminal according to the present invention.

FIG. 4 is a block diagram showing the configuration of a base station 203 shown in FIG. 2, which is a base station according to the present invention.

FIG. 6 is a flowchart showing an outline from a cell search to an idle state operation performed by a communication terminal (UE) in the LTE communication system.

FIG. 23 illustrates the one example sequence for transmitting and receiving the SR when priorities for receiving the PUCCH are assigned to beams.

FIG. 26 illustrates the one example sequence for setting the transmission/reception timing of the uplink grant for the SR upon movement between beams after transmission of the SR.

FIG. 28 illustrates the other example sequence for setting the transmission/reception timing of the uplink grant for the SR upon movement between beams after transmission of the SR.

FIG. 29 illustrates reception errors in code blocks due to the URLLC interrupt.

FIG. 30 illustrates associations between code blocks and a plurality of CBGs when the code blocks belong to the plurality of CBGs.

FIG. 31 illustrates a relationship between a code block cluster and consecutive code blocks including reception errors.

DESCRIPTION OF EMBODIMENTS

First Embodiment

Figure 2:
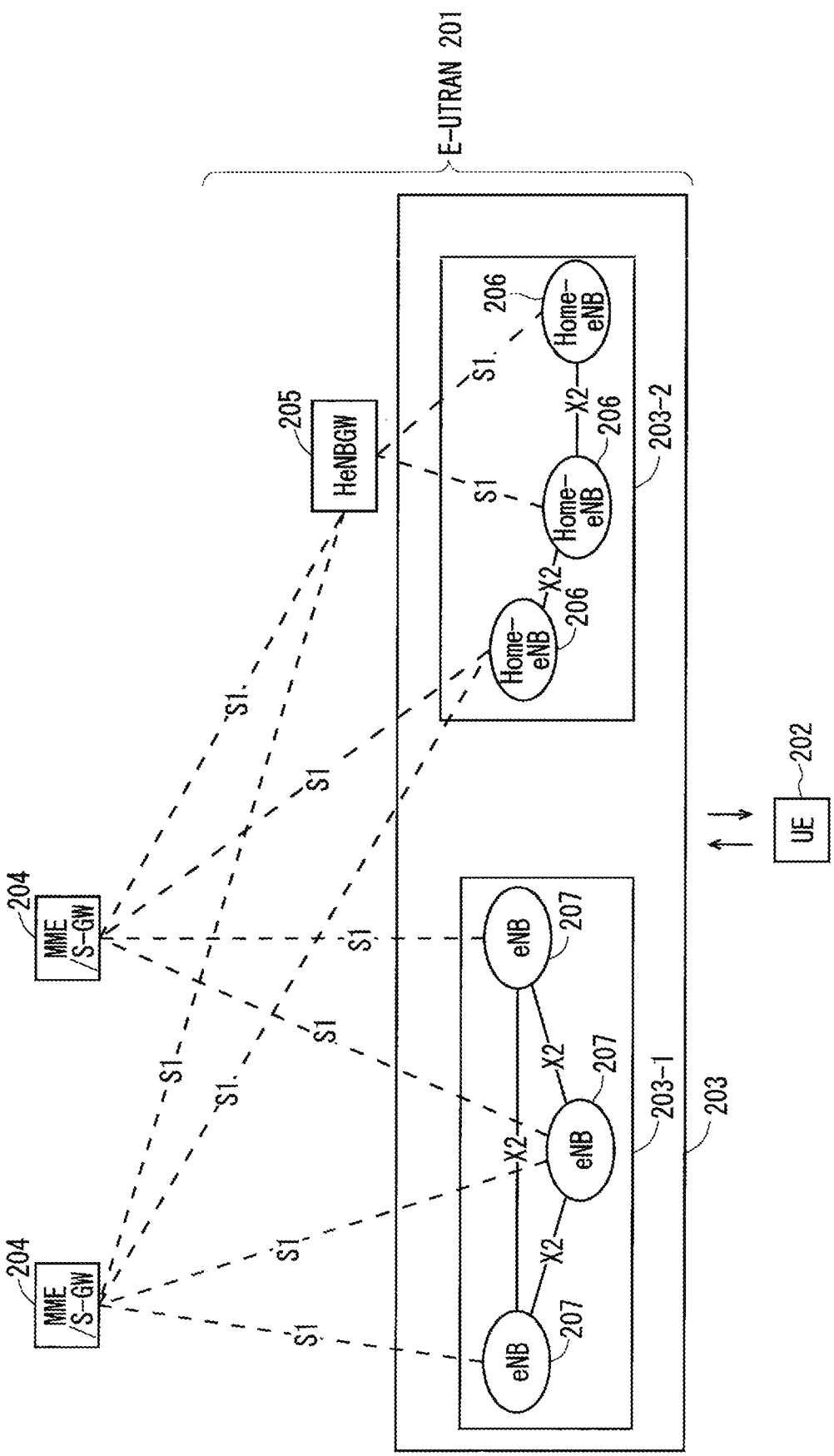
FIG. 2 is a block diagram showing the overall configuration of an LTE communication system 200 under discussion of 3GPP.

FIG. 2 is a block diagram showing an overall configuration of an LTE communication system 200, which is under discussion of 3GPP. FIG. 2 will be described. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a movable mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs broadcast, paging, RRC connection management, and the like. The states of the base station 203 and the user equipment 202 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 are classified into eNBs 207 and Home-eNBs 206. The communication system 200 includes an eNB group 203-1 including a plurality of eNBs 207 and a Home-eNB group 203-2 including a plurality of Home-eNBs 206. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW), or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The Home-eNB 206 is connected to the MME unit 204 by means of an S1 interface, and control information is communicated between the Home-eNB 206 and the MME unit 204. A plurality of Home-eNBs 206 are connected to one MME unit 204. Or, the Home-eNBs 206 are connected to the MME units 204 through a Home-eNB gateway (HeNBGW) 205. The Home-eNB 206 is connected to the HeNBGW 205 by means of an S1 interface, and the HeNBGW 205 is connected to the MME unit 204 by means of an S1 interface.

One or a plurality of Home-eNBs 206 are connected to one HeNBGW 205, and information is communicated therebetween through an S1 interface. The HeNBGW 205 is connected to one or a plurality of MME units 204, and information is communicated therebetween through an S1 interface.

The MME units 204 and HeNBGW 205 are entities of higher layer, specifically, higher nodes, and control the connections between the user equipment (UE) 202 and the eNB 207 and the Home-eNB 206 being base stations. The MME units 204 configure an EPC being a core network. The base station 203 and the HeNBGW 205 configure the E-UTRAN 201.

Further, 3GPP is studying the configuration below. The X2 interface between the Home-eNBs 206 is supported. In other words, the Home-eNBs 206 are connected to each other by means of an X2 interface, and control information is communicated between the Home-eNBs 206. The HeNBGW 205 appears to the MME unit 204 as the Home-eNB 206. The HeNBGW 205 appears to the Home-eNB 206 as the MME unit 204.

The interfaces between the Home-eNBs 206 and the MME units 204 are the same, which are the S1 interfaces, in both cases where the Home-eNB 206 is connected to the MME unit 204 through the HeNBGW 205 and it is directly connected to the MME unit 204.

The base station device 203 may configure a single cell or a plurality of cells. Each cell has a range predetermined as a coverage in which the cell can communicate with the user equipment 202 and performs radio communication with the user equipment 202 within the coverage. In the case where one base station device 203 configures a plurality of cells, every cell is configured so as to communicate with the user equipment 202.

FIG. 3 is a block diagram showing the configuration of the user equipment 202 of FIG. 2 that is a communication terminal according to the present invention. The transmission process of the user equipment 202 shown in FIG. 3 will be described. First, a transmission data buffer unit 303 stores the control data from a protocol processing unit 301 and the user data from an application unit 302. The data stored in the transmission data buffer unit 303 is passed to an encoding unit 304 and is subjected to an encoding process such as error correction. There may exist the data output from the transmission data buffer unit 303 directly to a modulating unit 305 without the encoding process. The data encoded by the encoding unit 304 is modulated by the modulating unit 305. The modulated data is converted into a baseband signal, and the baseband signal is output to a frequency converting unit 306 and is then converted into a radio transmission frequency. After that, a transmission signal is transmitted from an antenna 307 to the base station 203.

The user equipment 202 executes the reception process as follows. The radio signal from the base station 203 is received through the antenna 307. The received signal is converted from a radio reception frequency into a baseband signal by the frequency converting unit 306 and is then demodulated by a demodulating unit 308. The demodulated data is passed to a decoding unit 309 and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 3, the control unit 310 is connected to the individual units 301 to 309.

FIG. 4 is a block diagram showing the configuration of the base station 203 of FIG. 2 that is a base station according to the present invention. The transmission process of the base station 203 shown in FIG. 4 will be described. An EPC communication unit 401 performs data transmission and reception between the base station 203 and the EPC (such as the MME unit 204), HeNBGW 205, and the like. A communication with another base station unit 402 performs data transmission and reception to and from another base station. The EPC communication unit 401 and the communication with another base station unit 402 each transmit and receive information to and from a protocol processing unit 403. The control data from the protocol processing unit 403, and the user data and the control data from the EPC communication unit 401 and the communication with another base station unit 402 are stored in a transmission data buffer unit 404.

The data stored in the transmission data buffer unit 404 is passed to an encoding unit 405 and is then subjected to an encoding process such as error correction. There may exist the data output from the transmission data buffer unit 404 directly to a modulating unit 406 without the encoding process. The encoded data is modulated by the modulating unit 406. The modulated data is converted into a baseband signal, and the baseband signal is output to a frequency converting unit 407 and is then converted into a radio transmission frequency. After that, a transmission signal is transmitted from an antenna 408 to one or a plurality of user equipments 202.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and is then subjected to a decoding process such as error correction. Among the pieces of decoded data, the control data is passed to the protocol processing unit 403, the EPC communication unit 401, or the communication with another base station unit 402, and the user data is passed to the EPC communication unit 401 and the communication with another base station unit 402. A series of processes by the base station 203 is controlled by a control unit 411. This means that, though not shown in FIG. 4, the control unit 411 is connected to the individual units 401 to 410.

Figure 5:
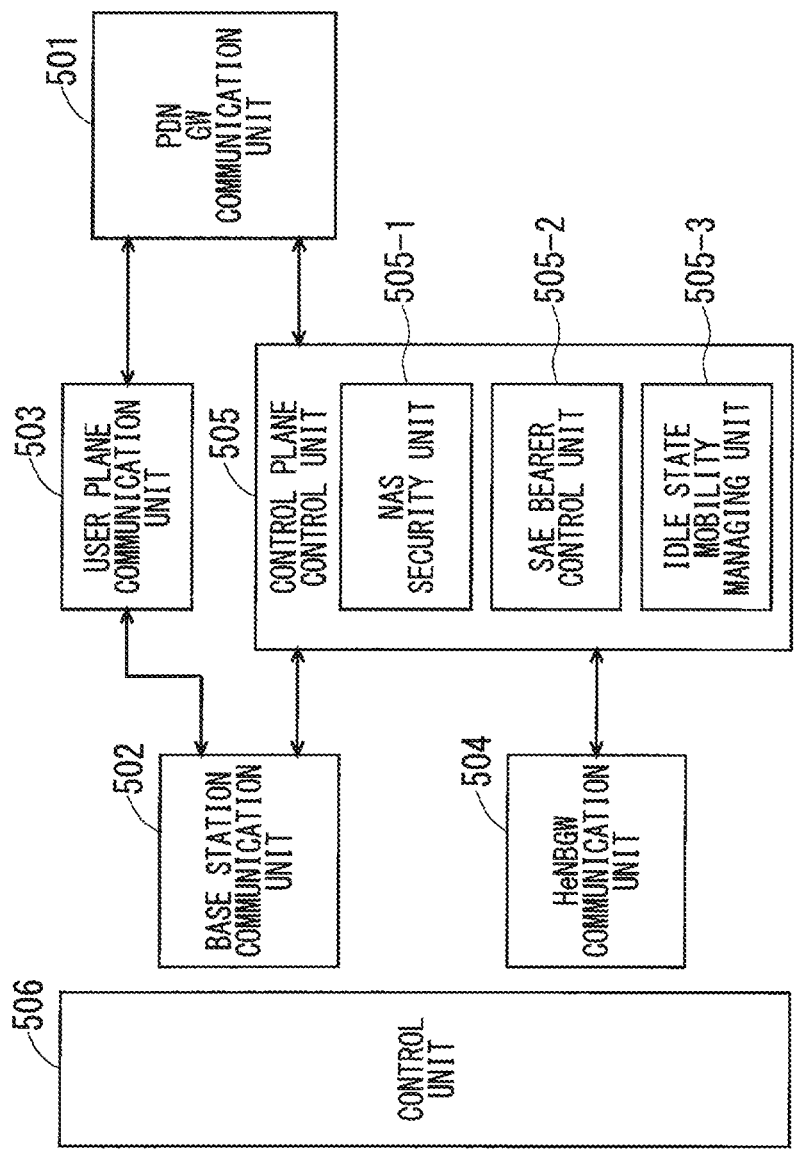
FIG. 5 is a block diagram showing the configuration of an MME according to the present invention.

FIG. 5 is a block diagram showing the configuration of the MME according to the present invention. FIG. 5 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In the case where the data received from the PDN GW is user data, the user data is passed from the PDN GW communication unit 501 to the base station communication unit 502 via a user plane communication unit 503 and is then transmitted to one or a plurality of base stations 203. In the case where the data received from the base station 203 is user data, the user data is passed from the base station communication unit 502 to the PDN GW communication unit 501 via the user plane communication unit 503 and is then transmitted to the PDN GW.

In the case where the data received from the PDN GW is control data, the control data is passed from the PDN GW communication unit 501 to a control plane control unit 505. In the case where the data received from the base station 203 is control data, the control data is passed from the base station communication unit 502 to the control plane control unit 505.

A HeNBGW communication unit 504 is provided in the case where the HeNBGW 205 is provided, which performs data transmission and reception between the MME 204a and the HeNBGW 205 by means of the interface (IF) according to an information type. The control data received from the HeNBGW communication unit 504 is passed from the HeNBGW communication unit 504 to the control plane control unit 505. The processing results of the control plane control unit 505 are transmitted to the PDN GW via the PDN GW communication unit 501. The processing results of the control plane control unit 505 are transmitted to one or a plurality of base stations 203 by means of the S1 interface via the base station communication unit 502, and are transmitted to one or a plurality of HeNBGWs 205 via the HeNBGW communication unit 504.

The control plane control unit 505 includes a NAS security unit 505-1, an SAE bearer control unit 505-2, and an idle state mobility managing unit 505-3, and performs an overall process for the control plane. The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state, which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the Home-eNBs 206 to be connected to the MME 204a, CSG IDs, and a whitelist.

An example of a cell search method in a mobile communication system will be described next. FIG. 6 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME and the like to change a tracking area through the cell for performing tracking area update (TAU).

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

Figure 7:
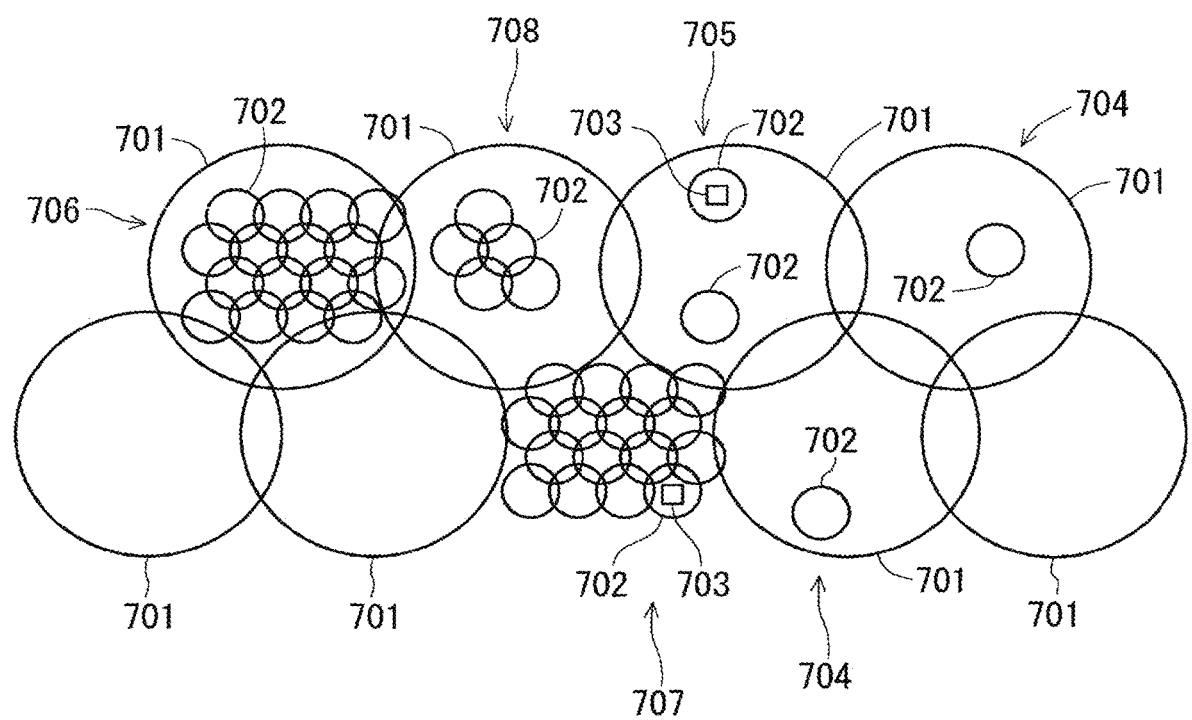
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 701. A small cell configured by a small eNB has a coverage 702 whose range is narrower than that of the coverage 701 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "704" or "705", the coverage 702 of the small cell configured by a small eNB may be included in the coverage 701 of the macro cell configured by a macro eNB.

As indicated by the reference "705", the coverages 702 of a plurality of, for example, two small cells may be included in the coverage 701 of one macro cell. A user equipment (UE) 703 is included in, for example, the coverage 702 of the small cell and performs communication via the small cell.

In the cell configuration shown in FIG. 7, as indicated by a reference "706", the coverage 701 of the macro cell configured by a macro eNB may overlap the coverages 702 of the small cells configured by small eNBs in a complicated manner.

As indicated by a reference "707", the coverage 701 of the macro cell configured by a macro eNB may not overlap the coverages 702 of the small cells configured by small eNBs.

Further, as indicated by a reference "708", the coverages 702 of a large number of small cells configured by a large number of small eNBs may be configured in the coverage 701 of one macro cell configured by one macro eNB.

5G proposes that a base station (a 5G base station will be referred to as a gNB in this Description) should communicate with application of beamforming for forming narrow beams using a plurality of antennas to broaden a radio coverage, i.e., a coverage. For example, the gNB includes a multi-element antenna as the antenna 408 illustrated in FIG. 4. The gNB forms a beam in a predefined direction, using a part of the multi-element antenna or all of a plurality of antennas. Forming the narrow beams can broaden the radio coverage. A proposal is made on a method for performing the beam sweeping with different timings using one or more beams to cover a wide coverage when the number of beams formed by the gNB at a time is less and a coverage necessary for a cell cannot be covered (see Non-Patent Document 12).

Figure 8:
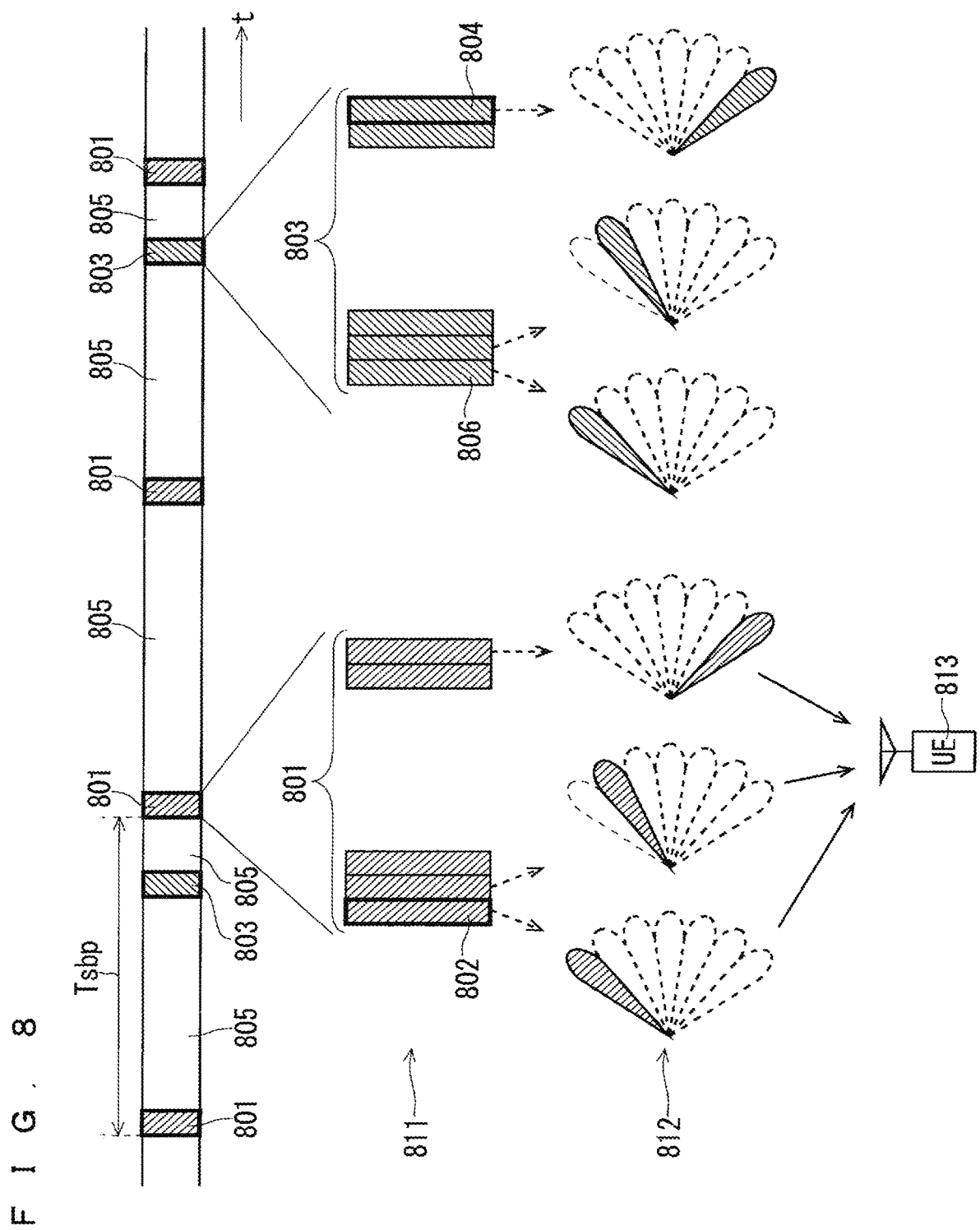
FIG. 8 illustrates the beam sweeping.

FIG. 8 illustrates the beam sweeping. To perform the beam sweeping, downlink beam sweeping blocks (DL sweeping blocks) 801 and uplink beam sweeping blocks (UL sweeping blocks) 803 are provided. DL/UL data subframes 805 in which the downlink data and the uplink data are to be transmitted are interposed between the downlink beam sweeping blocks 801 and the uplink beam sweeping blocks 803.

As indicated by a reference 811, the block 801 and the block 803 include a plurality of resources 802, and a plurality of resources 804 and 806, respectively. Each of the resources is transmitted via a beam denoted by a reference 812.

The downlink beam sweeping block 801 is repeatedly transmitted with a predefined downlink sweeping block period $T_{sbp}$. In the downlink beam sweeping block 801, beams are formed and transmitted for a predefined narrow coverage during a first predefined duration, and beams are formed and transmitted for the next predefined narrow coverage during the next predefined duration. With repetition of this, all coverages for a cell are covered. The resources denoted by the reference 802 are used for transmitting, for example, a synchronization signal, the PBCH, and a beam reference signal.

In the uplink beam sweeping block 803, beams are formed and received for a predefined narrow coverage during a first predefined duration, and beams are formed and received for the next predefined narrow coverage during the next predefined duration. With repetition of this, all coverages for a cell are covered. The resources denoted by the reference 804 are used for transmitting, for example, the RACH.

A series of beam sweepings during covering of all the coverages for the cell will be referred to as beam sweeping blocks. In the following description, a transmission/reception duration of each beam in the beam sweeping blocks may be referred to as a "beam unit".

The beam sweeping block is periodically provided. In the downlink beam sweeping block 801, a common control signal and a channel are transmitted via each of the beams. Examples of the common control signal and the channel include a synchronization signal (SS), the PBCH, and a reference signal (RS) that are common control signals necessary for initial access. In the uplink beam sweeping block 803, RACH resources, etc. are allocated to each of the beams.

A UE 813 performs reception during the entire duration of the downlink beam sweeping blocks 801. Consequently, wherever being located in the coverage for the cell, the UE 813 can receive beams transmitted to its position. Thus, the UE 813 can receive, for example, the common control signal necessary for initial access. The UE 813 performs transmission in the uplink beam sweeping blocks 803. Consequently, the gNB can receive the uplink transmission from the UE 813. The UE 813 transmits and receives uplink data/downlink data to and from the gNB, using the beams in the DL/UL data subframes 805.

As described above, the UE finds a beam that can be transmitted and received by its own UE using the beam sweeping, and uses the beam for communication with the gNB. When the gNB uses a beam different from the beam, the UE need not receive the downlink signal.

However, the UE does not know with which timing the gNB transmits and receives data for the UE. Thus, the UE needs to receive the downlink control signal to be transmitted from the gNB in each subframe to determine whether to transmit and receive the uplink/downlink user data to and from the gNB. Reception of the downlink control signal from the gNB in each subframe by the UE will waste the power consumption of the UE, and the frequency and the time resources to be used for the reception.

3GPP R1-1609135 (hereinafter referred to as "Reference 1") proposes receiving the downlink control signal with a period longer than that per scheduling. Furthermore, 3GPP R1-1610240 (hereinafter referred to as "Reference 2") proposes allocating, to each beam, the timing with which the gNB transmits the downlink control signal.

The aforementioned methods require the UE to perform an operation of periodically receiving the downlink control signal even when the gNB does not transmit the downlink control signal with the period. Thus, the operation of receiving the downlink control signal by the UE will cause a problem of wasting the power consumption. The aforementioned methods also have a problem of increase in the latency in the communication between the gNB and the UE. This is because even when the gNB retransmits the downlink control signal according to the HARQ, the UE needs to wait for the retransmission until the next period. Moreover, the aforementioned methods do not consider any method for setting the period.

The first embodiment will disclose a method for solving such problems.

The gNB notifies the UE of the next timing with which the UE needs to perform an operation of receiving the PDCCH (hereinafter will be referred to as a "PDCCH reception timing"). The PDCCH reception timing may be a timing with which the gNB probably transmits the downlink control information to the UE, a timing with which the gNB probably schedules transmission and reception of the uplink/downlink data for the UE, or a timing with which the gNB directs a beam toward the UE. The gNB may notify, with the PDCCH reception timing, the UE of scheduling information for transmitting and receiving the uplink/downlink data. The gNB may transmit and receive the uplink/downlink data to and from the UE. The UE performs the operation of receiving the PDCCH from the gNB with the PDCCH reception timing. The UE may receive the downlink control information for its own UE from the gNB. The UE may transmit and receive the uplink/downlink data to and from the gNB.

The gNB may notify the PDCCH reception timing using a downlink control signal. The downlink control signal may be notified via the L1/L2 signaling. Application of the L1/L2 signaling enables prompt notification of the PDCCH reception timing.

Alternatively, the gNB may notify the PDCCH reception timing via the MAC control signal. Since the retransmission control according to the HARQ is performed with application of the MAC control signal, the PDCCH reception timing can be notified with high reliability.

The UE may perform the operation of receiving the PDCCH in each subframe, until receiving the notification of the PDCCH reception timing. The gNB may notify the PDCCH reception timing after the RRC connection establishment with the UE, during the RRC connection establishment process, or in a random access procedure. When the PDCCH reception timing is notified in the random access procedure, information on the PDCCH reception timing may be included in a random access response to be notified.

Information indicating a subframe number may be notified as the PDCCH reception timing. The information indicating the subframe number may be, for example, the subframe number or a remainder obtained by dividing the subframe number by a predefined divisor. The predefined divisor may be defined in a standard, broadcast from the gNB to the UE, or notified individually via the RRC-dedicated signaling.

Alternatively, the time from the current subframe may be notified as the PDCCH reception timing. The time from the current subframe may be a time per subframe or another unit.

The gNB may predefine several options for the PDCCH reception timing, and notify the UE of an identifier of a selected value. The options may be defined in a standard, or notified from the gNB to the UE in advance. The options may be broadcast to the UEs being served by the gNB, or notified individually to each of the UEs. The individual notification may be made via the RRC-dedicated signaling. Since the gNB can notify the UE of an identifier of a value selected from the options as the PDCCH reception timing by individually notifying the options, it can notify the PDCCH reception timing with less number of bits.

The gNB may set a plurality of PDCCH reception timings to the UE. Even when the PDCCH cannot be transmitted from the gNB to the UE with a PDCCH reception timing, the UE has only to perform the operation of receiving the PDCCH with the next PDCCH reception timing. Thus, the received power of the UE until the next PDCCH reception timing can be saved.

When the gNB sets the plurality of PDCCH reception timings to the UE, one piece of downlink control information may include information on the plurality of PDCCH reception timings, or a plurality of downlink control information may be multiplexed to be notified.

Alternatively, a plurality of downlink control information each including a plurality of PDCCH reception timings may be used. An upper limit may be set to the number of PDCCH reception timings in one piece of the downlink control information. The upper limit may be defined in a standard. Consequently, the gNB can notify the UE of a plurality of PDCCH reception timings while the size of one piece of the downlink control information is reduced to less than or equal to a constant. Thus, the process of receiving the downlink control information in the UE is simplified.

In setting the plurality of PDCCH reception timings, the gNB and the UE may validate both of the PDCCH reception timing previously notified to the UE and the PDCCH reception timing subsequently notified to the UE. Consequently, the number of PDCCH reception timings to be subsequently notified to the UE can be reduced.

Alternatively, the gNB and the UE may invalidate the PDCCH reception timing previously notified to the UE and validate the PDCCH reception timing subsequently notified to the UE. Consequently, control over the operation of receiving the PDCCH in the UE can be simplified, and the power consumption in the operation of receiving the PDCCH in the UE can be reduced.

Whether to validate the PDCCH reception timing previously notified to the UE may be defined in a standard or notified from the gNB to the UE in advance. Alternatively, information indicating whether to validate the PDCCH reception timing previously notified to the UE may be included in the notification of the PDCCH reception timing to be subsequently notified to the UE. For example, including such information in the notification of the PDCCH reception timing to be subsequently notified to the UE enables flexible control over the PDCCH reception timings.

Figure 9:
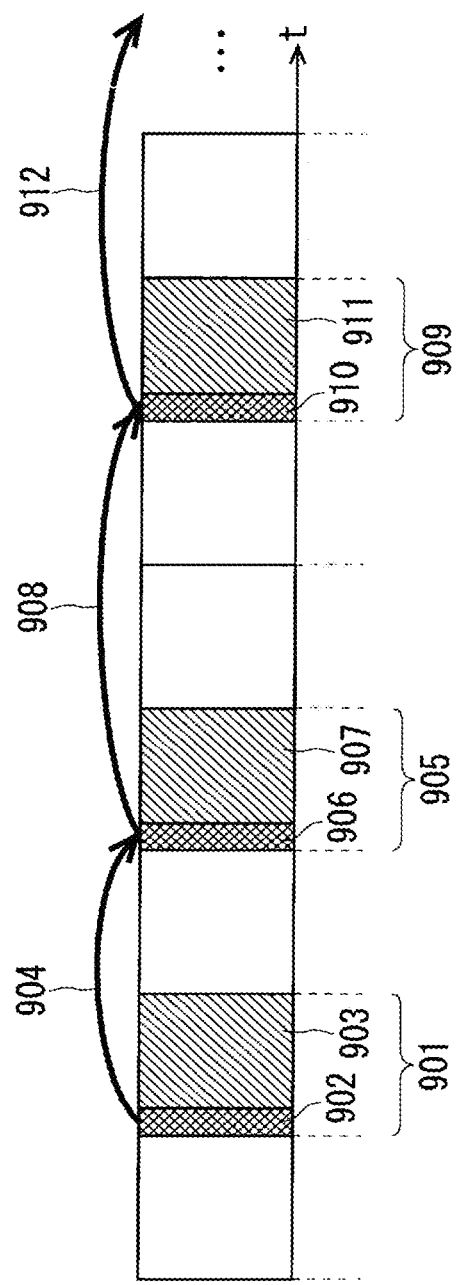
FIG. 9 illustrates one example where the gNB notifies the UE of the next timing with which the PDCCH needs to be received and the UE transmits and receives the uplink/downlink data.

FIG. 9 illustrates one example where the gNB notifies the UE of the next timing with which the PDCCH needs to be received and the UE transmits and receives the uplink/downlink data. FIG. 9 illustrates notification of the next transmission/reception timing of the UE using the downlink control information transmitted from the gNB to the UE. Portions denoted by references 902, 906, and 910 in FIG. 9 represent downlink control signals that the UE receives from the gNB. Portions denoted by references 903, 907, and 911 represent pieces of user data to be transmitted and received by the UE. Thick solid-line arrows 904, 908, and 912 each represent information on a subframe indicated by the next PDCCH reception timing. The downlink control signals 902, 906, and 910 may or may not include scheduling information for transmitting and receiving the pieces of user data 903, 907, and 911, respectively, in the corresponding subframes. FIG. 9 illustrates a case where the downlink control signals 902, 906, and 910 include the scheduling information for transmitting and receiving the pieces of user data 903, 907, and 911, respectively, in the corresponding subframes.

In FIG. 9, the UE receives the downlink control signal 902 in a subframe 901. The UE obtains, from the downlink control signal 902, the scheduling information for transmitting and receiving the piece of user data 903 in the subframe 901, and the information 904 on the next PDCCH reception timing. The UE transmits and receives the piece of user data 903 to and from the gNB. The scheduling information included in the downlink control signal 902 is used for transmitting and receiving the piece of user data 903.

In FIG. 9, the information 904 on the next PDCCH reception timing indicates a subframe 905 as the next PDCCH reception timing of the UE. The UE receives the downlink control signal 906 in the subframe 905. The UE obtains, from the received downlink control signal 906, information on the piece of user data 907 in the subframe 905, and the information 908 on the next PDCCH reception timing. The UE transmits and receives the piece of user data 907 to and from the gNB. The scheduling information included in the downlink control signal 906 is used for transmitting and receiving the piece of user data 907.

In FIG. 9, the information 908 on the next PDCCH reception timing indicates a subframe 909 as the next PDCCH reception timing of the UE. Since the subsequent procedure is the same as that previously described, the description will be omitted.

The gNB may include another downlink control information in the PDCCH including the downlink control information indicating the next PDCCH reception timing. Examples of the other downlink control information may include information on scheduling of the uplink/downlink data, a request for transmitting the CQI, and an instruction for the UE to control power.

Alternatively, the gNB may not include the other downlink control information in the PDCCH including the downlink control information indicating the next PDCCH reception timing for the UE. Consequently, the UE can receive the next PDCCH reception timing from the gNB, even in the absence of, for example, transmission and reception of the uplink/downlink data that the gNB should transmit and receive with the timing and any other downlink control information that should be transmitted from the gNB to the UE. Thus, the UE need not perform any unnecessary operation of receiving the PDCCH.

The gNB may notify a plurality of UEs that perform transmission and reception using the same beam of the next PDCCH reception timing. The plurality of UEs may or may not be all the UEs that perform transmission and reception using the beam. The timing may be notified via the L1/L2 signaling. The timing may be notified to each of the plurality of UEs, or simultaneously notified to all the UEs that use the beam.

An identifier indicating the beam may be used when the timing is simultaneously notified to all the UEs that use the beam. The identifier may be used, for example, in a process of coding the downlink control information. Alternatively, the identifier may be used in a process of modulating the downlink control information. The identifier may be used in both the coding process and the modulating process.

The gNB may multiplex the downlink control signals for a plurality of UEs to transmit the resulting signal. The multiplexing may be used when the timing is notified to each of the plurality of UEs. The multiplexing may be frequency multiplexing, time multiplexing, or a combination of the frequency multiplexing and the time multiplexing. The multiplexing method may be defined in a standard, broadcast from the gNB to the UEs being served thereby in advance, or notified to each of the UEs.

When the timing is notified to each of the plurality of UEs, the gNB may notify the UEs of the same timing or different timings. Notifying a plurality of UEs of the same value enables the gNB to perform flexible scheduling of the plurality of UEs. Even in the absence of transmission and reception of the user data to and from a predefined UE in the beam with the timing, the transmission and reception of the user data with the timing can be allocated to the other UEs in the beam. Consequently, the frequency resources can be efficiently used with the timing.

The gNB may multiplex the downlink control signal for the other UEs with an uplink/downlink signal to be transmitted and received to and from the UE. The uplink/downlink signal may include the downlink control signal for the UE. The multiplexing may be frequency multiplexing, time multiplexing, or a combination of the frequency multiplexing and the time multiplexing. The multiplexing method may be defined in a standard, broadcast from the gNB to the UEs being served thereby in advance, or notified to each of the UEs. Consequently, the gNB can, for example, notify the next PDCCH reception timing of the other UEs as well as transmitting and receiving the uplink/downlink data to and from the UE and notifying the next PDCCH reception timing of the UE. Thus, the frequency resources and the time resources can be efficiently used.

The gNB may not transmit the PDCCH to the UE with the next PDCCH reception timing of the UE. The gNB may not perform uplink/downlink transmission and reception to and from the UE. Consequently, the gNB can reduce the power consumption in the absence of data to be transmitted and received to and from the UE.

The following (1) to (11) will be disclosed as specific examples of information necessary for the gNB to determine the next PDCCH reception timing of the UE:

(1) a channel state, for example, CQI/CSI;
(2) variations in a channel state, for example, variations in CQI/CSI;
(3) buffer occupancy;
(4) variations in buffer occupancy;
(5) target Quality of Service (target QoS);
(6) a difference between the target Quality of Service and the actual Quality of Service;
(7) information on the UEs in a beam, for example, the number of UEs in the beam;
(8) a throughput of the user data to be transmitted from a master eNB to its own gNB;
(9) a throughput of the user data to be transmitted from a high-level network device to its own gNB;
(10) a throughput of the user data to be transmitted from its own gNB to a secondary eNB; and
(11) combinations of (1) to (10) above.

Regarding (1), the gNB may set longer a duration until the timing to the UE when the CQI/CSI to be notified from the UE is inferior. The gNB may set shorter the duration until the timing when the CQI/CSI is superior. Thereby, the gNB may frequently allocate the transmission/reception timing to the UE whose CQI/CSI is superior. Consequently, a throughput of the whole system can be increased. Alternatively, the gNB may set shorter the duration until the timing, for example, when the CQI/CSI is inferior. Since the time for the UE from the initial transmission to the retransmission according to the HARQ can be shortened, the latency caused by the HARQ retransmission can be reduced.

Regarding (2), the gNB sets shorter the duration until the timing to the UE when, for example, the variations in CQI/CSI to be notified from the UE are larger, so that the scheduling by the gNB can promptly follow variations in a communication channel.

Regarding (3), the gNB may use the buffer occupancy for downlink communication or for uplink communication. The buffer occupancy for uplink communication may be obtained from a Buffer Status Report (BSR) to be notified from the UE to the gNB, or may be another value.

Regarding (3), for example, when the buffer occupancy in the UE is greater, the gNB sets shorter the duration until the timing to the UE. Since this increases the communication between the gNB and the UE, a buffer overflow in the UE can be prevented.

The buffer occupancy in (3) may be, for example, a relative value of a buffer occupancy of data for another UE in the downlink communication, or a relative value of a buffer occupancy of another UE in the uplink communication. Since application of the relative value enables setting shorter the duration until the timing to the UE whose buffer occupancy is greater, a buffer overflow in the UE whose buffer occupancy is greater can be prevented.

Regarding (4), the gNB sets shorter the duration until the timing to the UE when, for example, the buffer occupancy in the UE is increasing, so that the scheduling by the gNB can promptly follow increase in the buffer occupancy.

Regarding (5), setting shorter the duration until the timing to the UE that communicates using, for example, the Ultra Reliable and Low Latency Communication (URLLC) service can reduce the latency in the UE.

Regarding (6), when a predefined communication rate cannot be maintained for the UE that communicates using, for example, the enhanced Mobile BroadBand (eMBB) service, the duration until the timing may be set shorter. This can increase the communication rate in the UE and maintain the predefined communication rate.

Regarding (7), for example, when many UEs are in a coverage of a beam, a throughput of each of the UEs can be maintained by setting shorter the duration until the timing to the UE.

Regarding (8), the gNB sets shorter the duration until the timing, for example, to the UEs being served thereby when the user data to be received by the gNB from the master eNB is increasing in the DC, so that the gNB can transmit the user data to the UEs without retaining the user data. Although the master eNB is a LTE base station herein, it may be replaced with a 5G base station, that is, it may be a base station to be a master in the DC, for example, a master gNB.

Regarding (9), the gNB sets shorter the duration until the timing, for example, when the user data to be received by the gNB from the high-level network device is increasing, so that the gNB can transmit the user data to the UE without retaining the user data. Here, the gNB may apply the configuration of the DC. The gNB may be a master base station in the configuration of the DC. The high-level network device may be a high-level network device in the LTE or in the 5G.

Regarding (10), the duration until the timing may be set shorter, for example, when the gNB is a master base station in the DC and the throughput of the user data to be transmitted from the gNB to the secondary eNB is decreasing. Consequently, the occupancy in the gNB can be reduced when the gNB transmits the user data to the UE. Here, the secondary eNB may be replaced with a 5G base station, that is, it may be a secondary base station in the DC, for example, a secondary gNB.

For example, (3) and (7) are combined in (11), a sum of buffer occupancies of the UEs using a beam is calculated, and the duration until the timing is set shorter to a UE using the beam and whose sum of buffer occupancies is greater. Consequently, a buffer overflow in the communication with the UE using the beam can be prevented.

For example, (9) and (10) are combined in (11), and the duration until the timing may be set shorter when a value is increasing: the value is obtained, for example, in a DC configuration where the gNB is a master base station, by subtracting a throughput of the user data to be transmitted from the gNB to the secondary eNB, from a throughput of the user data to be transmitted from the high-level network device to its own gNB. Since the timing can be set using the amount of data to be stored in the gNB, the user data can be transmitted to the UE while the occupancy in the gNB is reduced.

When the gNB notifies the UE of the next PDCCH reception timing, the gNB may notify the UE of the PDCCH reception timing for a predefined duration. There may be a plurality of PDCCH reception timings. The gNB may determine the transmission/reception timing for the duration. The UE performs transmission and reception to and from the gNB with the timing. Consequently, the gNB need not notify the UE of the PDCCH reception timing every time. Even when the gNB cannot communicate with the UE with a PDCCH reception timing, the gNB can communicate with the UE with the next PDCCH reception timing.

The gNB may notify the UE of the predefined duration. Examples of the predefined duration may include the number of times data is transmitted and received to and from the UE until expiration, the number of subframes until the expiration, and the subframe number upon the expiration.

The gNB may notify the UE of the predefined duration and the PDCCH reception timing separately. Alternatively, the gNB may notify the UE of the predefined duration and the PDCCH reception timing simultaneously. The gNB may notify the predefined duration and the PDCCH reception timing, using the same downlink control information or different pieces of downlink control information. The UE may update the predefined duration or the PDCCH reception timing with the notification.

The gNB may directly notify the UE of a value indicating the predefined duration, or predefine several options and notify the UE of an identifier of a selected value. The options may be defined in a standard, or notified from the gNB to the UE in advance. The options to be notified may be broadcast to the UEs being served by the gNB, or notified individually to each of the UEs. The individual notification may be made via the RRC-dedicated signaling. Since the gNB can notify the UE of an identifier of a value selected from the options as the duration, it can notify the duration with less number of bits.

The gNB may notify the UE of the PDCCH reception timings in bitmap format. For example, assuming that the number of subframes until the predefined duration is 10 and that the timing after 1 subframe, the timing after 3 subframes, the timing after 6 subframes, and the timing after 8 subframes are designated as the PDCCH reception timings, the bitmap to be notified to the UE may be 1010010100, where 1 denotes a bit corresponding to each of the timings, and 0 denotes the other bits. Consequently, the PDCCH reception timings can be notified with less number of bits. In the bit map, 1 and 0 may be reversed.

The gNB may be able to change the duration and the PDCCH reception timing for the UE. The gNB may semi-statically or dynamically change the duration and the PDCCH reception timing. The gNB may notify the UE of the duration and the PDCCH reception timing with each PDCCH reception timing for the UE, only when changing the PDCCH reception timing during the duration, or when updating the duration. The gNB preferably updates the duration and the PDCCH reception timing for the UE before expiration of the duration. Consequently, the power waste caused by the UE performing the operation of receiving the PDCCH in each subframe can be avoided. Alternatively, the gNB may notify the UE of the duration and the PDCCH reception timing soon after expiration of the duration.

The gNB may semi-statically or dynamically notify the UE of the duration and the PDCCH reception timing. The semi-static notification may be made via, for example, the RRC-dedicated signaling. The dynamic notification may be made, for example, via the MAC control signal or via the L1/L2 signaling. The duration and the PDCCH reception timing may be notified using the same method or different methods. Alternatively, both of the methods may be used in combination. For example, the gNB notifies the UE of the duration via the RRC-dedicated signaling and of the PDCCH reception timing via the L1/L2 signaling. Consequently, the dynamic change in the timing during the duration can be made with less amount of signaling.

The aforementioned (1) to (11) disclosed as the specific examples of the information necessary for determining the transmission/reception timing may be used as information necessary for the gNB to determine the duration and the PDCCH reception timing.

Figure 10:
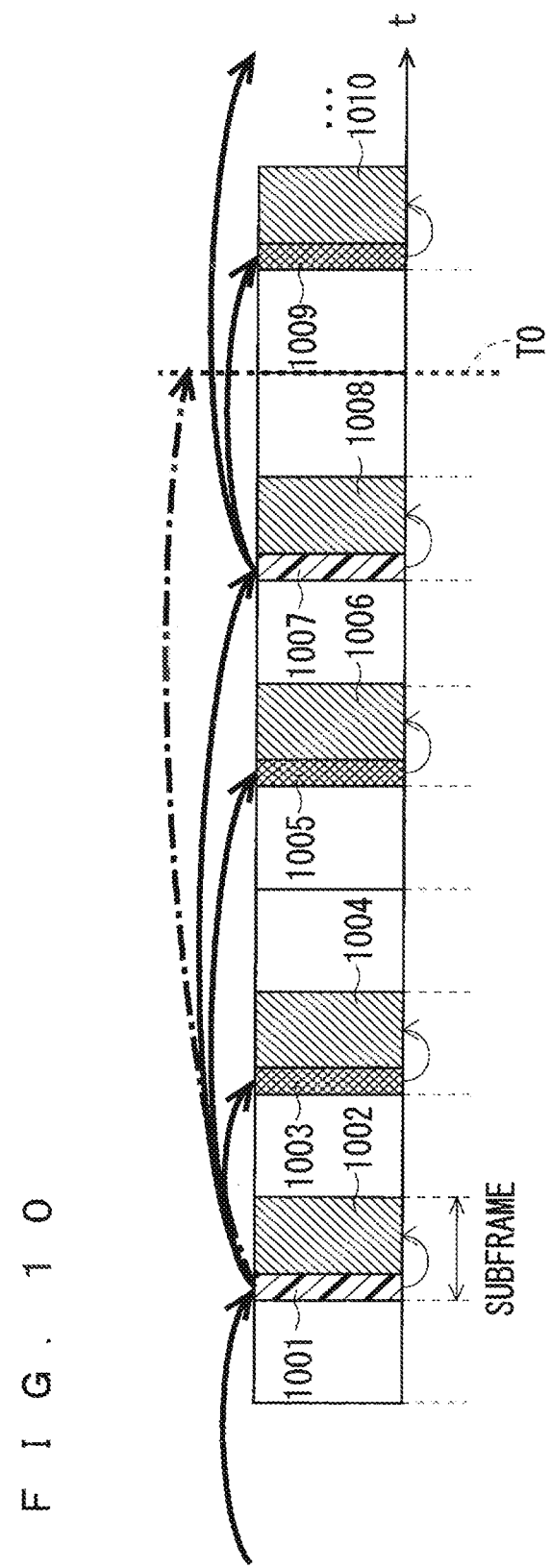
FIG. 10 illustrates one example where the gNB notifies the UE of the PDCCH reception timing for a predefined duration and the UE transmits and receives the uplink/downlink data.

FIG. 10 illustrates one example where the gNB notifies the UE of the PDCCH reception timing for a predefined duration and the UE transmits and receives the uplink/downlink data. FIG. 10 illustrates notification of the duration and the PDCCH reception timing using the downlink control information transmitted from the gNB to the UE. Portions denoted by references 1001 and 1007 in FIG. 10 represent downlink control signals for notifying the predefined duration and the PDCCH reception timing for the UE, among downlink control signals that the UE receives from the gNB.

Portions denoted by references 1003, 1005, and 1009 represent the downlink control signals that the UE receives from the gNB. Portions denoted by references 1002, 1004, 1006, 1008, and 1010 represent pieces of user data that the UE transmits and receives to and from the gNB. Thick solid-line arrows represent information on the PDCCH reception timing of the UE. A thick dotted line represents a predefined duration TO. A thick alternate long and short dashed line represents information on the predefined duration TO in the downlink control signal. Thin solid-line arrows represent scheduling information for transmitting and receiving the pieces of user data in the subframes. The downlink control signals 1001, 1003, 1005, 1007, and 1009 may or may not include the scheduling information for transmitting and receiving the pieces of user data 1002, 1004, 1006, 1008, and 1010, respectively, in the corresponding subframes. FIG. 10 illustrates the case where the downlink control signals 1001, 1003, 1005, 1007, and 1009 include the scheduling information for transmitting and receiving the pieces of user data 1002, 1004, 1006, 1008, and 1010, respectively, in the corresponding subframes.

In FIG. 10, the UE receives the downlink control signals 1001, 1003, 1005, 1007, and 1009. Among them, the downlink control signals 1001 and 1007 store not only the scheduling information for transmitting and receiving the pieces of user data in the subframes, but also information on the predefined duration and information on the PDCCH reception timing during the predefined duration. The UE obtains PDCCH reception information, and receives the downlink control signals 1003, 1005, and 1009 that are subsequent to the downlink control signals 1001 and 1007 that store the obtained information. The UE transmits and receives the pieces of user data 1002, 1004, 1006, 1008, and 1010, using the scheduling information obtained from the downlink control signals 1001, 1003, 1005, 1007, and 1009, respectively.

In FIG. 10, the gNB may notify the UE of the PDCCH reception timings in the downlink control signals 1003, 1005, and 1009. The gNB may also notify the predefined duration. This increases the redundancy in the notification of the PDCCH reception timing for the UE. Thus, the reliability for notification of the PDCCH reception timing can be improved.

In FIG. 10, the gNB may not notify the UE of the PDCCH reception timings in the downlink control signals 1003, 1005, and 1009. Consequently, the number of bits of the downlink control signals can be saved.

For another example of notification of the PDCCH reception timing from the gNB to the UE, the gNB may notify the UE of a timing with which an operation of receiving the PDCCH from the gNB is unnecessary (hereinafter will be referred to as a "PDCCH reception unnecessary timing"). The gNB may notify the PDCCH reception unnecessary timing together with the predefined duration. The UE may perform the operation of receiving the PDCCH from the gNB, in a subframe excluding the PDCCH reception unnecessary timing.

Similarly as in the notification of the PDCCH reception timing during the predefined duration, the PDCCH reception unnecessary timing may be notified as a subframe number, as the number of subframes counted from the current time, or in bitmap format.

The gNB may designate, as the PDCCH reception unnecessary timing, a subframe in which scheduling for the other UEs has already been determined. Consequently, the gNB can perform flexible scheduling for the UE within the subframes excluding the PDCCH reception unnecessary timing.

For another example of notification of the PDCCH reception timing from the gNB to the UE, the gNB may set a PDCCH reception period to the UE. The PDCCH reception period may be notified per subframe or per another unit. The first embodiment differs from Reference 1 in disclosing a method for setting the PDCCH reception period.

In setting the PDCCH reception period, the gNB may also set a validity period of the PDCCH reception period to the UE. The validity period may be set similarly as setting the predefined duration.

The gNB may notify the UE of an offset of the PDCCH reception timing together with the PDCCH reception period. The offset may be notified as a subframe number, as a remainder obtained by dividing the subframe number by the period, or a time until the next PDCCH reception timing in the UE. The time may be notified per subframe or per another unit.

The gNB may notify the UE of a timing with which the PDCCH reception period and the offset are validated, together with the PDCCH reception period and the offset. The gNB may notify the timing to be validated as a subframe number or a time from the notification to the validation.

The gNB may notify the UE of the PDCCH reception period, the offset, and the timing to be validated separately or of at least two of the PDCCH reception period, the offset, and the timing to be validated simultaneously.

The gNB may directly notify the UE of a value indicating the PDCCH reception period, or predefine several options and notify the UE of an identifier of a selected value. The options may be defined in a standard, or notified from the gNB to the UE in advance. The options to be notified may be broadcast to the UEs being served by the gNB, or notified individually to each of the UEs. The individual notification may be made via the RRC-dedicated signaling. Since the gNB can notify the UE of an identifier of a value selected from the options as the PDCCH reception period by individually notifying the options, it can notify the PDCCH reception period with less number of bits. The same may hold true for the offset and the timing to be validated.

The gNB may semi-statically or dynamically notify the UE of the PDCCH reception period, the offset, and the timing to be validated. The semi-static notification may be made via, for example, the RRC-dedicated signaling. The dynamic notification may be made, for example, via the MAC control signal or via the L1/L2 signaling. The PDCCH reception period, the offset, and the timing to be validated may be notified using the same method or different methods. Alternatively, both of the methods may be used in combination.

The gNB may notify the UE of the PDCCH reception timing in a predefined period. The notification may be made using, for example, a bitmap. In the bitmap, the predefined period may be represented by the number of bits. Furthermore, "1" may be associated with the PDCCH reception timing, and "0" may be associated with the other subframes. The positions of the bits may be associated with remainders each obtained by dividing the subframe number by the predefined period. For example, when the predefined period is 4 subframes and the remainders obtained by dividing the subframe numbers by the predefined period are 0, 1, and 3 as the PDCCH reception timings of the UE, the gNB may notify the UE of "1101" as the bitmap. Consequently, allocation of the PDCCH reception timing from the gNB to the UE can be performed flexibly.

The gNB may distribute the PDCCH reception timings to different UEs in different proportions.

For example, assuming a subframe whose remainder obtained by dividing the subframe number by 3 is 0 or 1 as the PDCCH reception timing of the UE #1, a subframe whose remainder obtained by dividing the subframe number by 6 is 4 as the PDCCH reception timing of the UE #2, and a subframe whose remainder obtained by dividing the subframe number by 6 is 5 as the PDCCH reception timing of the UE #3, bitmaps that the gNB notifies the UE #1, the UE #2, and the UE #3 may be "110", "000010", and "000001", respectively. Consequently, the PDCCH reception timings can be allocated flexibly to the different UEs.

The aforementioned (1) to (11) disclosed as the specific examples of the information necessary for determining the PDCCH reception timing may be used as information necessary for the gNB to determine the predefined period, the offset, and the timing to be validated.

The UE may perform the operation of receiving the PDCCH transmitted from the gNB in each subframe. The trigger for the UE to perform the operation of receiving the PDCCH in each subframe may be, for example, a lapse of the PDCCH reception timing of the UE, the absence of the PDCCH reception timing of the UE, the expiration of the predefined duration, failure of normal receipt of the downlink control signal from the gNB, or failure of normal receipt of the downlink user data from the gNB. The operation of receiving the PDCCH in each subframe by the UE enables the UE to receive the downlink control signal for its own UE from the gNB and restore or continue the communication with the gNB.

The gNB may retransmit the downlink user data for the UE with the PDCCH reception timing next to transmission of the initial transmission data. Alternatively, the gNB may perform the retransmission to the UE in a subframe next to the timing with which the initial transmission data has been transmitted, regardless of the next PDCCH reception timing. The UE may receive the retransmission with the PDCCH reception timing next to the initial transmission, or in a subframe next to that for the initial transmission. Alternatively, the UE may receive the retransmission data from the gNB through reception of the PDCCH in each subframe. The gNB performs retransmission in a subframe next to that for the initial transmission, which can reduce the latency for Nack in the communication between the gNB and the UE. For example, when the UE cannot successfully receive the RRC signaling or the MAC control information to be used for notification of the next PDCCH reception timing, the UE can obtain the PDCCH reception timing in the next subframe.

The gNB may notify, in advance, the UE of information indicating whether the gNB uses, for retransmission, the subframe next to that for the initial transmission. Alternatively, the information may be defined in a standard. The gNB may make the notification by broadcasting it to the UEs being served thereby or by transmitting the RRC-dedicated signaling to the UE. The UE may determine, using the notification, whether to receive the retransmission in the subframe next to that for the initial transmission.

The gNB may determine whether to apply the subframe next to that for the initial transmission to the retransmission to the UE, using information on the beam of which coverage the UE is in. The information on the beam may be, for example, the number of UEs that are in a coverage of the beam. For example, when many UEs are in a coverage of the beam, the subframe next to that for the initial transmission may not be applied to the retransmission to the UE. This can prevent, for example, retransmission to the UE from causing congestion of data to be transmitted and received to and from the other UEs.

For another example, the gNB may determine whether to apply the subframe next to that for the initial transmission to the retransmission to the UE, using information on a service to be adopted by the UE. For example, when the UE uses a URLLC service, the subframe next to that for the initial transmission may be applied to the retransmission to the UE. Consequently, requirements in a service to be adopted by the UE, for example, the low latency in URLLC can be satisfied.

The retransmission to the UE may be performed in the subframe after the designated subframes, instead of the subframe next to that for the initial transmission. Consequently, even when the gNB performs retransmission to the UE, communication with the other UEs can be continued.

The values of the designated subframes may be determined in a standard, broadcast from the gNB to the UEs being served thereby, or notified to each of the UEs via the RRC signaling. The gNB may determine the values of the designated subframes, using information on the beam to be used by the UE or using information on the service to be adopted by the UE.

The gNB may perform transmission and reception with the other UEs with the next PDCCH reception timing of the UE. The transmission and reception with the other UEs may mean, for example, retransmission from the other UEs or communication with high priority. The priority may be determined in a standard or determined by the gNB, depending on, for example, a type of the service to be adopted by the UE.

The gNB may not transmit, with the PDCCH reception timing, the L1/L2 signaling to the UE, that is, to the UE interrupted by the other UEs with the PDCCH reception timing. The UE may return to operations of consecutively receiving the PDCCH in each subframe, or perform the operation of receiving the PDCCH from the gNB with a PDCCH reception timing next to the PDCCH reception timing.

The gNB may notify the UE of the PDCCH reception timing after the next. The notification may be made via the L1/L2 signaling. The gNB may multiplex the L1/L2 signaling for the UE with the L1/L2 signaling for the other UEs to transmit the resulting LT/L2 signaling. The multiplexing may be, for example, time multiplexing using different symbols, spatial multiplexing using a plurality of beams, or both the time multiplexing and the spatial multiplexing in combination. In the time multiplexing, the L1/L2 signaling for the UE may precede the L1/L2 signaling for the other UEs, or the L1/L2 signaling for the other UEs may precede the L1/L2 signaling for the UE. Which one of the L1/L2 signalings the gNB determines to use earlier may be predefined in a standard. Each of the UE and the other UEs may receive the L1/L2 signaling for its own UE from the gNB based on the standard.

The gNB may notify the UE of the next PDCCH reception timing using a beam sweeping block. The gNB may also notify an identifier indicating the UE together with the timing when notifying the timing using the beam sweeping block. The UE may obtain the next PDCCH reception timing by receiving the beam sweeping block. The UE may receive the beam sweeping block upon interruption of the other UEs with the PDCCH reception timing as a trigger, or may always receive the beam sweeping block. Upon obtainment of the PDCCH reception timing from the beam sweeping block as a trigger, the UE may stop receiving the PDCCH consecutively in each subframe. Since the UE need not receive the PDCCH consecutively in each subframe after the beam sweeping block, the power consumption of the UE can be reduced.

The gNB may notify a UE different from the UE of the PDCCH reception timing using a beam sweeping block. The notification to the different UE is preferably made using a beam sweeping block earlier than the next PDCCH reception timing for the different UE. Consequently, the different UE can perform transmission and reception with the gNB with the timing earlier than the PDCCH reception timing of its own UE.

Reception of the downlink control information by the UE with a designated timing, periodical reception of the downlink control information by the UE, and reception of the downlink control information by the UE in each subframe that are described in the first embodiment may be switchable. The gNB may notify the UE of an instruction for switching between the methods for receiving a downlink control channel. Upon the notification, the UE may switch between the methods for receiving the downlink control information. The notification may include an identifier indicating one of the reception methods. The gNB may make the notification to the UE semi-statically via the RRC-dedicated signaling, dynamically via the MAC control signal, or dynamically via the L1/L2 signaling.

The methods described in the first embodiment may be applied to the communication of the uplink data. Here, the details to be notified from the gNB to the UE may be the same as those in the communication of the downlink data. The uplink grant may also be notified to the UE in the communication of the uplink data.

The gNB may notify the UE of Ack/Nack with the PDCCH reception timing next to reception of the initial transmission data by the UE. The gNB may notify the UE of Ack/Nack and the grant simultaneously or separately. The UE may transmit, using the Ack/Nack notification and the grant, the uplink data to the gNB in a subframe identical to or different from that in which the grant has been received.

The gNB may notify the UE of Ack/Nack in a subframe next to the subframe in which the UE has received the initial transmission data, regardless of the next PDCCH reception timing of the UE. The UE may receive Ack/Nack from the gNB in the next subframe. A subframe after a predefined number of subframes may be used instead of the next subframe. The predefined number of subframes may be defined in a standard, broadcast from the gNB to the UEs being served thereby, or notified from the gNB to the UE via the RRC-dedicated signaling.

The gNB may notify the UE of the grant in a subframe after a predefined number of subframes with respect to a subframe in which the gNB has transmitted Ack/Nack to the UE, regardless of the next PDCCH reception timing. The predefined number of subframes may be a value of 0, 1, or 2 or more. When the predefined number of subframes is 0, the gNB may notify the grant in the same subframe in which the gNB has transmitted Ack/Nack. The predefined number of subframes may be defined in a standard, broadcast from the gNB to the UEs being served thereby, or notified from the gNB to the UE via the RRC-dedicated signaling.

The UE may transmit the retransmission data to the gNB in a subframe after a predefined number of subframes with respect to a subframe in which the gNB has transmitted the grant to the UE, regardless of the next PDCCH reception timing. The predefined number of subframes may be a value of 0, 1, or 2 or more. When the predefined number of subframes is 0, the UE transmits the retransmission data in the same subframe in which the UE has received the grant.

The predefined number of subframes may be defined in a standard, broadcast from the gNB to the UEs being served thereby, or notified from the gNB to the UE via the RRC-dedicated signaling. The predefined number of subframes is preferably identical to the number of subframes between the grant in the initial transmission and the initial transmission data.

The gNB may include the Ack/Nack information in an uplink grant for the UE. In other words, the gNB may include Ack/Nack in response to the reception of the previous uplink signal from the UE, in a notification of the grant to the UE which will be used for receiving the next uplink signal. The UE may perform initial transmission or retransmission of the next user data, using the Ack/Nack.

The gNB may not notify the UE of Ack. The UE may regard the uplink data as being accurately received by the gNB, using the absence of reception of Ack/Nack in response to the uplink data for a predefined time. The predefined time may be defined in a standard, broadcast from the gNB to the UEs being served thereby, or notified to each of the UEs via the RRC-dedicated signaling. The gNB may determine the predefined time using a service to be adopted by the UE. For example, a shorter time may be set to the UE using the URLLC than that to be set to the UE using the eMBB.

The method for including Ack/Nack in the uplink grant may be used in combination with the method for preventing notification of Ack to the UE. Consequently, the UE can know that the gNB has successfully received the last piece of uplink user data, without any need of receiving the grant from the gNB even when finishing transmitting the consecutive pieces of uplink user data. Since the gNB need not notify the UE of Ack in response to the last piece of uplink user data, the communication resources are saved.

Figure 11:
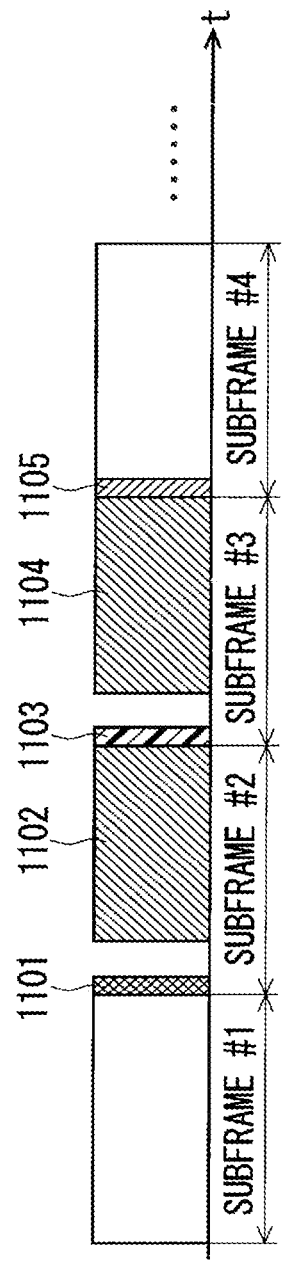
FIG. 11 illustrates transmission/reception channels in the uplink communication when the notification of Ack/Nack and the retransmission are performed in a subframe next to the uplink initial transmission.

FIG. 11 illustrates transmission/reception channels in the uplink communication when the notification of Ack/Nack and the retransmission are performed in a subframe next to the uplink initial transmission. A portion denoted by a reference 1101 in FIG. 11 represents the downlink control information including a grant to be notified from the gNB to the UE. Portions denoted by references 1102 and 1104 represent pieces of uplink user data from the UE. A portion denoted by a reference 1103 represents the downlink control information including Nack and a grant that are to be notified from the gNB to the UE. A portion denoted by a reference 1105 represents the downlink control information including Ack to be notified from the gNB to the UE.

FIG. 11 illustrates that the piece of uplink user data in response to the grant is transmitted in the same subframe as that for the grant, Ack/Nack in response to the piece of uplink user data is transmitted in the next subframe, Nack and a grant for retransmission are transmitted in the same subframe, and the retransmission is performed in the same subframe as that for Nack.

The subframe #2 in FIG. 11 is allocated as the PDCCH reception timing of the UE. In the subframe #2, the gNB notifies the UE of the downlink control information 1101 including the grant. The UE transmits the piece of uplink user data 1102 to the gNB in the subframe #2 identical to that for the downlink control information 1101 including the grant.

In FIG. 11, when the gNB cannot accurately receive the piece of uplink user data 1102, the gNB allocates the subframe #3 to the UE, and notifies the UE of the downlink control information 1103 including Nack and the grant for retransmission. The UE receives the downlink control information 1103 including Nack and the grant for retransmission in the subframe #3, and obtains Ack/Nack from the received downlink control information. Upon receipt of the notification of the Nack from the gNB, the UE transmits the piece of uplink user data 1104 in the subframe #3.

In the subframe #4 in FIG. 11, the gNB notifies the UE of the downlink control information 1105 including Ack. In the subframe #4, the UE receives the downlink control information 1105 including Ack, and obtains Ack/Nack from the received downlink control information.

In the uplink communication according to the first embodiment, the gNB may allocate the subframe in which Ack is to be notified to the UE, to the other UEs or to the UE.

During the allocation to the other UEs, the gNB may multiplex Ack/Nack for the UE with the downlink control signal for the other UEs to transmit the resulting signal. The multiplexing may be time multiplexing using different symbols or frequency multiplexing in the same symbol. Alternatively, the time multiplexing may be combined with the frequency multiplexing. In the time multiplexing, notification of Ack/Nack for the UE may precede the L1/L2 signaling for the other UEs, or the L1/L2 signaling for the other UEs may precede the Ack/Nack for the UE. Which one of the signals the gNB determines to notify earlier may be predefined in a standard. Each of the UE and the other UEs may receive the signal for its own UE from the gNB based on the standard.

The gNB may perform, with the PDCCH reception timing, the same operations as those in the downlink transmission as operations for the UE, that is, operations for the UE that are interrupted by the other UEs with the PDCCH reception timing. In other words, the gNB may not transmit the L1/L2 signaling to the UE, may notify the UE of the PDCCH reception timing after the next, or may notify the UE of the next PDCCH reception timing using a beam sweeping block. The UE may consecutively perform reception in each subframe, receive the PDCCH reception timing after the next, or receive the beam sweeping block.

According to the first embodiment, the UE may detect a radio link failure (RLF) when the UE belongs to another beam, another transmission reception point (TRP), or another cell before the next PDCCH reception timing. Alternatively, the UE may receive the beam sweeping block. Upon receipt of the beam sweeping block, the UE may perform a random access procedure on the gNB using the received beam.

The gNB may use the same PDCCH reception timing or different PDCCH reception timings for a moving source beam and a moving target beam.

The gNB may use the same PDCCH reception timing or different PDCCH reception timings for a moving source TRP and a moving target TRP. The moving target TRP may request the moving source TRP to notify the PDCCH reception timing used in the moving source TRP. The moving target TRP may simultaneously make the request to TRPs in the gNB. The moving source TRP may notify the moving target TRP of the PDCCH reception timing.

The gNB may use the same PDCCH reception timing or different PDCCH reception timings for a moving source cell and a moving target cell. The moving target cell may request the moving source cell to notify the PDCCH reception timing used in the moving source cell. The request may be made using an interface between the cells. The moving source cell may notify the moving target cell of the PDCCH reception timing.

The methods described in the first embodiment can save the power consumption and the radio resources that are required for the UE to receive the downlink control signal in the communication with the gNB via multi-beams. The prompt retransmission after Nack can reduce the latency in the communication with the gNB.

In other words, a base station device (gNB) notifies a communication terminal device (UE) of information on the next PDCCH reception timing, according to the first embodiment. The communication terminal device performs reception based on the information on the next PDCCH reception timing that has been notified from the base station device. Consequently, the communication terminal device can receive the information transmitted from the base station device with the notified PDCCH reception timing. Thus, the power consumption and the radio resources that are required for the reception can be saved. Since retransmission can be promptly performed when the retransmission is necessary, the latency in the communication between the base station device and the communication terminal device can be reduced. Thus, increase in the power consumption of the communication terminal device, degradation in the communication quality, and reduction in the use efficiency of the radio resources can be suppressed.

Particularly, the base station device (gNB) and the communication terminal device (UE) perform transmission and reception by switching the directivity of a beam emitted from an antenna, according to the first embodiment. Notification of information on the next reception timing from the base station device to the communication terminal device can prevent the communication terminal device from performing reception when the beam is directed in a direction different from that for the communication terminal device. Thus, increase in the power consumption of the communication terminal device, degradation in the communication quality, and reduction in the use efficiency of the radio resources can be suppressed.

The methods described in the first embodiment may be applied to a communication system that can switch between beams per symbol. The methods may also be applied to a communication system that can communicate simultaneously using a plurality of beams. The methods may also be applied to a combined communication system of the aforementioned two communication systems. Switching between beams per symbol enables the UEs belonging to different beams to be notified of the PDCCH reception timing in the same subframe, which can increase the flexibility in the scheduling of the gNB. The communication simultaneously using a plurality of beams will also produce the same advantage.

The methods described in the first embodiment may be applied to a gNB with a single beam, that is, a gNB that does not perform beam sweeping. The application of the methods to the gNB with the single beam can reduce the interference with the other gNBs.

Second Embodiment

The physical control channel to which uplink control information (UCI) is to be mapped is the PUCCH in the LTE. The PUCCH resources are set to each UE. For example, the scheduling request (SR) configuration such as the PUCCH resources for SR and the SR period is set to each UE (see 3GPP TS 36.211 V14.0.0 (hereinafter referred to as "Reference 3") and 3GPP TS 36.213 V14.0.0 (hereinafter referred to as "Reference 4"). The RRC signaling is used in these settings (see 3GPP TS 36.331 V14.0.0 (hereinafter referred to as "Reference 5")).

Multi-beamforming (MBF) requiring the beam sweeping is being studied in the NR. The MBF requiring the beam sweeping requires switching between beams to cover all the coverages. Since one subframe is solely used for transmitting and receiving one beam, the subframe cannot be used for transmitting and receiving the other beams. Thus, the conventional LTE setting method for configuring PUCCH resources for a plurality of UEs in one subframe has a problem in that the PUCCH of the UE existing in the beam for which the coverage is not formed in the subframe cannot be transmitted and received.

To solve such a problem, 3GPP proposes providing PUCCH resources in different symbols for each beam in the operations of the MBF (see 3GPP R1-1609740 (hereinafter referred to as "Reference 6")). Although 3GPP discloses setting the PUCCH resources to each symbol, it fails to disclose the setting method. 3GPP fails to disclose, for example, which symbol is allocated to which beam for the PUCCH, and how the symbol is allocated for each UE.

Thus, the UE existing in each beam cannot recognize the transmission timing and the resources for the PUCCH in the beam through which its own UE is communicating. When the reception timing and the resources for the PUCCH in the cell are not aligned with the transmission timing and the resources for the PUCCH in the UE via the beam through which the UE is communicating, a problem of the transmission/reception failure of the PUCCH occurs.

The second embodiment will disclose a method for solving such a problem.

A method for allocating the resources for the PUCCH will be disclosed. The resources are allocated for the PUCCH for each beam. Subframes and symbols are allocated as the PUCCH resources for each beam. The symbols may be allocated using symbol numbers. The symbol numbers to be set in a subframe may be used. Alternatively, the maximum number of symbols for the PUCCH resources that are to be allocated to a subframe may be determined. The symbol numbers may be renumbered with the maximum number of symbols. Consequently, the amount of information indicating the symbol numbers, for example, the number of bits can be reduced.

The PUCCH resources for each UE are allocated from the PUCCH resources of the beam in which the UE exists. In other words, the PUCCH resources for each UE are allocated on the PUCCH resources for each beam, and multiplexed.

The PUCCH resources for each UCI for each UE may be allocated from the PUCCH resources of the beam in which the UE exists. In other words, the PUCCH resources for each UCI for each UE may be allocated on the PUCCH resources for each beam, and multiplexed. In a subframe, a beam for transmitting and receiving a symbol of a PUCCH resource may be different from a beam for transmitting and receiving a symbol different from the symbol.

A method for setting the PUCCH resources for each beam will be disclosed. A subframe to which the PUCCH for each beam is allocated is set using a period and an offset, and a symbol to which the PUCCH is allocated is set using a symbol number.

Figure 12:
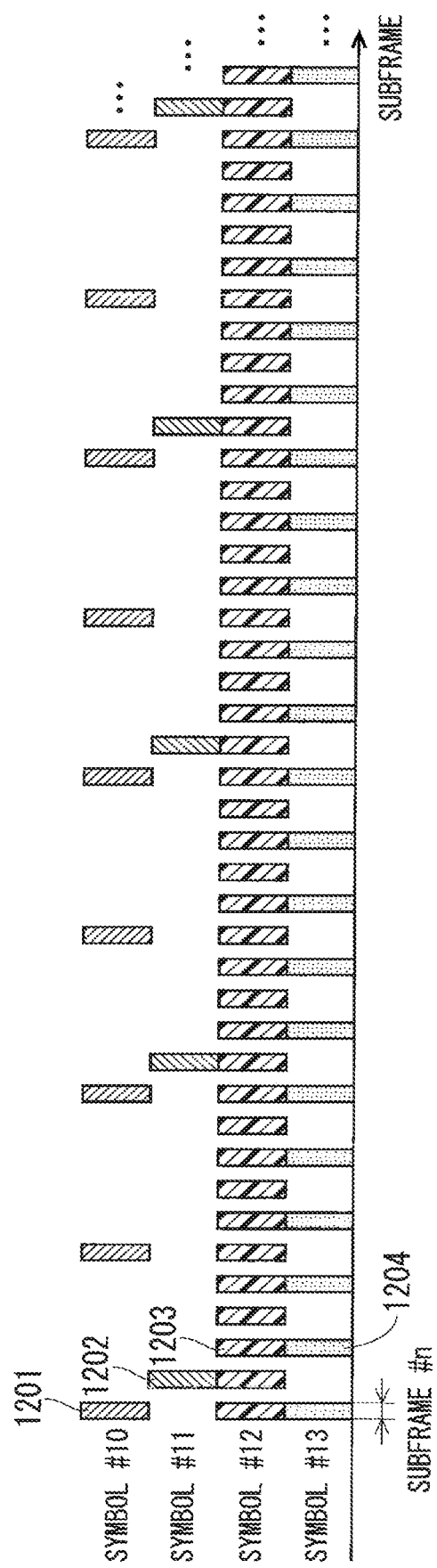
FIG. 12 illustrates one example method for setting the PUCCH resources for each beam using a period, an offset, and a symbol number.

FIG. 12 illustrates one example method for setting the PUCCH resources for each beam using a period, an offset, and a symbol number. A case where the number of times the beam sweeping is performed is four will be described herein. The number of times the beam is switched to cover a predefined coverage is equal to the number of times the beam sweeping is performed.

A resource 1201 whose period is 5 subframes, whose offset is 0 subframe, and whose symbol number in the subframes is 10 is set as a PUCCH resource with a beam number 0. Consequently, the PUCCH with the beam number 0 is allocated to the resource 1201 whose period is 5 subframes and whose symbol number in the subframes is 10 (the symbol #10), in subframes whose offset from a reference subframe number, for example, a subframe with the subframe number 0 is 0. The reference subframe number may be preset. The reference subframe number may be predetermined in, for example, a standard.

Similarly, a resource 1202 whose period is 10 subframes, whose offset is 1 subframe, and whose symbol number in the subframes is 11 is set as a PUCCH resource with a beam number 1. Consequently, the PUCCH with the beam number 1 is allocated to the resource 1202 whose period is 10 subframes and whose symbol number in the subframes is 11 (the symbol #11), in subframes whose offset from a subframe with the reference subframe number is 1.

Similarly, a resource 1203 whose period is 1 subframe, whose offset is 0 subframe, and whose symbol number in the subframes is 12 is set as a PUCCH resource with a beam number 2. Consequently, the PUCCH with the beam number 2 is allocated to the resource 1203 whose period is 1 subframe and whose symbol number in the subframes is 12 (the symbol #12), in subframes whose offset from the subframe with the reference subframe number is 0.

Similarly, a resource 1204 whose period is 2 subframes, whose offset is 0 subframe, and whose symbol number in the subframes is 13 is set as a PUCCH resource with a beam number 3. Consequently, the PUCCH with the beam number 3 is allocated to the resource 1204 whose period is 2 subframes and whose symbol number in the subframes is 13 (the symbol #13), in subframes whose offset from the subframe with the reference subframe number is 0.

Consequently, the PUCCH resource for each beam is periodically allocated. When the subframe number is counted per radio frame and the radio frame number is counted per system frame, the periodical settings may be renumbered using not only the subframe number but also the radio frame number and the system frame number.

The symbol to which the PUCCH for each beam is allocated may be set from the end of a subframe. When the DL resources are provided, the number of gaps can be minimized by allocating, to the DL, a symbol before the symbol to which the PUCCH is allocated.

Although the number of symbols to which the PUCCH is allocated for each beam is one, the number of symbols may be two or more. With the plurality of symbols, the received power of the PUCCH by the cell can be increased, and the reception quality of the PUCCH can be improved. The number of PUCCHs to be multiplexed in a beam can be increased.

Although a case where the beam is switched per beam is described, the beam may be switched per a plurality of beams. When communication is possible using a plurality of beams with the same timing, the spatially multiplexing can be performed between the plurality of beams. Thus, the same resource may be allocated to the PUCCH per a plurality of beams that enable communication with the same timing.

Another method for setting the PUCCH resources for each beam will be disclosed. The PUCCHs as many as the number of times the beam sweeping is performed are set within k subframes. Here, k is a natural number.

Figure 13:
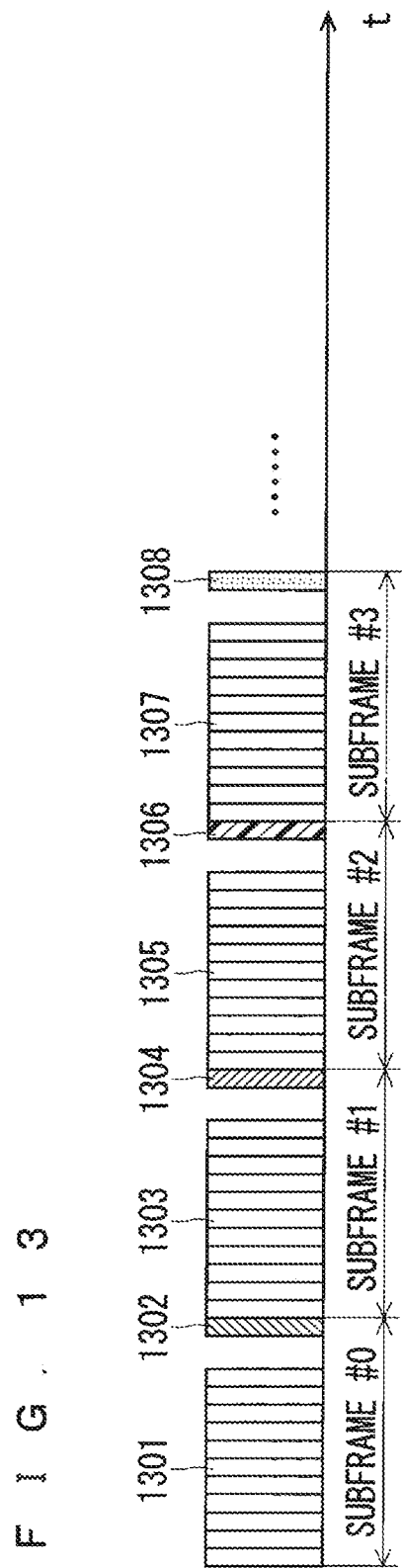
FIG. 13 illustrates one example method for setting the PUCCHs as many as the number of times the beam sweeping is performed within k subframes.

FIG. 13 illustrates one example method for setting the PUCCHs as many as the number of times the beam sweeping is performed within k subframes. A case where the number of times the beam sweeping is performed is four will be described herein. For example, k=the number of times the beam sweeping is performed. The PUCCH of each beam is repeatedly allocated to the last symbols 1302, 1304, 1306, and 1308 in the consecutive subframes as many as the number of times the beam sweeping is performed. Here, the number of symbols to be allocated to the PUCCH resources is 1 within 1 subframe. The symbol numbers to be allocated to the PUCCH resources may be fixed.

Any signal of any beam or a non-transmission section is allocated to symbols 1301, 1303, 1305, and 1307. Downlink or uplink may be allocated. For example, a downlink signal with the beam number 0 is allocated to the symbol 1301. A downlink signal with the beam number 1 is allocated to the symbol 1303. A downlink signal with the beam number 2 is allocated to the symbol 1305. A downlink signal with the beam number 3 is allocated to the symbol 1307.

The beams from the beam numbers 0 to 3 are swept. The PUCCH with the beam number 0 is allocated to a subframe number n and a symbol number 13 (1302). The PUCCH with the beam number 1 is allocated to a subframe number n+1 and a symbol number 13 (1304). The PUCCH with the beam number 2 is allocated to a subframe number n+2 and a symbol number 13 (1306). The PUCCH with the beam number 3 is allocated to a subframe number n+3 and a symbol number 13 (1308). Here, n is an integer larger than or equal to 0.

The PUCCH of each beam is repeatedly allocated to the last symbols 1302, 1304, 1306, and 1308 for each of subframes as many as the number of times the beam sweeping is performed. When the subframe number is counted per radio frame and the radio frame number is counted per system frame, the PUCCHs may be renumbered to be repeatedly allocated using not only the subframe number but also the radio frame number and the system frame number.

Consequently, the PUCCHs of all beams can be allocated to the subframes as many as the number of times the beam sweeping is performed. Thus, the PUCCH of each beam can be transmitted and received at least once in the subframes as many as the number of times the beam sweeping is performed.

Figure 14:
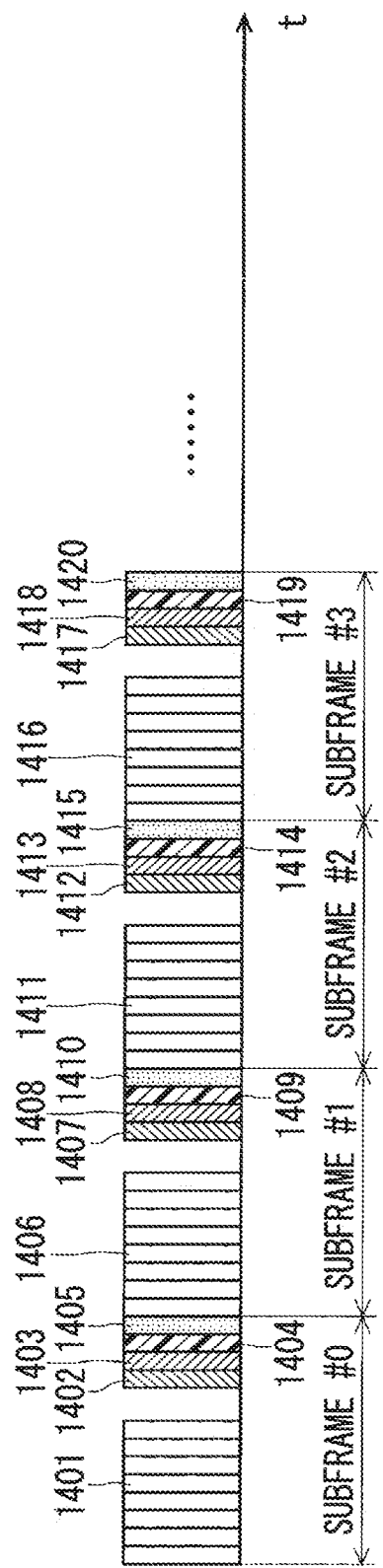
FIG. 14 illustrates another example method for setting the PUCCHs as many as the number of times the beam sweeping is performed within k subframes.

FIG. 14 illustrates another example method for setting the PUCCHs as many as the number of times the beam sweeping is performed within k subframes. A case where the number of times the beam sweeping is performed is four will be described herein. For example, k=1. The PUCCHs of all beams are allocated to one subframe, and are repeatedly allocated per subframe (1402 to 1405, 1407 to 1410, 1412 to 1415, and 1417 to 1420). In other words, the PUCCHs are repeatedly allocated to each subframe. The number of symbols to be allocated to the PUCCH resource for each beam is 1 within 1 subframe. The symbol numbers to be allocated to the PUCCH resources may be fixed. The symbols as many as the number of times the beam sweeping is performed are allocated from the end of one subframe.

Any signal of any beam or a non-transmission section is allocated to symbols 1401, 1406, 1411, and 1416. Downlink or uplink may be allocated. For example, a downlink signal with the beam number 0 is allocated to the symbol 1401. A downlink signal with the beam number 1 is allocated to the symbol 1406. A downlink signal with the beam number 2 is allocated to the symbol 1411. A downlink signal with the beam number 3 is allocated to the symbol 1416.

The beams from the beam numbers 0 to 3 are swept. The PUCCH with the beam number 0 is allocated to a subframe number n and a symbol number 10 (1402, 1407, 1412, and 1417). The PUCCH with the beam number 1 is allocated to the subframe number n and a symbol number 11 (1403, 1408, 1413, and 1418). The PUCCH with the beam number 2 is allocated to the subframe number n and a symbol number 12 (1404, 1409, 1414, and 1419). The PUCCH with the beam number 3 is allocated to the subframe number n and a symbol number 13 (1405, 1410, 1415, and 1420). Here, n is an integer larger than or equal to 0.

Consequently, the PUCCH resources for all beams are allocated to different symbols in the same subframe. Consequently, the PUCCHs of all beams can be included in each subframe. For example, the SR period of the SR to be transmitted with the PUCCH can be set per subframe. Specifically, when the subframe is 1 ms long, the SR period can be set to 1 ms. Since this can shorten the time from when the UE has data to be transmitted to transmission of the SR, the latency until start of transmission of the data can be shortened.

Figure 15:
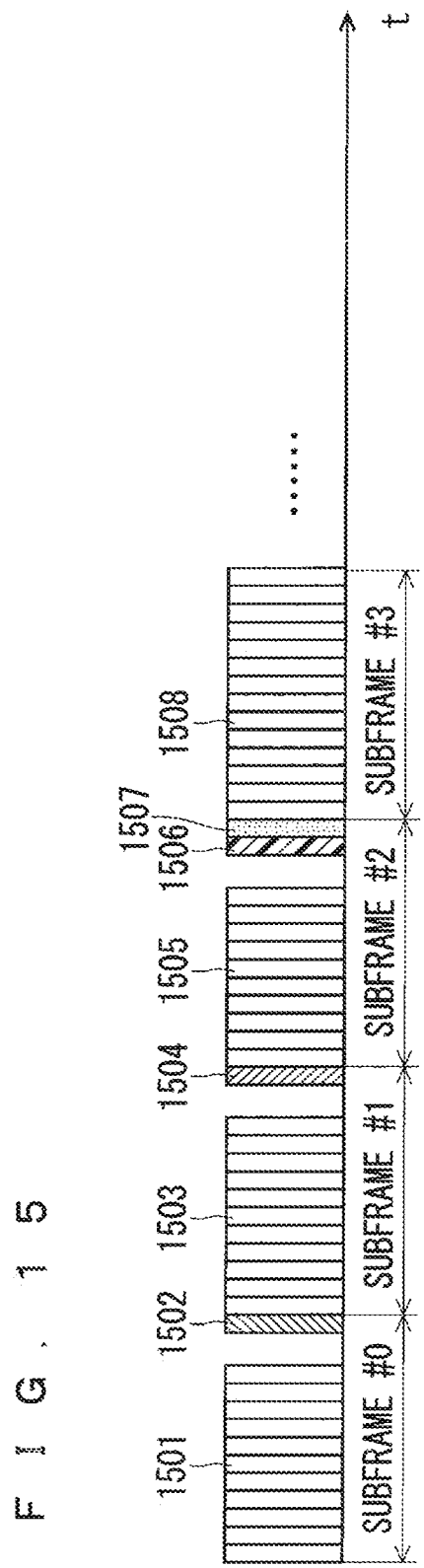
FIG. 15 illustrates yet another example method for setting the PUCCHs as many as the number of times the beam sweeping is performed within k subframes.

FIG. 15 illustrates another example method for setting the PUCCHs as many as the number of times the beam sweeping is performed within k subframes. The PUCCH resources corresponding to the number of times the beam sweeping is performed are individually allocated to subframes and symbols in the k subframes per k subframes. This allocation pattern for the k subframes is repeated. A case where the number of times the beam sweeping is performed is four will be described herein. For example, k=4.

Any signal of any beam or a non-transmission section is allocated to symbols 1501, 1503, 1505, and 1508. Downlink or uplink may be allocated. For example, a downlink signal with the beam number 0 is allocated to the symbol 1501. A downlink signal with the beam number 1 is allocated to the symbol 1503. A downlink signal with the beam number 2 is allocated to the symbol 1505. A downlink signal with the beam number 3 is allocated to the symbol 1508.

The beams from the beam numbers 0 to 3 are swept. The PUCCH with the beam number 0 is allocated to a subframe number n and a symbol number 13 (1502). The PUCCH with the beam number 1 is allocated to a subframe number n+1 and a symbol number 13 (1504). The PUCCH with the beam number 2 is allocated to a subframe number n+2 and a symbol number 12 (1506). The PUCCH with the beam number 3 is allocated to a subframe number n+2 and a symbol number 13 (1507). The PUCCH is not allocated to a subframe number n+3. Here, n is an integer larger than or equal to 0.

Consequently, the PUCCHs of all beams are allocated within the k subframes. Increasing or decreasing k can change the number of times the PUCCH resources are allocated. Thus, the amount of resources to which the PUCCH is allocated can be flexibly set according to a load of the cell and a type of a service to be adopted by the UE.

Although the number of symbols to which the PUCCH of one beam is allocated in the k subframes to be repeated is one, the number of symbols is not limited to one but may be two or more. The number of symbols may differ for each beam. Making, different for each beam, the number of symbols to which the PUCCH of one beam in the k subframes to be repeated is allocated enables a flexible setting for the PUCCH resources.

The aforementioned example discloses the repeated and consecutive allocation of the k subframes. As an alternative method, the k subframes may be allocated not consecutively but discretely or periodically. For example, the k subframes to which the PUCCH is allocated may be periodically repeated at m subframe intervals. In other words, the k subframes to which the PUCCH is allocated may be periodically repeated per m+1 subframes. Here, m is an integer larger than or equal to 0.

Consequently, a subframe to which the PUCCH resources are not set can be provided between subframes to which the PUCCH resources are set. For example, subframes solely dedicated to the DL can be set. This enables a more flexible setting for the PUCCH resources. The amount of communication latency of the DL and the UL, and the amount of communication can be flexibly set.

The cell may increase or decrease the PUCCH resources according to the number of UEs existing in a beam. For example, the cell may increase or decrease the PUCCH resources on the time axis, according to the latency requested by the UEs existing in a beam.

For example, setting k and m larger in a method for setting and repeatedly allocating the PUCCHs as many as the number of times the beam sweeping is performed within the k subframes reduces the number of times the PUCCH resources are allocated, and increases the amount of resources to be allocated to the other data and the control information. Conversely, setting k and m smaller increases the number of times the PUCCH resources are allocated, and reduces the latency until start of the transmission.

The beams via which communication is performed in each of j subframes to be repeated may be determined. Here, j is a natural number. The disclosed methods may be applied to a method for setting the PUCCH in such a case. The methods may be applied to uplink subframes. k=j may be set. The disclosed methods may be applied for setting the PUCCH resources to the beams via which communication is performed, in the subframes that have been set to the beams.

A method for determining allocation of the PUCCH resources will be disclosed. The cell sets the PUCCH resources for each beam. The following (1) to (7) will be disclosed as examples of the judgment indicator.

(1) a load of each beam

For example, the PUCCH resources are more frequently allocated when the load of each beam is high, whereas the PUCCH resources are less frequently allocated when the load of each beam is low.

(2) the number of UEs existing in each beam

For example, the PUCCH resources are more frequently allocated when the number of UEs existing in each beam is many, whereas the PUCCH resources are less frequently allocated when the number of UEs existing in each beam is few.

(3) the use service of UEs existing in each beam

For example, the PUCCH resources are more frequently allocated in the presence of a UE with a service through which the uplink data is more frequently generated, whereas the PUCCH resources are less frequently allocated in the presence of a UE with a service through which the uplink data is less frequently generated. The PUCCH resources may be allocated according to a UE with a service through which the uplink data is the most frequently generated among the UEs existing in the beam.

(4) the requested QoS of a service of the UEs being served by each beam

For example, the PUCCH resources are more frequently allocated in the presence of a UE with a service requiring high QoS, whereas the PUCCH resources are less frequently allocated in the presence of a UE with a service requiring low QoS. The PUCCH resources may be allocated according to a UE with the highest requested QoS among the UEs existing in the beam.

(5) the latency requested by the UEs existing in each beam

For example, the PUCCH resources are less frequently allocated in the presence of a UE with a service requiring high latency, whereas the PUCCH resources are more frequently allocated in the presence of a UE with a service requiring low latency. The PUCCH resources may be allocated according to a UE with the lowest requested latency among the UEs existing in the beam.

(6) the requested throughput of UEs existing in each beam

For example, the PUCCH resources are more frequently allocated in the presence of a UE with a service requiring high throughput, whereas the PUCCH resources are less frequently allocated in the presence of a UE with a service requiring low throughput. The PUCCH resources may be allocated according to a UE with the highest requested throughput among the UEs existing in the beam.

(7) combinations of (1) to (6) above

A method for setting the PUCCH resources to the UE will be disclosed.

The cell notifies the UE of information on the PUCCH resources. The following (1) to (13) will be disclosed as examples of the information on the PUCCH resources.

(1) a beam ID

The beam ID in (1) indicates of which beam the setting of the PUCCH is.

(2) a period

The period in (2) indicates a period with which the PUCCH is allocated. The period may be set, for example, per radio frame, per subframe, or per symbol.

(3) an offset

The offset in (3) indicates an offset to which the PUCCH is allocated. The offset may be set, for example, per radio frame, per subframe, or per symbol.

(4) a symbol number

The symbol number in (4) indicates to which symbol the PUCCH is allocated.

(5) a subframe number

The subframe number in (5) indicates to which subframe the PUCCH is allocated.

(6) k

The k in (6) indicates per how many subframes the PUCCH resources for each beam are allocated.

(7) m

The m in (7) indicates per how many subframes the PUCCH for each beam is repeatedly allocated.

(8) a type of UCI

The type of UCI in (8) indicates of which UCI of the PUCCH is allocated.

(9) frequency resources

The frequency resources in (9) indicate to which frequency resources the PUCCH is allocated.

(10) Cyclic Shift (CS)

The CS in (10) indicates the CS of the ZC sequence to be used for the PUCCH.

(11) a sequence number

The sequence number in (11) indicates the sequence number of a sequence to be used for the PUCCH.

(12) an orthogonal code

The orthogonal code in (12) indicates the orthogonal code if the orthogonal code is used for the PUCCH.

(13) combinations of (1) to (12) above

The information on the PUCCH resources may include information on the RS for the PUCCH. The cell notifies the information on the PUCCH resources via a beam via which the UE can communicate. The beam via which the UE can communicate will be referred to as a "serving beam". The information on the PUCCH resources may not always be fixed. The cell may notify the UE of the information semi-statically or dynamically set.

The UE obtains the information on the PUCCH resources through notification of such information. Consequently, the UE can recognize the setting of the PUCCH resources of its own UE.

The cell may notify the UE of the information on the PUCCH resources via a single beam covering the entire coverage of the cell.

The information on the PUCCH resources for each beam and the information on the PUCCH resources for each UE may be provided. The information on the PUCCH resources for each beam and the information on the PUCCH resources for each UE may be provided in combination. The cell may notify the UE of the information on the PUCCH resources for each beam and the information on the PUCCH resources for each UE separately. Upon obtainment of these pieces of information, the UE can recognize the setting of the PUCCH resources of its own UE.

An example method for setting the PUCCH resources for each beam when a subframe to which the PUCCH for each beam is allocated is set using a period and an offset, and a symbol to which the PUCCH is allocated is set using a symbol number will be described.

Examples of the information on the PUCCH resources for each beam include (1) a beam ID, (2) a period, (3) an offset, (4) a symbol number, (10) the CS, and (11) a route sequence number. The cell notifies the UE of the information on the PUCCH resources for each beam. The cell may notify the information on the PUCCH resources for each beam of all the beams formed by the cell. Consequently, the UE can recognize of which symbol in which subframe the PUCCH resources are set for each beam. The UE can also recognize the CS and a route sequence to be used for the PUCCH.

Examples of the information on the PUCCH resources for each UE include (2) a period, (3) an offset, (8) a type of UCI, and (9) frequency resources. The cell notifies the UE of the information on the PUCCH resources for each UE. Consequently, the UE can recognize to which frequency resource of which symbol in which subframe the PUCCH resources are set according to the type of the UCI of its own UE.

The cell sets, to the UE, the PUCCH resources for each UE from among the PUCCH resources to be set to each beam of the beams in which the UE exists. The cell notifies the UE of information on the set PUCCH resources for each UE.

A part or the entirety of the information on the PUCCH resources for each beam may be identical to that for each UE. In such a case, the cell may notify the UE of the information on the PUCCH resources with the same setting once. The same setting may be eliminated from the information on the PUCCH resources for each beam. The cell has only to notify the information on the PUCCH resources for each UE.

A method for notifying the information on the PUCCH resources for each beam will be disclosed.

The cell sets, to each cell, the PUCCH resources for each beam. The cell notifies the UE of information on the PUCCH resources for each beam that has been set to each cell, as information on the cell. The cell notifies the UEs being served by the cell of the information on the PUCCH resources for each beam. The information on the PUCCH resources for each beam includes information on the PUCCH resources for each beam of the beams via which the UE is communicating.

The cell may notify the UE of information on the PUCCH resources for each beam of all the beams in the cell. Alternatively, the cell may notify information on the PUCCH resources for each beam of not all the beams in the cell but a plurality of beams. The cell may notify, for example, information on the PUCCH resources for a beam via which the UE is communicating, and information on the PUCCH resources for a plurality of beams having the surrounding coverage. This saves notification of information on the PUCCH resources for each moving target beam when the UE moves between beams.

Alternatively, the cell may notify the UE of information on the PUCCH resources for each beam of only the beams via which the UE is communicating. This can reduce the amount of information per signaling. Alternatively, the cell may notify information on the PUCCH resources for each beam of one or more beams determined by the cell. The cell may notify, for example, information on the PUCCH resources for each beam of the beams whose setting has been changed. Each time the setting is changed, the cell need not notify information on the PUCCH resources for each beam of all the beams. The cell may notify only information on the changed setting in the information on the PUCCH resources for each beam. This can further reduce the amount of information to be notified.

The cell notifies the UE of the information on the PUCCH resources for each beam via a serving beam. When the cell notifies the information via the serving beam, the beam ID may be eliminated from information on the PUCCH resources for the serving beam. When the cell notifies information on the PUCCH resources for a beam different from the serving beam, the beam ID may be included in the information on the PUCCH resources. Consequently, the UE can obtain the information on the PUCCH resources for each beam via the beam via which the UE is communicating.

As an alternative method, the cell may notify the information on the PUCCH resources via a single beam covering the entire coverage of the cell. Since the cell can notify the entire coverage of the cell of the information on the PUCCH resources, the signaling load can be reduced.

The cell may include the information on the PUCCH resources in the system information to notify the information. The cell may broadcast the information on the PUCCH resources. Alternatively, the cell may notify the information on the PUCCH resources via the UE-dedicated signaling. The notification via the UE-dedicated signaling will not increase the amount of information to be broadcast by the cell. Thus, increase in the radio resources required for the broadcasting can be suppressed. The notification via the UE-dedicated signaling enables notification using the resources for each beam. Consequently, the cell can flexibly notify the information on the PUCCH resources for each beam.

A method for notifying the information on the PUCCH resources for each UE will be disclosed.

The cell notifies the UE of the information on the PUCCH resources as information dedicated to the UE. The cell may notify a part or the entirety of the information on the PUCCH resources for each beam. For example, when a part of the setting of the information on the PUCCH resources dedicated to the UE is changed, the cell may notify the UE of only the part of the information. This can reduce the amount of information to be notified.

The cell notifies the information on the PUCCH resources via the serving beam. When the cell notifies the information via the serving beam, the beam ID may be eliminated. The cell may notify the information on the PUCCH resources via the UE-dedicated signaling. Consequently, the UE can obtain the information on the PUCCH resources for each UE via the beam via which the UE is communicating.

As an alternative method, the cell may notify the information on the PUCCH resources via a single beam covering the entire coverage of the cell. Since the cell can notify the entire coverage of the cell of the information on the PUCCH resources, the signaling load can be reduced.

Alternatively, the cell may notify the UE of information on the PUCCH resources for each UCI for each UE. The notification methods previously described may be applied thereto. The cell can set the PUCCH resources for each UCI, and the UE can transmit the PUCCH for each UCI with the setting of the PUCCH resources set for each UCI.

A setting may be made so that a plurality of UEs perform the frequency-division multiplexing or the code-division multiplexing as a method for setting the PUCCHs of the plurality of UEs to one symbol that is a PUCCH resource for each beam.

Figure 16:
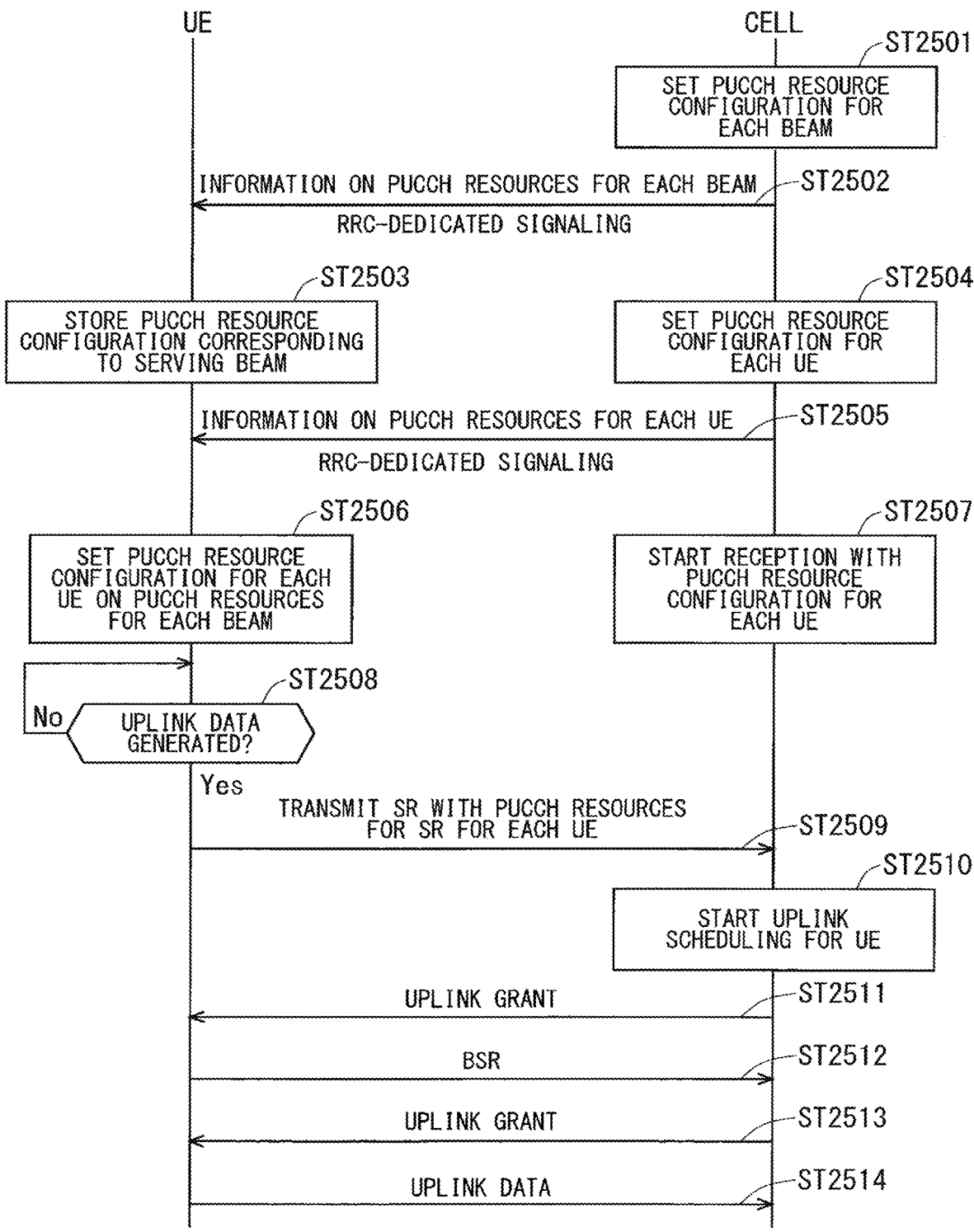
FIG. 16 illustrates one example sequence for setting the PUCCHs and transmitting and receiving the SR.

FIG. 16 illustrates one example sequence for setting the PUCCHs and transmitting and receiving the SR. FIG. 16 illustrates a case where the cell notifies the UE of the information on the PUCCH resources for each beam and the information on the PUCCH resources for each UE separately.

In Step ST2501, the cell sets a PUCCH resource configuration for each beam of all the beams in the cell.

In Step ST2502, the cell notifies the UE of information on the PUCCH resources for each beam which includes information on the PUCCH resources for each beam of the beams via which the UE communicates. The cell may make the notification via a beam via which the cell communicates with the UE. The cell notifies the information via the RRC-dedicated signaling.

Upon receipt of the information on the PUCCH resources for each beam in Step ST2502, the UE stores, in Step ST2503, the PUCCH resource configuration corresponding to the serving beam that is a beam via which the UE communicates. Here, the UE may store the information on the PUCCH resources for each beam of all the beams notified.

In Step ST2504, the cell sets a PUCCH resource configuration for each UE.

In Step ST2505, the cell notifies the UE of the information on the PUCCH resources for each UE. The cell notifies the information via the RRC-dedicated signaling.

Upon receipt of the information on the PUCCH resources for each UE in Step ST2505, the UE sets the PUCCH resource configuration for each UE on the PUCCH resources for each beam in Step ST2506. Specifically, the UE sets the PUCCH resource configuration of its own UE, using the information on the PUCCH resources for each beam and the information on the PUCCH resources for each UE in Step ST2506.

Upon notification of the information on the PUCCH resources for each UE in Step ST2505, the cell starts, in Step ST2507, reception with the PUCCH resource configuration for each UE that has been set to the UE.

In Step ST2508, the UE determines whether the uplink data has been generated. When determining in Step ST2508 that the uplink data is not generated, the UE returns to Step ST2508 to repeat the determination on whether the uplink data has been generated. When determining in Step ST2508 that the uplink data has been generated, the UE proceeds to Step ST2509.

In Step ST2509, the UE transmits the SR to the cell via the serving beam with the PUCCH resources for the SR that have been set for each UE.

The cell, which has started reception in Step ST2507 with the PUCCH resources for each UE that have been set to the UE, receives the SR transmitted from the UE in Step ST2509.

In Step ST2510, the cell starts uplink scheduling for the UE according to the received SR.

In Step ST2511, the cell transmits, to the UE, an uplink grant, specifically, the uplink scheduling information including the uplink grant.

Upon receipt of the uplink grant in Step ST2511, the UE transmits a Buffer Status Report (BSR) to the cell using the uplink grant in Step ST2512. Here, the UE may transmit the uplink data.

Upon receipt of the BSR in Step ST2512, the cell performs the uplink scheduling for the UE according to the BSR.

In Step ST2513, the cell transmits the uplink grant to the UE. Upon receipt of the uplink grant in Step ST2513, the UE transmits the uplink data to the cell using the uplink grant in Step ST2514. In Step ST2514, the cell receives the uplink data transmitted from the UE.

Consequently, the uplink communication is started between the UE and the cell.

Although the UE transmits the BSR to the cell in Step ST2512, the UE may transmit the uplink data together with the BSR. Alternatively, the UE may transmit only the uplink data. If the uplink data has a small amount of data, transmission of the uplink data can be completed by its mere transmission. Moreover, the latency can be shortened.

Although disclosed is notification of the information on the PUCCH resources for each beam from the cell to the UE, the information on the PUCCH resources for each beam may be statically predetermined in, for example, a standard. Alternatively, a function for outputting information on the PUCCH resources for each beam such as a subframe number and a symbol number may be used, using a beam ID as an input parameter. Consequently, the signaling load between the cell and the UE can be reduced.

Application of the methods disclosed in the second embodiment enables setting of the PUCCH resources when the beam sweeping in the MBF comes into operation.

The cell sets the PUCCH resources to the UE according to the methods disclosed in the second embodiment, which enables transmission and reception of the PUCCH via the beam via which the UE is communicating, and enables the uplink communication from the UE to the cell.

What is disclosed is that in a subframe, a beam for transmitting and receiving a symbol of a PUCCH resource may be made different from a beam for transmitting and receiving a symbol different from the symbol. A gap may not be provided in a subframe where a PUCCH of a beam different from the beam for transmitting and receiving another symbol is configured, even when the other symbol is used for downlink communication.

Since the beams differ between downlink and uplink, the UE does not consecutively perform reception of the downlink signal and transmission of the uplink signal. Thus, the gap is unnecessary because there is no overlap between the reception and the transmission in the UE.

The cell may set the gap configuration and notify it to the UE. The cell may include the gap setting in the information on the PUCCH resources. The cell may notify the UE of the gap setting together with information on the other PUCCH resources.

The cell sets the gap configuration and is ready to notify the UE of the gap configuration, which enables, for example, setting of no gap between downlink and uplink when different beams are used between a symbol for the downlink and a symbol for the uplink in one subframe.

Consequently, a gap conventionally required can be used for downlink communication or uplink communication. This can increase the use efficiency of the radio resources.

It takes some time for a transceiver to switch between beams when the beams are switched for each symbol. The transceiver may not be able to perform normal transmission and reception during the duration. Thus, the setting for a beam switching duration is necessary. The beam switching duration may be statically determined in, for example, a standard. The cell and the UE can recognize a duration during which neither transmission nor reception is possible. The beam switching duration may be determined to fall within the CP length. The beams can be switched without influencing data to be transmitted in one symbol.

First Modification of Second Embodiment

The first modification will disclose another method for solving the problems disclosed in the second embodiment. The second embodiment discloses predetermining the PUCCH resources for each beam, and setting the PUCCH resources for each UE out of the PUCCH resources for each beam. Since a required setting period of the PUCCH differs depending on a service through which communication is performed for each UE, some of the PUCCH resources set for each beam are not used. This creates a problem of reduction in the use efficiency of the radio resources.

The first modification will disclose a method for solving such a problem.

The PUCCH resources are set for each UE. Not the PUCCH resources for each beam but the PUCCH resources for each UE are set. The PUCCH resources may be dynamically set. Dynamically setting the PUCCH resources for each UE enables the PUCCH resources to be timely set according to a connected state of the UE. It is also possible to suppress reduction in the use efficiency of the resources due to non-use of some of the PUCCH resources that are set for each beam according to the methods disclosed in the second embodiment.

A method for setting the PUCCH resources to the UE will be disclosed.

The cell notifies the UE of information on the PUCCH resources to be set for each UE, and sets the PUCCH resources to the UE. What is disclosed in the second embodiment may be applied as examples of the information on the PUCCH resources. A setting example according to the first modification will be disclosed. A subframe to which the PUCCH for each UE is allocated is set using a period and an offset, and a symbol to which the PUCCH is allocated is set using a symbol number.

A subframe period may be of one or more predefined values. A combination between a subframe period and an offset may be indexed, and the subframe period may be set using the index. The symbols may be allocated using symbol numbers. Alternatively, the symbols may be allocated using symbol numbers to be set within a subframe. For example, the subframe period is set to 10, the offset is set to 4, and the symbol number is set to 13. Here, the PUCCH is allocated to a symbol whose symbol number is 13 at 10 subframe intervals from the fifth subframe.

The maximum number of symbols for the PUCCH resources that are to be allocated to a subframe may be determined. The symbol numbers may be renumbered and set with the maximum number of symbols. Consequently, the amount of information indicating the symbol numbers, for example, the number of bits can be reduced.

The cell sets, to the UE, the frequency resources for the PUCCHs, the CS, and the sequence number. The UE configures, according to these pieces of information, the PUCCH in a symbol with the timing with which the PUCCH is allocated.

When the cell sets, to UEs whose serving beams are different, the PUCCH resources for each of the UEs, the cell makes the settings to prevent the timings with which the PUCCH resources are set to these UEs from coinciding with each other. When the cell allocates symbols to the PUCCH resources, the cell may make the setting to prevent the PUCCH resources from being allocated to the same symbol in the same subframe.

The cell notifies the information via the serving beam. When the cell notifies the information via the serving beam, the beam ID may be eliminated. The cell may notify the information via the UE-dedicated signaling. Consequently, the UE can obtain the information on the PUCCH resources for each UE via the beam via which the UE is communicating.

The UE-dedicated signaling may be the RRC signaling. The information on the PUCCH resources for each UE may be included in an RRC message. Alternatively, the UE-dedicated signaling may be the L1/L2 control signaling. The information on the PUCCH resources for each UE may be included in the downlink L1/L2 control information (may be downlink control information). Since the UE can receive the setting relatively earlier via the L1/L2 control signaling as the UE-dedicated signaling, the setting latency can be reduced.

Alternatively, the UE-dedicated signaling may be the MAC signaling. The information on the PUCCH resources for each UE may be included in the MAC control information. Since the HARQ is applied when the MAC signaling is used as the UE-dedicated signaling, the UE can perform reception at a low reception error rate, and receive the setting relatively earlier.

Figure 17:
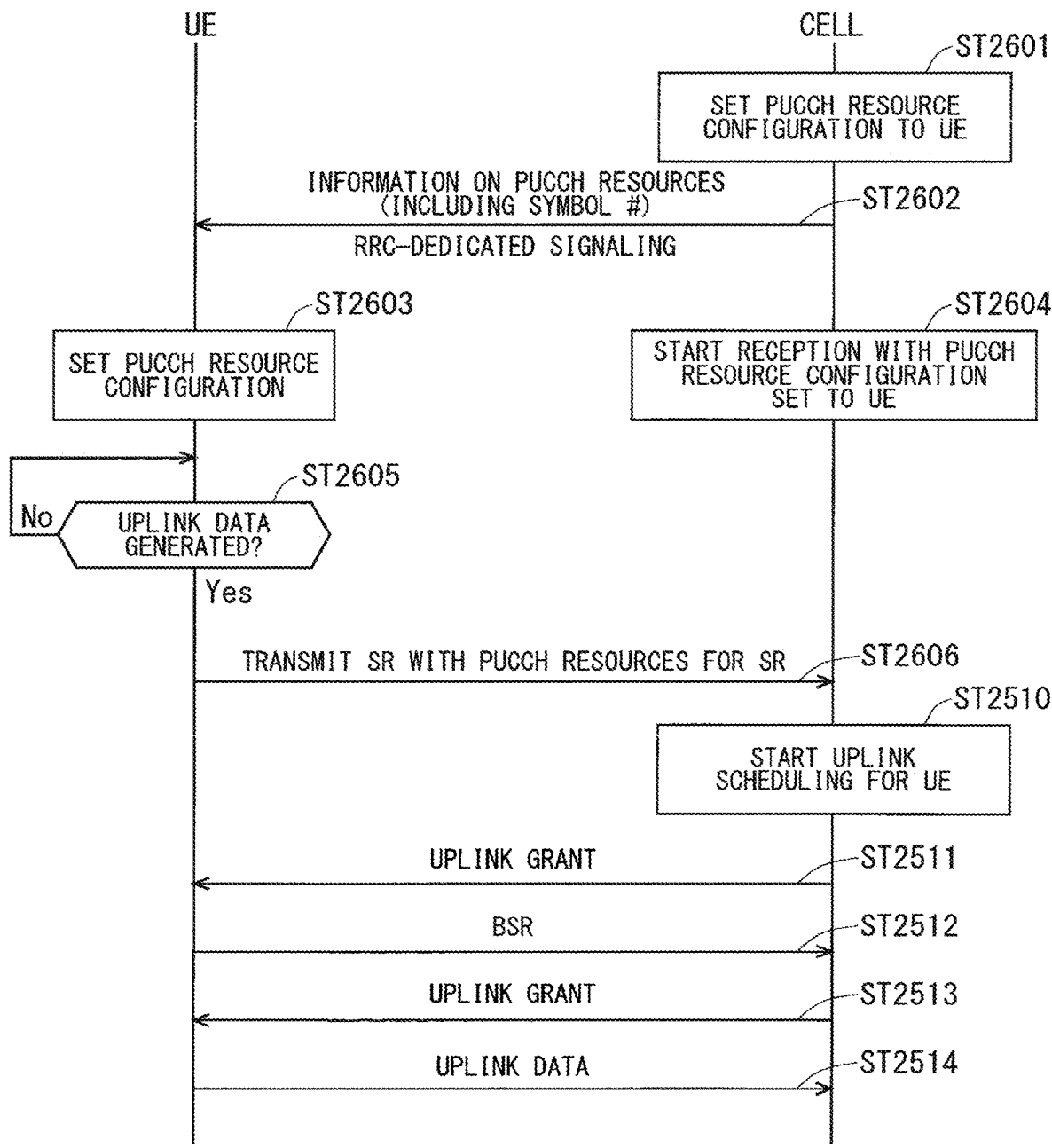
FIG. 17 illustrates one example sequence for setting the PUCCHs for each UE and transmitting and receiving the SR.

FIG. 17 illustrates one example sequence for setting the PUCCHs for each UE and transmitting and receiving the SR. Since the sequence illustrated in FIG. 17 includes the same Steps as those in the sequence illustrated in FIG. 16, the same step numbers will be assigned to the same Steps and the common description thereof will be omitted. FIG. 17 illustrates a case where the cell notifies the UE of the information on the PUCCH resources to be set for each UE.

In Step ST2601, the cell sets, to the UE, a PUCCH resource configuration for each UE. The cell sets, to the UE, even a symbol number to which the PUCCH is allocated. Here, the cell makes the settings for the UEs whose serving beams are different to prevent the PUCCH resource timings from coinciding with each other.

In Step ST2602, the cell notifies the UE of the information on the PUCCH resources for each UE. The cell includes the symbol number (symbol #) to which the PUCCH is allocated in the information on the PUCCH resources. The cell may make the notification via a beam via which the cell communicates with the UE. The cell notifies the information via the RRC-dedicated signaling.

Upon receipt of the information on the PUCCH resources for each UE in Step ST2602, the UE sets the PUCCH resource configuration in Step ST2603.

Upon notification of the information on the PUCCH resources to the UE in Step ST2602, the cell starts reception in Step ST2604 with the PUCCH resource configuration that is set to the UE.

In Step ST2605, the UE determines whether the uplink data has been generated. When the uplink data is not generated in Step ST2605, the UE returns to Step ST2605 to repeat the determination on whether the uplink data has been generated. When the uplink data has been generated in Step ST2605, the UE proceeds to Step ST2606.

In Step ST2606, the UE transmits the SR to the cell via the serving beam with the set PUCCH resources for the SR.

The cell, which has started reception in Step ST2604 with the PUCCH resources that have been set to the UE, receives the SR transmitted from the UE in Step ST2606.

Upon receipt of the SR from the UE, the cell performs a process for starting the uplink communication. Consequently, the uplink communication is started between the UE and the cell.

Application of the methods disclosed in the first modification enables setting of the PUCCH resources when the beam sweeping in the MBF comes into operation. The cell sets the PUCCH resources to the UE according to the methods disclosed in the first modification, which enables transmission and reception of the PUCCH via the beam via which the UE is communicating, and enables the uplink communication from the UE to the cell.

Dynamically setting the PUCCH resources for each UE enables the PUCCH resources to be set according to a connected state of the UE. It is also possible to suppress reduction in the use efficiency of the resources due to non-use of some of the PUCCH resources that are set for each beam according to the methods disclosed in the second embodiment.

Although disclosed is notification of the information on the PUCCH resources from the cell via the serving beam, the cell may notify the information via a single beam covering the entire coverage of the cell as an alternative method. Since the cell can notify the entire coverage of the cell of the information on the PUCCH resources, the signaling load can be reduced.

Alternatively, the cell may notify the UE of information on the PUCCH resources for each UCI for each UE. The notification methods previously described may be applied thereto. The cell can set the PUCCH resources for each UCI, and the UE can transmit the PUCCH for each UCI with the setting of the PUCCH resources set for each UCI.

Another setting example according to the first modification will be disclosed. Information on starting, modifying, and stopping the setting of the PUCCH resources is set to each UE. The cell notifies the UE of the information on the PUCCH resources for each UE in advance. The cell sets the PUCCH resources to the UE by notifying the UE of the information on starting, modifying, and stopping the setting of the PUCCH resources. Upon receipt of the settings, the UE actually transmits the PUCCH, transmits the PUCCH after being modified, or stops the PUCCH.

The following (1) to (8) will be described as examples of the information on starting, modifying, and stopping the setting of the PUCCH resources:

(1) information indicating start;
(2) information indicating stop;
(3) information indicating modification;
(4) information indicating a setting duration;
(5) information indicating a stop duration;
(6) information indicating an offset;
(7) a symbol number: and
(8) combinations of (1) to (7) above.

(1) indicates the information indicating start. When the information is set to the UE, the UE can transmit the PUCCH with the preset PUCCH resources.

(2) indicates the information indicating stop. When the information is set to the UE, the UE stops transmitting the PUCCH with the preset PUCCH resources.

(3) indicates the information indicating modification. When the information is set to the UE, the UE can transmit the PUCCH with resources whose settings have been modified from the PUCCH resources. The UE may also notify the PUCCH resource information to be modified.

(4) indicates the information indicating a setting duration. When the information is set to the UE, the UE can transmit the PUCCH with the PUCCH resources for the setting duration since start of the setting. The setting may be stopped when the setting duration expires.

(5) indicates the information indicating a stop duration. When the information is set to the UE, the UE stops transmitting the PUCCH with the PUCCH resources for the stop duration since stop of the setting. The setting may be started when the stop duration expires.

(6) indicates the information indicating an offset. When the information is set to the UE, the UE starts the setting by offsetting the offset value from the timing of, for example, start of the setting.

(7) indicates a symbol number to which the PUCCH is allocated. When the information is set to the UE, the UE sets the PUCCH resources to the symbol number. When the PUCCH resources to be preset to the UE include a symbol number, the UE follows a newly set symbol number.

Figure 18:
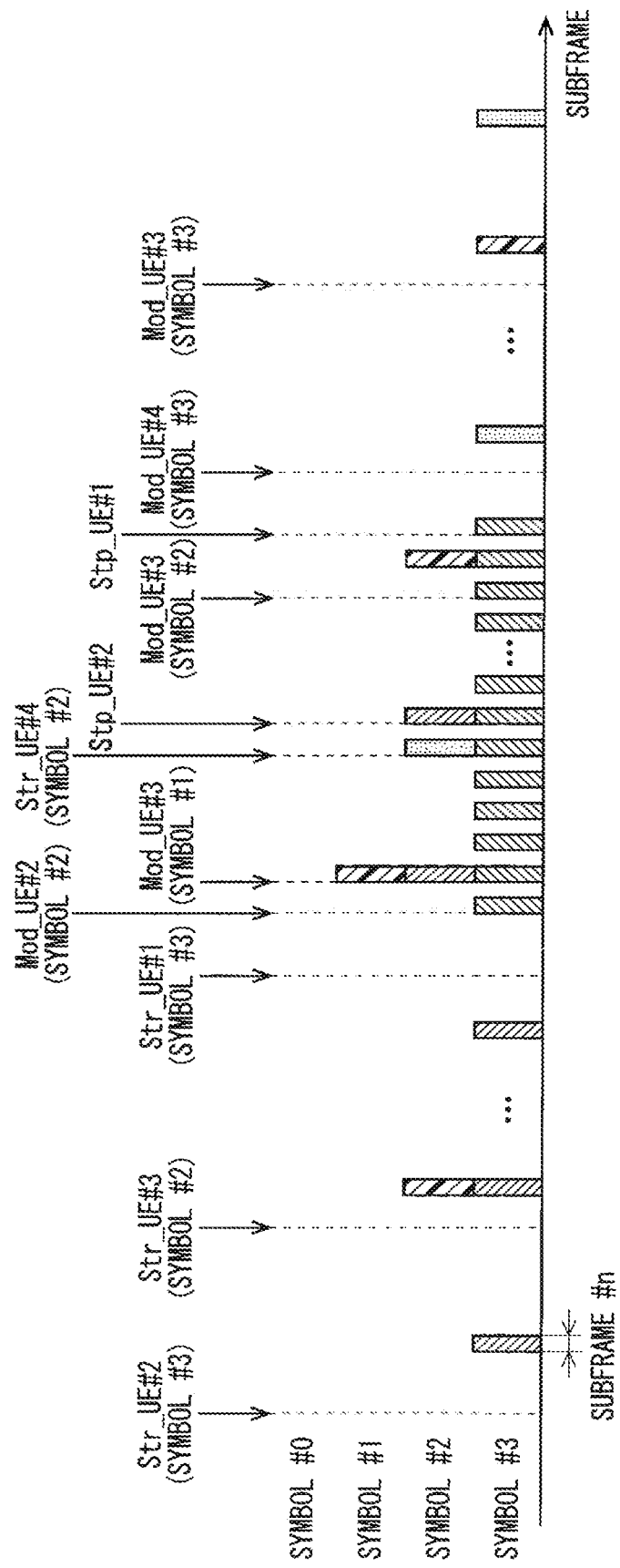
FIG. 18 illustrates one example method for setting information on starting, modifying, and stopping the setting of the PUCCH resources to each UE.

FIG. 18 illustrates one example method for setting the information on starting, modifying, and stopping the setting of the PUCCH resources to each UE. A case where the number of times the beam sweeping is performed is four will be described herein. In FIG. 18, the horizontal axis represents subframes, and the vertical axis represents symbol numbers in the subframes. FIG. 18 illustrates a case where the number of symbols to which the PUCCHs are allocated is four per subframe at the maximum. Here, the symbol numbers in the subframe are renumbered from 0 to 3.

Here, the symbol number 10 corresponds to the symbol number 0, the symbol number 11 corresponds to the symbol number 1, the symbol number 12 corresponds to the symbol number 2, and the symbol number 13 corresponds to the symbol number 3. The cell may notify, in advance, the UE of the maximum number of symbols to which the PUCCH is allocated per subframe, and associations between the symbol numbers and the renumbered symbol numbers in the subframe. Such information may be included in the information on the PUCCH resources for each UE to be notified in advance. The UE can recognize the symbol numbers to which the PUCCHs are allocated, using such information.

In FIG. 18, arrows represent information to be notified from the cell to the UE. The cell notifies, in advance, the UEs 1 to 4 of information on the PUCCH resources for each of the UEs. When determining to start the setting of the PUCCH resource to the UE 2, the cell notifies the UE 2 of information indicating start of the PUCCH setting together with the symbol number to which the PUCCH is allocated (Str_UE #2 (symbol #3)). Here, the symbol number is 3. Consequently, the PUCCH resource is set to the UE 2.

When determining to start the setting of the PUCCH resource to the UE 3, the cell notifies the UE 3 of information indicating start of the PUCCH setting together with the symbol number to which the PUCCH is allocated (Str_UE #3 (symbol #2)). Here, the symbol number is 2. Consequently, the PUCCH resource is set to the UE 3.

When determining to start the setting of the PUCCH resource to the UE 1, the cell notifies the UE 1 of information indicating start of the PUCCH setting together with the symbol number to which the PUCCH is allocated (Str_UE #1 (symbol #3)). Here, the symbol number is 3. Consequently, the PUCCH resource is set to the UE 1.

When determining that the PUCCH resource set to the UE 2 conflicts with the PUCCH resource set to the UE 1, the cell determines to modify the setting of the PUCCH resources, and notifies it to the UE. Here, the cell notifies the UE 2 of information indicating modification of the setting of the PUCCH resource together with the symbol number to be allocated after the modification (Mod_UE #2 (symbol #2)). Here, the symbol number is 2. Consequently, the setting of the PUCCH resource is modified for the UE 2.

When determining that the PUCCH resource set to the UE 3 conflicts with the PUCCH resource set to the UE 2, the cell determines to modify the setting of the PUCCH resources, and notifies it to the UE. Here, the cell notifies the UE 3 of information indicating modification of the setting of the PUCCH resource together with the symbol number to be allocated after the modification (Mod_UE #3 (symbol #1)) Here, the symbol number is 1. Consequently, the setting of the PUCCH resources is modified for the UE 3.

When determining to start the setting of the PUCCH resources for the UE 4, the cell notifies the UE 4 of information indicating start of the PUCCH setting together with the symbol number to which the PUCCH is allocated (Str_UE #4 (symbol #2)). Here, the symbol number is 2. Consequently, the PUCCH resources are set to the UE 4.

When determining to stop the setting of the PUCCH resource to the UE 2, the cell notifies the UE 2 of information indicating stop of the PUCCH setting (Stp_UE #2). Consequently, the PUCCH resources set to the UE 2 are released.

Since the PUCCH resources set to the UE 2 are released, the cell determines that the PUCCH resources set to the UE 2 do not conflict with the PUCCH resources set to the UE 3. Then, the cell determines to modify the setting of the PUCCH resources, and notifies it to the UE 3. Here, the cell notifies the UE 3 of information indicating modification of the setting of the PUCCH resources together with the symbol number to be allocated after the modification (Mod_UE #3 (symbol #2)). Here, the symbol number is 2. Consequently, the setting of the PUCCH resources is modified for the UE 3.

When determining to stop the setting of the PUCCH resources for the UE 1, the cell notifies the UE 1 of information indicating stop of the PUCCH setting (Stp_UE #1). Consequently, the PUCCH resources set to the UE 1 are released.

Since the PUCCH resources set to the UE 1 are released, the cell determines that the PUCCH resources set to the UE 1 do not conflict with the PUCCH resources set to the UE 4. Then, the cell determines to modify the setting of the PUCCH resources, and notifies it to the UE 4. Here, the cell notifies the UE 4 of information indicating modification of the setting of the PUCCH resources together with the symbol number to be allocated after the modification (Mod_UE #4 (symbol #3)). Here, the symbol number is 3. Consequently, the setting of the PUCCH resources is modified for the UE 4.

Since the PUCCH resources set to the UE 1 have been modified, the cell determines that the PUCCH resources set to the UE 1 do not conflict with the PUCCH resources set to the UE 4. Then, the cell determines to modify the setting of the PUCCH resources, and notifies it to the UE 3. Here, the cell notifies the UE 3 of information indicating modification of the setting of the PUCCH resources together with the symbol number to be allocated after the modification (Mod_UE #3 (symbol #3)). Here, the symbol number is 3. Consequently, the setting of the PUCCH resources is modified for the UE 3.

Consequently, the cell can allocate, for each UE that performs communication via a different beam, a different resource to the PUCCH of the UE. Thus, the cell requiring the beam sweeping can receive, by switching between beams for each UE that performs communication via a different beam, the PUCCH of the UE.

Consequently, the different resource can be dynamically allocated, for each UE that performs communication via a different beam, to the PUCCH of the UE. When the setting of the PUCCH resources is unnecessary, the PUCCH resources can be released to the UEs with the other beams by stopping the setting of the PUCCH resources. There is no need to preset the PUCCH resources for each beam as the methods disclosed in the second embodiment. This can suppress reduction in the use efficiency of the radio resources.

A method for notifying the information on starting, modifying, and stopping the setting of the PUCCH resources will be disclosed. The cell notifies the UE of the information on starting, modifying, and stopping the setting of the PUCCH resources. The cell notifies the information via the serving beam. When the cell notifies the information via the serving beam, the beam ID may be eliminated. The cell may notify the information via the UE-dedicated signaling. Consequently, the UE can obtain the information on starting, modifying, and stopping the setting of the PUCCH resources for each UE via the beam via which the UE is communicating.

The UE-dedicated signaling may be the RRC signaling. The information on starting, modifying, and stopping the setting of the PUCCH resources may be included in an RRC message. Alternatively, the UE-dedicated signaling may be the L1/L2 control signaling. The information on starting, modifying, and stopping the setting of the PUCCH resources may be included in the downlink L1/L2 control information. Since the UE can receive the setting relatively earlier via the L1/L2 control signaling as the UE-dedicated signaling, the setting latency can be reduced.

Alternatively, the UE-dedicated signaling may be the MAC signaling. The information on starting, modifying, and stopping the setting of the PUCCH resources may be included in the MAC control information. Since the HARQ is applied when the MAC signaling is used as the UE-dedicated signaling, the UE can perform reception at a low reception error rate, and receive the setting relatively earlier.

One example method for notifying the information on the PUCCH resources and the information on starting, modifying, and stopping the setting of the PUCCH resources will be disclosed. Both of the information on the PUCCH resources and the information on starting, modifying, and stopping the setting of the PUCCH resources are notified via the RRC signaling. The RRC signaling enables notification of a large amount of information at a low reception error rate.

Another example of the notification method will be disclosed.

The information on the PUCCH resources is notified via the RRC signaling, and the information on starting, modifying, and stopping the setting of the PUCCH resources is notified via the L1/L2 control signaling. Since the information on starting, modifying, and stopping the setting of the PUCCH resources is notified via the L1/L2 control signaling, the UE can start, modify, and stop the setting earlier. Starting, modifying, and stopping the setting can be performed dynamically and earlier, which can increase the use efficiency of the radio resources.

Yet another example of the notification method will be disclosed.

The information on the PUCCH resources is notified via the RRC signaling, and the information on starting, modifying, and stopping the setting of the PUCCH resources is notified via the MAC signaling. Since the information on starting, modifying, and stopping the setting of the PUCCH resources is notified via the MAC signaling, the notification can be made at a low error rate. The UE can start, modify, and stop the settings relatively earlier. Starting, modifying, and stopping the setting can be performed dynamically, reliably, and relatively earlier, which can increase the use efficiency of the radio resources.

Although disclosed is notification of the information on the PUCCH resources and the information on starting, modifying, and stopping the setting of the PUCCH resources from the cell via the serving beam, the cell may notify at least one of the information on the PUCCH resources and the information on starting, modifying, and stopping the setting of the PUCCH resources via a single beam covering the entire coverage of the cell as an alternative method. Since the cell can notify the entire coverage of the cell of at least one of the information on the PUCCH resources and the information on starting, modifying, and stopping the setting of the PUCCH resources, the signaling load can be reduced.

Alternatively, the cell may notify the UE of information on the PUCCH resources for each UCI for each UE. The notification methods previously described may be applied thereto. The cell can set the PUCCH resources for each UCI, and the UE can transmit the PUCCH for each UCI with the setting of the PUCCH resources set for each UCI.

Priorities may be assigned to the symbol numbers to be allocated to the PUCCHs. Priorities may be assigned for setting the symbol numbers for the PUCCH resources. The highest priority is assigned to the last symbol in one subframe, and lower priorities are assigned to the forward symbols in order from the last symbol. For example, when 1 subframe consists of 14 symbols ranging from the symbol number 0 to the symbol number 13, the priority of the symbol number 13 is the highest, and the priorities decrease as the symbol numbers decrease, such as the symbol number 12 and then the symbol number 11.

The PUCCH is allocated from a symbol with a higher priority. For example, the PUCCH is allocated to a symbol with the highest priority in starting the initial setting of the PUCCH resources. When the PUCCH resource allocated to a symbol with a higher priority is released by stopping its setting, the PUCCH resource to be set to a symbol with the next priority may be modified to the symbol with the higher priority whose PUCCH resource has been released.

Consequently, the setting can be flexibly modified according to the priorities. Preferentially using the last symbol as the PUCCH resource enables the forward symbols with respect to the PUCCH resource to be collectively used as at least one of the other DL symbols and the other UL symbols. Furthermore, the number of gaps can be reduced.

The PUCCHs may be allocated from the last symbol in ascending order of length of the setting period of the PUCCH resources. For example, the PUCCH is allocated to the symbol with the highest priory in starting the initial setting of the PUCCH resources. When the next setting period of the PUCCH resource is shorter than the initial setting period of the PUCCH resource, the PUCCH resource in the initial setting is modified to that for a symbol with the next priority, and the next PUCCH resource is set to the symbol with the highest priory.

Consequently, the number of times the forward symbols with respect to the PUCCH resource are collectively generated can be increased.

Although the first modification discloses dynamically setting the PUCCH resources for each UE, the timing to notify, from the cell to the UE, the information on the PUCCH resources and the information on starting, modifying, and stopping the setting of the PUCCH resources will be a problem.

What is disclosed is that the PUCCH of a beam different from the beam for transmitting and receiving another symbol in a subframe may be configured. Here, a predefined beam does not always have the downlink resources in a subframe to which the PUCCH is set. Thus, the cell may not be able to notify the UE of the information in a PUCCH-resource setting subframe for each UE.

A method for solving such a problem will be disclosed.

The cell notifies the UE with timing prior to the PUCCH-resource setting subframe for each UE. The cell may perform transmission and reception via a beam in which a UE to be set exists, with timing prior to the PUCCH-resource setting subframe for each UE. The cell may then complete the signaling of the information through such transmission and reception.

Since the PUCCH-resource setting subframe has already been notified to the UE, when the cell makes a notification with timing prior to the PUCCH-resource setting subframe for each UE, the UE may apply the notified information in a PUCCH-resource setting subframe after the notification.

The cell may also notify the UE of the timing to which the setting is to be applied, when making the notification with timing prior to the PUCCH-resource setting subframe for each UE. The cell may make the notification as an offset. The cell may also notify, for example, from how many PUCCH-resource setting subframes since the notification the setting is to be applied. Consequently, the setting can be made flexibly in time.

Figure 19:
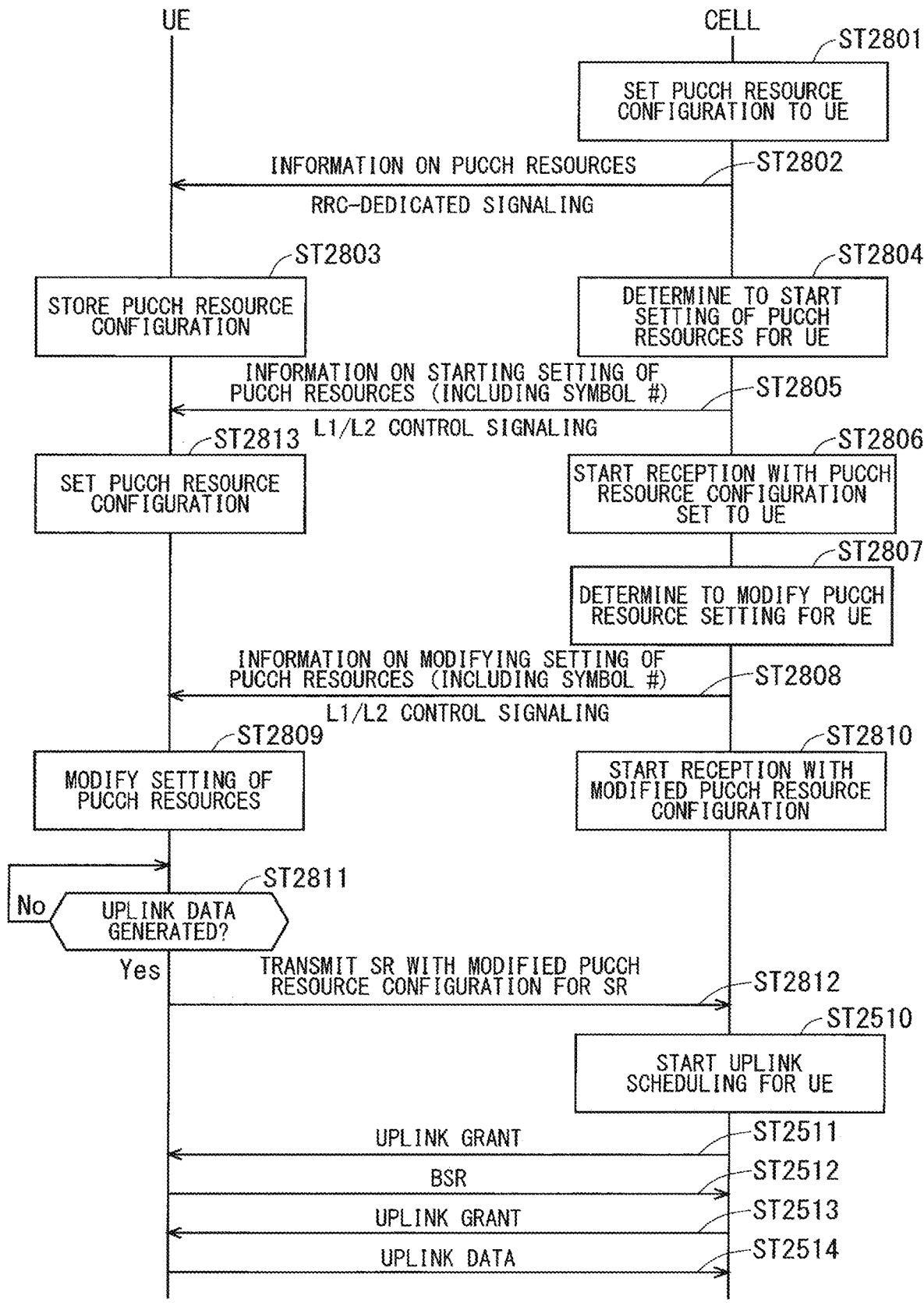
FIG. 19 illustrates one example sequence for setting the PUCCHs for each UE and transmitting and receiving the SR.

FIG. 19 illustrates one example sequence for setting the PUCCHs for each UE and transmitting and receiving the SR. Since the sequence illustrated in FIG. 19 includes the same Steps as those in the sequence illustrated in FIG. 16, the same step numbers will be assigned to the same Steps and the common description thereof will be omitted. FIG. 19 illustrates a case where the cell notifies the UE of the information on the PUCCH resources for each UE and the information on starting, modifying, and stopping the setting of the PUCCH resources for each UE separately.

In Step ST2801, the cell sets, to the UE, a PUCCH resource configuration for each UE.

In Step ST2802, the cell notifies the UE of the information on the PUCCH resources for each UE. The cell may notify the information on the PUCCH resources for each UE via a beam via which the cell communicates with the UE. The cell notifies the information via the RRC-dedicated signaling.

Upon receipt of the information on the PUCCH resources for each UE in Step ST2802, the UE stores the PUCCH resource configuration in Step ST2803.

In Step ST2804, the cell determines to start the setting of the PUCCH resources for the UE. According to the first modification, the cell determines a symbol to be allocated to the UE as well as determining to start the setting of the PUCCH resources for the UE. Here, the cell makes the settings for the UEs whose serving beams are different to prevent the PUCCH resource timings from coinciding with each other.

In Step ST2805, the cell notifies the UE of information on starting the setting of the PUCCH resources. The cell also notifies the symbol number information to be allocated as the PUCCH resources. The cell includes, in the downlink L1/L2 control information, these pieces of information, and notifies the UE of the information via the downlink L1/L2 control signaling.

Upon receipt of the information on starting the setting of the PUCCH resources in Step ST2805, the UE sets the PUCCH resource configuration of its own UE in Step ST2813, using the information on the PUCCH resources for each UE that has been stored in Step ST2803, and the symbol number received in Step ST2805.

After notification of the information on starting the setting of the PUCCH resources and the symbol number information to the UE in Step ST2805, the cell starts reception in Step ST2806 with the PUCCH resource configuration set to the UE.

Upon the occurrence of transmission of an uplink signal, the UE transmits the SR with this PUCCH resource setting. In the example of FIG. 19, however, the UE does not have any uplink data under such a state.

In Step ST2807, the cell determines to modify the PUCCH resource setting for the UE, and determines the symbols to be allocated to the UE after the modification. Here, the cell makes the settings for the UEs whose serving beams are different to prevent the PUCCH resource timings from coinciding with each other. The cell may make the setting in order of priorities of the symbol numbers to be allocated to the PUCCHs.

In Step ST2808, the cell notifies the UE of information on modifying the setting of the PUCCH resources. The cell also notifies the symbol number information to be allocated after modification as the PUCCH resources. The cell includes, in the downlink L1/L2 control information, these pieces of information, and notifies the UE of the information via the downlink L1/L2 control signaling. The notification via the L1/L2 control signaling can reduce the setting time as much as possible.

Upon receipt of the information on modifying the setting of the PUCCH resources and the symbol number in Step ST2808, the UE modifies the setting of the PUCCH resources of its own UE in Step ST2809.

After notification of the information on modifying the setting of the PUCCH resources and the symbol number information to the UE in Step ST2808, the cell starts reception in Step ST2810 with the PUCCH resource configuration modified for the UE.

In Step ST2811, the UE determines whether the uplink data has been generated. When the uplink data is not generated in Step ST2811, the UE returns to Step ST2811 to repeat the determination on whether the uplink data has been generated. When the uplink data has been generated in Step ST2811, the UE proceeds to Step ST2812.

In Step ST2812, the UE transmits the SR to the cell via the serving beam with the modified PUCCH resource configuration for the SR.

The cell, which has started reception in Step ST2810 with the PUCCH resources modified for the UE, receives the SR transmitted from the UE in Step ST2812.

Upon receipt of the SR from the UE, the cell performs a process for starting the uplink communication. Consequently, the uplink communication is started between the UE and the cell.

Application of such a method can produce the same advantages as those in the examples previously described.

Setting the PUCCH resources to the UE in advance and appropriate notification of starting, modifying, and stopping the setting of the PUCCH resources enables the PUCCH resources to be set earlier according to a connected state of the UE. This can further suppress reduction in the use efficiency of the resources.

Second Modification of Second Embodiment

The first modification of the second embodiment discloses increasing the use efficiency of the radio resources through setting of the PUCCH resources for each UE to the UE. With the periodic setting of the PUCCH resources, however, communication needs to be always performed, with the timing, via a beam to which the PUCCH resources are set. In the presence of communication requiring the low latency via the other beams, a problem of a communication failure via a beam to which the PUCCH resources are set arises.

The second modification will disclose a method for solving such a problem.

The cell sets the PUCCH resources to the UE in a subframe identical to the subframe in which the DL resources are configured for the beams via which the UE communicates. The UE transmits the PUCCH in a subframe identical to the subframe in which the downlink signal for the serving beam is transmitted. In the NR, the self-contained subframe that consists of DL resources and UL resources in the same subframe is proposed. This self-contained subframe may be used in the second modification.

The cell notifies the UE of whether the PUCCH can be transmitted in a subframe identical to the subframe in which the DL resources are configured for the beams via which the UE communicates. The cell notifies the UE of whether the PUCCH can be transmitted via the serving beam using the downlink L1/L2 control signaling, with timing requiring transmission of the PUCCH. Information on whether the PUCCH can be transmitted may be provided. The cell may include, in the downlink control information, the information on whether the PUCCH can be transmitted, and notify the UE of the information via the downlink L1/L2 control signaling.

When the UE receives the information on whether the PUCCH can be transmitted and the information indicates that the UE can transmit the PUCCH, the UE can transmit the PUCCH in a subframe in which the information on whether the PUCCH can be transmitted has been received. When the UE receives the information on whether the PUCCH can be transmitted and the information indicates that the UE cannot transmit the PUCCH, the UE cannot transmit the PUCCH in a subframe in which the information on whether the PUCCH can be transmitted has been received. When the UE receives the information on whether the PUCCH can be transmitted and cannot receive information indicating that the PUCCH can be transmitted, the UE may not be able to transmit the PUCCH in the subframe.

It is possible to provide only the information indicating that the PUCCH can be transmitted, and omit the information indicating that the PUCCH cannot be transmitted. Only upon receipt of the information indicating that the PUCCH can be transmitted, the UE can transmit the PUCCH in a subframe in which the information indicating that the PUCCH can be transmitted has been received.

A setting method to the UE will be disclosed.

The cell transmits the information on whether the PUCCH can be transmitted, to the UE within preset PUCCH resources to instruct the UE whether the PUCCH can be transmitted. The preset PUCCH resources may include the timing to set the PUCCH resources. The preset PUCCH resources may include at least the timing per subframe. The cell may notify and set, to the UE, information on the PUCCH resources disclosed in the second embodiment or the first modification of the second embodiment.

Upon receipt of the information indicating that the PUCCH can be transmitted, the UE can transmit the PUCCH. Conversely, upon receipt of information indicating that the PUCCH cannot be transmitted, the UE cannot transmit the PUCCH.

Although the advanced notification of the setting of the PUCCH resources is disclosed, a part or the entirety of the setting of the PUCCH resources may be notified together with the information on whether the PUCCH can be transmitted. Resource settings per time unit smaller than a subframe may be notified together with the information on whether the PUCCH can be transmitted. For example, the symbol number information to be allocated to the PUCCH is notified together with the information on whether the PUCCH can be transmitted. This enables dynamic and flexible allocation of the symbols.

Alternatively, notification of a part or the entirety of the setting of the PUCCH resources may indicate that the PUCCH can be transmitted. This can omit the information indicating that the PUCCH can be transmitted. Information to be notified together with the information on whether the PUCCH can be transmitted may be restricted to a few pieces of information. Presetting most of the PUCCH resources can shorten the processing time from receipt of the information indicating that the PUCCH can be transmitted to transmission of the PUCCH. The UE can transmit the PUCCH in a subframe identical to the subframe in which the information indicating that the PUCCH can be transmitted has been received.

The cell need not transmit and receive the beam via which the UE communicates, in a subframe in which the PUCCH resources are set to the UE. Since the UE cannot receive the downlink L1/L2 control signaling from the serving beam under such a state, the UE cannot receive the information on whether the PUCCH can be transmitted. Thus, the operations of the UE become unclear, and the UE may wrongly transmit the PUCCH.

As previously disclosed, when the UE receives the information on whether the PUCCH can be transmitted and cannot receive the information indicating that the PUCCH can be transmitted, preventing the UE from being able to transmit the PUCCH in the subframe can avoid unnecessary transmission of the PUCCH from the UE. Consequently, the power consumption of the UE and the uplink interference power can be reduced.

Another setting method to the UE will be disclosed.

The cell notifies the UE of the setting of the PUCCH resources except for the timing in advance, so that the UE follows the setting of the PUCCH resources except for the timing. Notification of the information on the PUCCH resources disclosed in the second embodiment or the first modification of the second embodiment may be applied to the advanced setting of the PUCCH resources except for the timing.

The cell instructs the UE whether the PUCCH can be transmitted with an arbitrary timing. The cell notifies the UE of the information on whether the PUCCH can be transmitted. Resource settings per time unit smaller than a subframe may be notified together with the information on whether the PUCCH can be transmitted. The cell notifies, for example, a symbol number. Upon receipt of the information indicating that the PUCCH can be transmitted, the UE can transmit the PUCCH. Conversely, upon receipt of the information indicating that the PUCCH cannot be transmitted, the UE cannot transmit the PUCCH.

Although the advanced notification of the setting of the PUCCH resources except for the timing is disclosed, a part or the entirety of the setting of the PUCCH resources except for the timing may be notified together with the information on whether the PUCCH can be transmitted. For example, the frequency resource information of the PUCCH may be notified together with the information on whether the PUCCH can be transmitted. This enables dynamic and flexible allocation of the frequency resources.

Notification of a symbol number or a part or the entirety of the setting of the PUCCH resources may indicate that the PUCCH can be transmitted. This can omit the information indicating that the PUCCH can be transmitted.

Information to be notified together with the information on whether the PUCCH can be transmitted may be restricted to a few pieces of information. Presetting most of the PUCCH resources can shorten the processing time from receipt of the information indicating that the PUCCH can be transmitted to transmission of the PUCCH. Thus, the PUCCH can be transmitted in a subframe identical to the subframe in which the UE has received the information indicating that the PUCCH can be transmitted.

Consequently, the UE can determine whether the PUCCH can be transmitted, according to the information on whether the PUCCH can be transmitted that is included in the L1/L2 control signaling to be transmitted via the serving beam. The cell causes the UE not to transmit the PUCCH with the PUCCH resources set to the UE, which enables the cell to use the PUCCH resources for the others. The PUCCH resources can be used as, for example, resources for downlink communication. The cell can dynamically determine the other use of the PUCCH resources.

Particularly, associating a downlink control signal with transmission of the PUCCH for the SR enables dynamic setting of the PUCCH resources according to the determination by the cell. The cell can dynamically change the beams to be transmitted and received, in the MBF requiring the beam sweeping. This eliminates the need for performing transmission and reception with the PUCCH resource timing preset to each beam. This can flexibly accommodate, for example, the radio propagation environment fluctuating from moment to moment, variations in the cell load, or a required communication service.

Upon receipt of the information indicating that the PUCCH can be transmitted and in the presence of the UCI to be transmitted with the PUCCH, the UE transmits the PUCCH. In the absence of the UCI to be transmitted with the PUCCH, the UE does not transmit the PUCCH. For example, in the presence of the SR to be transmitted, the UE transmits the PUCCH for the SR. Upon receipt of the information indicating that the PUCCH cannot be transmitted, the UE does not transmit the PUCCH regardless of the presence or absence of the UCI to be transmitted with the PUCCH. For example, even in the presence of the SR to be transmitted, the UE does not transmit the PUCCH for the SR.

The UE waits to transmit the UCI that is not transmitted when the UE cannot transmit the PUCCH, until receiving the next information indicating that the PUCCH can be transmitted. This enables reliable transmission of the UCI. As an alternative method, the UE may discard the UCI that is not transmitted. Alternatively, the UE may discard the UCI that is not transmitted, next time when a UCI of the same type is generated. Consequently, the buffer required for the UE can be reduced.

Figure 20:
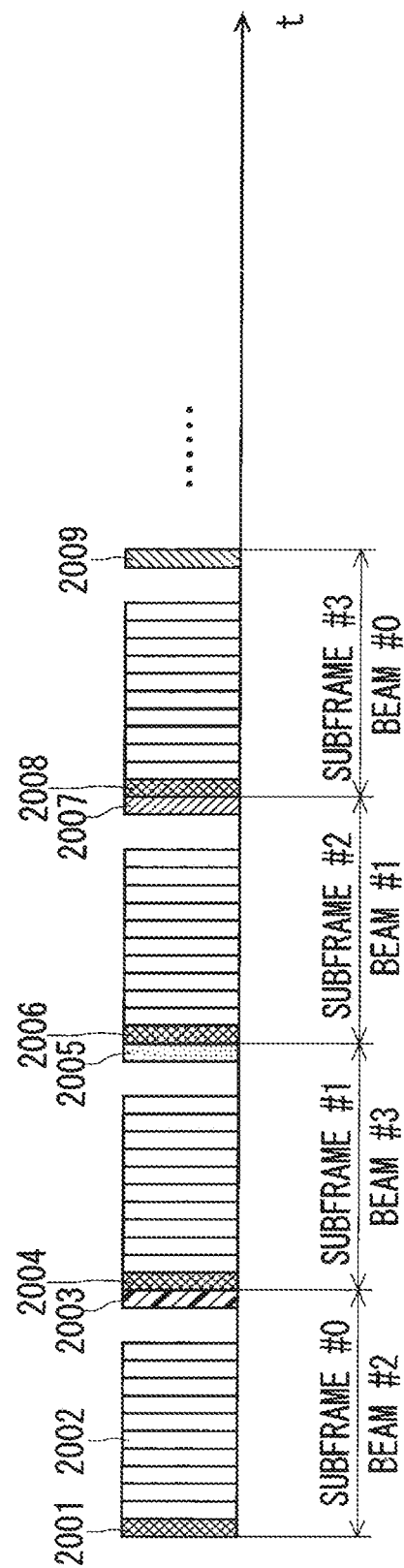
FIG. 20 illustrates one example method for setting the PUCCH resources in a subframe identical to that for the DL resources for the serving beam of the UE.

FIG. 20 illustrates one example method for setting the PUCCH resources in a subframe identical to that for the DL resources for the serving beam of the UE. A case where the number of times the beam sweeping is performed is four will be described herein. The number of symbols to be allocated to the PUCCH resources is 1 within 1 subframe. Here, the symbol whose symbol number is 13 is allocated to the PUCCH resources. The symbol number to be allocated to the PUCCH resources may be fixed. The number of symbols to be allocated to the downlink L1/L2 control signaling is 1 within 1 subframe. Here, the symbol whose symbol number is 0 is allocated to the downlink L1/L2 control signaling. The symbol number to be allocated to the downlink L1/L2 control signaling may be fixed.

The cell transmits and receives, in a subframe number 0, a beam 2002 with a beam number 2. The cell includes, in the UCI, information on whether the PUCCH resources can be transmitted for each UE, and notifies the information to the UE that communicates using the beam number 2 via downlink L1/L2 control signaling 2001 of the beam number 2. The cell may include, in the UCI, the symbol number information together with the information on whether the PUCCH resources can be transmitted, and notify the UE of the information.

The UE that performs transmission and reception via the beam 2002 with the beam number 2 receives the downlink L1/L2 control signaling 2001 with the subframe number 0, and receives the information on whether the PUCCH resources can be transmitted and the symbol number. Upon receiving that the PUCCH resources can be transmitted, the UE sets the PUCCH resources from the information on the preset PUCCH resources and the symbol number, so that the UE can transmit the PUCCH resources. The UE with the UCI to be transmitted transmits the PUCCH with the PUCCH resources. Here, the UE transmits a PUCCH 2003 with the beam #2.

Upon receiving that the PUCCH resources cannot be transmitted, the UE cannot transmit the PUCCH. Even in the presence of the UCI to be transmitted, the UE does not transmit the PUCCH.

The cell transmits and receives, in the next subframe number 1, a beam 2002 with the beam number 3. The cell includes, in the UCI, the information on whether the PUCCH resources can be transmitted for each UE, and notifies the UE that communicates using the beam number 3 of the information via downlink L1/L2 control signaling 2004 with the beam number 3. The cell may include, in the UCI, the symbol number information together with the information on whether the PUCCH resources can be transmitted, and notify the UE of the information.

The UE that performs transmission and reception via the beam 2002 with the beam number 3 receives the L1/L2 control signaling 2004 with the subframe number 1, and receives the information on whether the PUCCH resources can be transmitted and the symbol number. Upon receiving that the PUCCH resources can be transmitted, the UE sets the PUCCH resources from the information on the preset PUCCH resources and the symbol number, so that the UE can transmit the PUCCH resources. The UE with the UCI to be transmitted transmits the PUCCH with the PUCCH resources. Here, the UE transmits a PUCCH 2005 with the beam #3.

Upon receiving that the PUCCH resources cannot be transmitted, the UE cannot transmit the PUCCH. Even in the presence of the UCI to be transmitted, the UE does not transmit the PUCCH.

The cell transmits and receives, in the next subframe number 2, a beam 2002 with a beam number 1. The cell includes, in the UCI, the information on whether the PUCCH resources can be transmitted for each UE, and notifies the UE that communicates using the beam number 1 of the information via downlink L1/L2 control signaling 2006 with the beam number 1. The cell may include, in the UCI, the symbol number information together with the information on whether the PUCCH resources can be transmitted, and notify the UE of the information.

The UE that performs transmission and reception via the beam 2002 with the beam number 1 receives the L2/L2 control signaling 2006 with the subframe number 2, and receives the information on whether the PUCCH resources can be transmitted and the symbol number. Upon receiving that the PUCCH resources can be transmitted, the UE sets the PUCCH resources from the information on the preset PUCCH resources and the symbol number, so that the UE can transmit the PUCCH resources. The UE with the UCI to be transmitted transmits the PUCCH with the PUCCH resources. Here, the UE transmits a PUCCH 2007 with the beam #1.

Upon receiving that the PUCCH resources cannot be transmitted, the UE cannot transmit the PUCCH. Even in the presence of the UCI to be transmitted, the UE does not transmit the PUCCH.

The cell transmits and receives, in the next subframe number 3, a beam 2002 with a beam number 0. The cell includes, in the UCI, the information on whether the PUCCH resources can be transmitted for each UE, and notifies the UE that communicates using the beam number 0 of the information via downlink L1/L2 control signaling 2008 with the beam number 0. The cell may include, in the UCI, the symbol number information together with the information on whether the PUCCH resources can be transmitted, and notify the UE of the information.

The UE that performs transmission and reception via the beam 2002 with the beam number 0 receives the L1/L2 control signaling 2008 with the subframe number 3, and receives the information on whether the PUCCH resources can be transmitted and the symbol number. Upon receiving that the PUCCH resources can be transmitted, the UE sets the PUCCH resources from the information on the preset PUCCH resources and the symbol number, so that the UE can transmit the PUCCH resources. The UE with the UCI to be transmitted transmits the PUCCH with the PUCCH resources. Here, the UE transmits a PUCCH 2009 with the beam #0.

Upon receiving that the PUCCH resources cannot be transmitted, the UE cannot transmit the PUCCH. Even in the presence of the UCI to be transmitted, the UE does not transmit the PUCCH.

Consequently, the UE can transmit and receive the PUCCH along with the timing of the beam via which the cell performs transmission and reception. The UE can also determine whether the PUCCH can be transmitted, according to the information on whether the PUCCH can be transmitted that is included in the L1/L2 control signaling to be transmitted via the serving beam. Associating a downlink control signal with transmission of the PUCCH enables dynamic setting of the PUCCH resources according to the determination by the cell.

Figure 21:
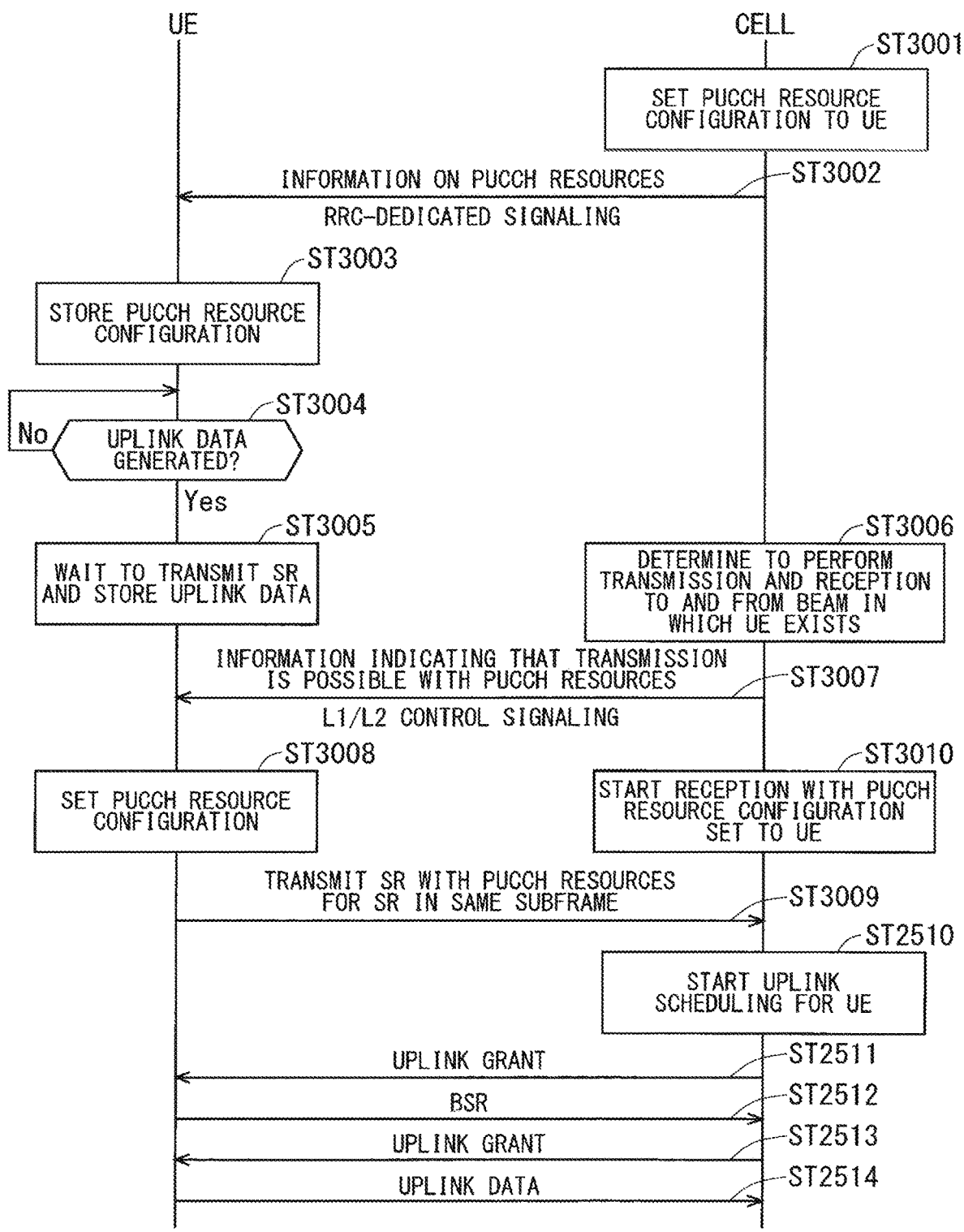
FIG. 21 illustrates one example sequence for setting the PUCCH resources in the subframe identical to that for the DL resources and transmitting and receiving the SR.

FIG. 21 illustrates one example sequence for setting the PUCCH resources in the subframe identical to that for the DL resources and transmitting and receiving the SR. Since the sequence illustrated in FIG. 21 includes the same Steps as those in the sequence illustrated in FIG. 16, the same step numbers will be assigned to the same Steps and the common description thereof will be omitted.

In Step ST3001, the cell sets, to the UE, a PUCCH resource configuration except for the timing.

In Step ST3002, the cell notifies the UE of information on the PUCCH resources except for the timing. The cell may notify the information on the PUCCH resources via a beam via which the cell communicates with the UE. The cell notifies the information on the PUCCH resources via the RRC-dedicated signaling.

Upon receipt of the information on the PUCCH resources except for the timing in Step ST3002, the UE stores the PUCCH resource configuration in Step ST3003.

In Step ST3004, the UE determines whether the uplink data has been generated. When the uplink data is not generated in Step ST3004, the UE returns to Step ST3004 to repeat the determination on whether the uplink data has been generated. When the uplink data has been generated in Step ST3004, the UE proceeds to Step ST3005.

In Step ST3005, the UE waits to transmit the SR, and stores the uplink data in the buffer.

In Step ST3006, the cell determines to perform, in an arbitrary subframe, transmission and reception to and from the beam via which the UE communicates. The cell also determines that the PUCCH can be transmitted to the UE in the subframe.

In Step ST3007, the cell notifies, in the subframe, the UE of the information indicating that the PUCCH can be transmitted. Here, the cell notifies the symbol number information together with the information indicating that the PUCCH can be transmitted. The cell includes, in the downlink L1/L2 control information, these pieces of information, and notifies the UE of the information via the downlink L1/L2 control signaling.

Upon receipt of the information indicating that the PUCCH can be transmitted in Step ST3007, the UE sets, in Step ST3008, the PUCCH resource configuration of its own UE in a subframe identical to the subframe in which the information has been received, using the information on the PUCCH resources for each UE that has been stored in Step ST3003, and the symbol number received in Step ST3007.

In Step ST3009, the UE transmits the SR that has been put on hold to the cell via the serving beam, with the PUCCH resource configuration for the SR that has been set in Step ST3008.

After notification of the information indicating that the PUCCH can be transmitted and the symbol number information to the UE in Step ST3007, the cell starts reception in Step ST3010 with the PUCCH resource configuration set in the same subframe to the UE.

The cell, which has started reception in Step ST3010 with the PUCCH resource configuration set to the UE, receives the SR transmitted from the UE in Step ST3009.

Upon receipt of the SR from the UE, the cell performs a process for starting the uplink communication. Consequently, the uplink communication is started between the UE and the cell.

Application of the methods disclosed in the second modification enables setting of the PUCCH resources when the beam sweeping in the MBF comes into operation. The cell sets the PUCCH resources to the UE according to the methods disclosed in the second modification, which enables transmission and reception of the PUCCH via the beam via which the UE is communicating and enables the uplink communication from the UE to the cell.

Consequently, the UE can transmit and receive the PUCCH along with the timing of the beam via which the cell performs transmission and reception. Consequently, the UE can determine whether the PUCCH can be transmitted, according to the information on whether the PUCCH can be transmitted that is included in the L1/L2 control signaling to be transmitted via the serving beam. This eliminates the need for controlling the beam via which the PUCCH is transmitted and received, with the PUCCH resources set to the UE. Thus, setting the PUCCH resources to the UE and controlling for transmitting and receiving the PUCCH can be facilitated.

According to the disclosed method, the cell notifies the UE of whether the PUCCH can be transmitted in the subframe identical to the subframe in which the DL resources are configured for the beams via which the UE communicates. The cell may notify not whether the PUCCH can be transmitted in the same subframe but whether the PUCCH can be transmitted in a subframe after an offset from a subframe in which whether the PUCCH can be transmitted has been notified.

Offset information indicating an offset value from the subframe in which whether the PUCCH can be transmitted has been notified may be provided. The cell notifies the UE of the offset information together with the information on whether the PUCCH can be transmitted. The UE transmits the PUCCH in a subframe distant by the offset value from the subframe in which the information on whether the PUCCH can be transmitted has been received. Upon receipt of the information indicating that the PUCCH cannot be transmitted, the UE does not transmit the PUCCH in the subframe distant by the offset value from the subframe in which the information on whether the PUCCH can be transmitted has been received.

Such methods may be applied when the cell recognizes the next transmission/reception timing of the beam via which the UE is communicating. Alternatively, such methods may be applied when the cell schedules the next transmission/reception timing of the beam via which the UE is communicating. Alternatively, such methods may be applied when the cell determines the next transmission/ reception timing of the beam via which the UE is communicating in notifying the UE of the information indicating that the PUCCH can be transmitted.

Consequently, the UE need not set or transmit the PUCCH in a subframe identical to the subframe in which the information indicating that the PUCCH can be transmitted has been received. Thus, the UE can transmit the PUCCH even when it takes some time for the UE to perform processes for transmitting the PUCCH, such as demodulating, decoding, coding, and modulating the PUCCH.

The UE may notify, in advance, the cell of the time or the capability required for the processes such as demodulating, decoding, coding, and modulating the PUCCH. The UE may notify the time or the capability as UE capability information. The cell may determine the offset value, using the time or the capability notified from the UE and required for the processes such as demodulating, decoding, coding, and modulating the PUCCH.

For example, when the UE can perform, in the same subframe, processes ranging from receiving whether the PUCCH can be transmitted to transmitting the PUCCH, the cell notifies the UE of 0 as the offset. When the offset is 0, the offset information may be omitted. For example, when it takes 2 subframes for the UE to perform the processes ranging from receiving whether the PUCCH can be transmitted to transmitting the PUCCH, the cell notifies the UE of 2 as the offset. Here, the cell may consider communication states of the other beams, and set 2 or more as the offset and notify it to the UE.

According to the disclosed methods, one subframe is allocated to one beam. The whole one subframe may be allocated not only to the single beam but to a plurality of beams. For example in one subframe, only a symbol to which a downlink L1/L2 control signal is mapped and a symbol including the PUCCH resources may be allocated to the same beam, and the other symbols may be allocated to the other beams. Consequently, the cell can further flexibly operate the beams, and increase the use efficiency of the radio resources of the cell.

For example, not only a downlink L1/L2 control signal of one beam but also downlink L1/L2 control signals of a plurality of beams may be allocated to one subframe. The downlink L1/L2 control signal may be allocated for each symbol. Not only the PUCCH resource of one beam but also the PUCCH resources of a plurality of beams may be allocated to one subframe. The PUCCH resource may be allocated for each symbol. The cell can receive the PUCCH transmission from the UE communicating with each beam, via a plurality of beams in one subframe.

A symbol to which the L1/L2 control signal may be mapped may be restricted in one subframe. The maximum value may be set to the number of such symbols. The UE may receive the symbol to which the L1/L2 control signal may be mapped to determine the presence or absence of the L1/L2 control signal for the serving beam. The cell may notify the UE of the maximum value in advance. The cell may broadcast the maximum value as information for each cell, or make the notification via the UE-dedicated signaling. Alternatively, the maximum value may be statically determined in, for example, a standard. The UE may receive only the symbol of the maximum value, and may not receive the subframe when the UE cannot receive the downlink L1/L2 control information addressed to its own UE.

Since application of such a method increases the communication opportunities via each beam, the SR transmission idle time can be shortened in the UE. Thus, the latency from generation of the uplink data from the UE to start of the uplink communication can be shortened.

When the L1/L2 control signals of a plurality of beams are allocated to a plurality of symbols in one subframe, the UE receives not the first symbol but the plurality of symbols. When the number of symbols to which the L1/L2 control signals are allocated is fixed, the UE can receive the L1/L2 control signals to be transmitted via the serving beam, upon receipt of the number of symbols. When a beam not requiring the L1/L2 control signals is generated while the number of symbols is fixed in advance, the symbols will be wasted.

A method for solving such a problem will be disclosed.

The cell may notify information on the number of symbols to be used for the L1/L2 control signals for each subframe. The information may be information common to cells. The information may be included in the downlink L1/L2 control information to be notified. The information may be L1/L2 control information dedicated to the UE. Alternatively, the information may be L1/L2 control information common to cells. Application of the L1/L2 control information common to cells can reduce the amount of information.

The physical channel to which the information on the number of symbols to be used for the L1/L2 control signals is mapped may be individually provided, and notified to the UE for each subframe. The physical channel may be mapped to the first symbol in a subframe.

Although what is disclosed is that the cell notifies the information on the number of symbols to be used for the L1/L2 control signals for each subframe, the cell may periodically make the notification. This method may be applied when the L1/L2 control signals of a plurality of beams are periodically allocated to a plurality of symbols in one subframe. The cell may notify, in advance, the UE of the period information and offset information indicating the starting point. The cell may broadcast such information as information for each cell, or make the notification via the UE-dedicated signaling. Alternatively, such information may be statically determined in, for example, a standard.

This enables flexible settings of the L1/L2 control signaling when the beam sweeping in the MBF comes into operation. The second modification enables setting of the PUCCH resources when the beam sweeping in the MBF comes into operation.

When all the beams in the cell cannot be formed with the same timing in the MBF, consecutively sweeping all the beams to allow transmission and reception of a control channel common to the cells is being studied in the NR (see Non-Patent Document 12). A portion in which all the beams are consecutively swept will also be referred to as a beam sweeping block.

When the PUCCH resource timing overlaps such a beam sweeping block timing, no symbol can be allocated to the PUCCH. In such a case, the beam sweeping block timing may be excluded as the PUCCH resource timing. The cell may not set the PUCCH resources when the beam sweeping block timing overlaps the PUCCH resource timing set to the UE. This disables transmission of the PUCCH.

Alternatively, the UE does not set the PUCCH resources when the beam sweeping block timing overlaps the PUCCH resource timing. Transmission of the PUCCH may be disabled. This may be predetermined in, for example, a standard. The cell notifies the UE of, for example, the beam sweeping block period. Thus, the UE can recognize the beam sweeping block timing.

This can prevent the unnecessary transmission of the PUCCH in the beam sweeping block. Consequently, the power consumption of the UE can be reduced.

Another method to be applied when the PUCCH resource timing overlaps the beam sweeping block timing will be disclosed.

The beam sweeping block is set to a self-contained subframe. The uplink transmission is enabled in transmission of each beam in a downlink beam sweeping block. A symbol for the uplink transmission may be allocated to the PUCCH.

A beam with the timing overlapping transmission of the PUCCH in a beam sweeping block may be not a beam requiring the transmission of the PUCCH but another beam. Here, the symbol for the uplink transmission of the beam requiring the transmission of the PUCCH in the beam sweeping block may be allocated to the PUCCH. This may be predetermined in, for example, a standard.

Even when the PUCCH resource timing overlaps the beam sweeping block timing, the PUCCH can be transmitted with the PUCCH resource timing or the beam sweeping block timing.

When the PUCCH resource timing overlaps the uplink beam sweeping block timing, a part of symbols in an uplink beam sweeping block may be allocated to the PUCCH.

The beam with the timing overlapping transmission of the PUCCH in the uplink beam sweeping block may be not a beam requiring the transmission of the PUCCH but another beam. Here, apart of symbols of beams requiring the transmission of the PUCCH in the uplink beam sweeping block may be allocated to the PUCCH. This may be predetermined in, for example, a standard.

Even when the PUCCH resource timing overlaps the uplink beam sweeping block timing, the PUCCH can be transmitted with the PUCCH resource timing or the uplink beam sweeping block timing.

When the PUCCH resource timing overlaps the downlink beam sweeping block timing in the frequency division duplex (FDD), no problem occurs because the frequencies are different. However, when the PUCCH resource timing overlaps the uplink beam sweeping block timing, a problem occurs. Here, the method disclosed on the uplink beam sweeping block may be applied thereto. Consequently, the same advantages can be produced.

Third Embodiment

The second embodiment to the second modification of the second embodiment disclose methods for allocating the PUCCH of each beam to different resources as methods for transmitting and receiving the PUCCH in the MBF requiring the beam sweeping. The third embodiment will disclose another method as the method for transmitting and receiving the PUCCH in the MBF requiring the beam sweeping.

The cell assigns priorities for receiving the PUCCH to beams. The cell assigns the priorities for receiving the PUCCH to the beams, and receives the PUCCH via the target beam according to the priorities.

The cell may assign priorities to UEs. The cell may assign priorities to beams via which the UEs communicate, using the priorities of the UEs. For example, the cell assigns priorities to beams in descending order of the priorities among the UEs communicating via the same beam.

The following (1) to (9) will be disclosed as examples of an indicator for assigning priorities.
(1) a communication service type: For example, a service requiring urgency is assigned a higher priority.
(2) a requested QoS: For example, the QoS requiring higher throughput is assigned a higher priority.
(3) a requested latency: For example, a UE requiring lower latency is assigned a higher priority.
(4) a load of each beam: For example, a beam with a higher load is assigned a higher priority.
(5) UE capability: For example, a UE with higher UE capability is assigned a higher priority.
(6) an SR period: For example, a UE with a longer SR period is assigned a higher priority.
(7) the number of UEs for each beam: For example, a beam for many UEs is assigned a higher priority.
(8) communication quality: For example, a beam with superior communication quality is assigned a higher priority.
(9) combinations of (1) to (8) above The cell may assign, in advance, priorities for receiving the PUCCH to beams according to the aforementioned indicators. The cell may assign, in advance, a priority to at least one of transmission and reception of a beam according to the aforementioned indicators. The cell may assign, in advance, priorities for receiving the PUCCH to the UEs according to the aforementioned indicators, and assign priorities to beams according to the priorities of the UEs.

The cell receives the PUCCH via the target beam according to the set priorities. For example, when the beam with superior communication quality is assigned a higher priority, the beam with superior communication quality is set to a beam via which the PUCCH is to be received. For example, the beam in which the UE with a higher priority exists is set to the beam via which the PUCCH is to be received.

When the transmission timing of the PUCCH by a UE with a beam conflicts with the transmission timing of the PUCCH by a UE with another beam, the cell determines via which one of the beams transmission and reception should be preferentially performed, according to the set priorities. The same may hold true when the transmission timing of the PUCCH by the UE with the beam conflicts with the scheduling timing for performing transmission and reception via the other beam, not limited to when the transmission timing of the PUCCH by the UE with the beam conflicts with the transmission timing of the PUCCH by the UE with the other beam.

An example of assigning priorities to beams via which the UEs communicate, using the priorities of the UEs will be disclosed. When the aforementioned timings conflict with each other, with the timings, the cell receives the PUCCH via a beam via which the UE with a higher priority communicates, and does not receive the PUCCH via a beam via which the UE with a lower priority communicates. The UE with a higher priority with the timings transmits the PUCCH to the cell. Although the UE with a lower priority with the timings transmits the PUCCH to the cell, the cell does not receive the PUCCH.

Although the UE with a lower priority transmits the PUCCH with the conflicting timings, no problem occurs because the cell communicates via a beam different from the beam via which the UE communicates. Thus, the reception signals do not conflict with each other in the cell.

Even when the transmission timings of the PUCCH conflict with each other, the setting for the PUCCH resources can be implemented regardless of beams, by assigning priorities to the beams and transmitting and receiving the PUCCH via the beams according to the priorities. Thus, it is possible to avoid complexity in the processes that is caused by, for example, addition of a process for the UE.

Although the cell does not receive the PUCCH from the UE with a lower priority according to the previously disclosed method, the UE with a lower priority performs transmission with the timing set for transmitting the PUCCH each time. These transmissions are unnecessary, which will cause problems of increase in the power consumption in the UE and increase in the uplink interference power.

A method for solving such a problem will be disclosed.

The UE that is receiving the BSR is assigned the lowest priority. The cell assigns the lowest priority to the UE that is receiving the BSR. Upon completion of the transmission of the uplink scheduling (uplink grant) for the BSR, the cell restores the priority of the UE to its original. Application of such a method enables transmission and reception of the PUCCH via the beam via which the UE with a lower priority communicates. This can avoid the UE with a lower priority from repeated transmission of unnecessary PUCCHs.

Another method will be disclosed. The cell notifies the UE with a lower priority of the information on whether the PUCCH can be transmitted, in a subframe with the PUCCH resources via the beam via which the UE communicates. The cell maps the downlink L1/L2 control signal of the beam via which the UE communicates to a subframe with the PUCCH resources, and includes the information indicating whether the PUCCH can be transmitted in the downlink L1/L2 control signal of the beam. The cell may include only the information indicating that the PUCCH cannot be transmitted in the downlink L1/L2 control signal of the beam.

The resources for the downlink L1/L2 control signal may be set per symbol. The resources for the downlink L1/L2 control signal may be set to one symbol. The UE receives the downlink L1/L2 control signal of the beam via which its own UE communicates, in the subframe with the PUCCH resources to determine whether the PUCCH can be transmitted. Upon receiving that the PUCCH cannot be transmitted, the UE does not transmit the PUCCH. The methods disclosed in the second modification of the second embodiment may be applied to transmission of the information on whether the PUCCH can be transmitted.

Application of the methods can prevent the UE with a lower priority from transmitting the PUCCH with the conflicting timings. This can avoid repeated transmission of unnecessary PUCCHs from the UE with a lower priority.

Figure 22:
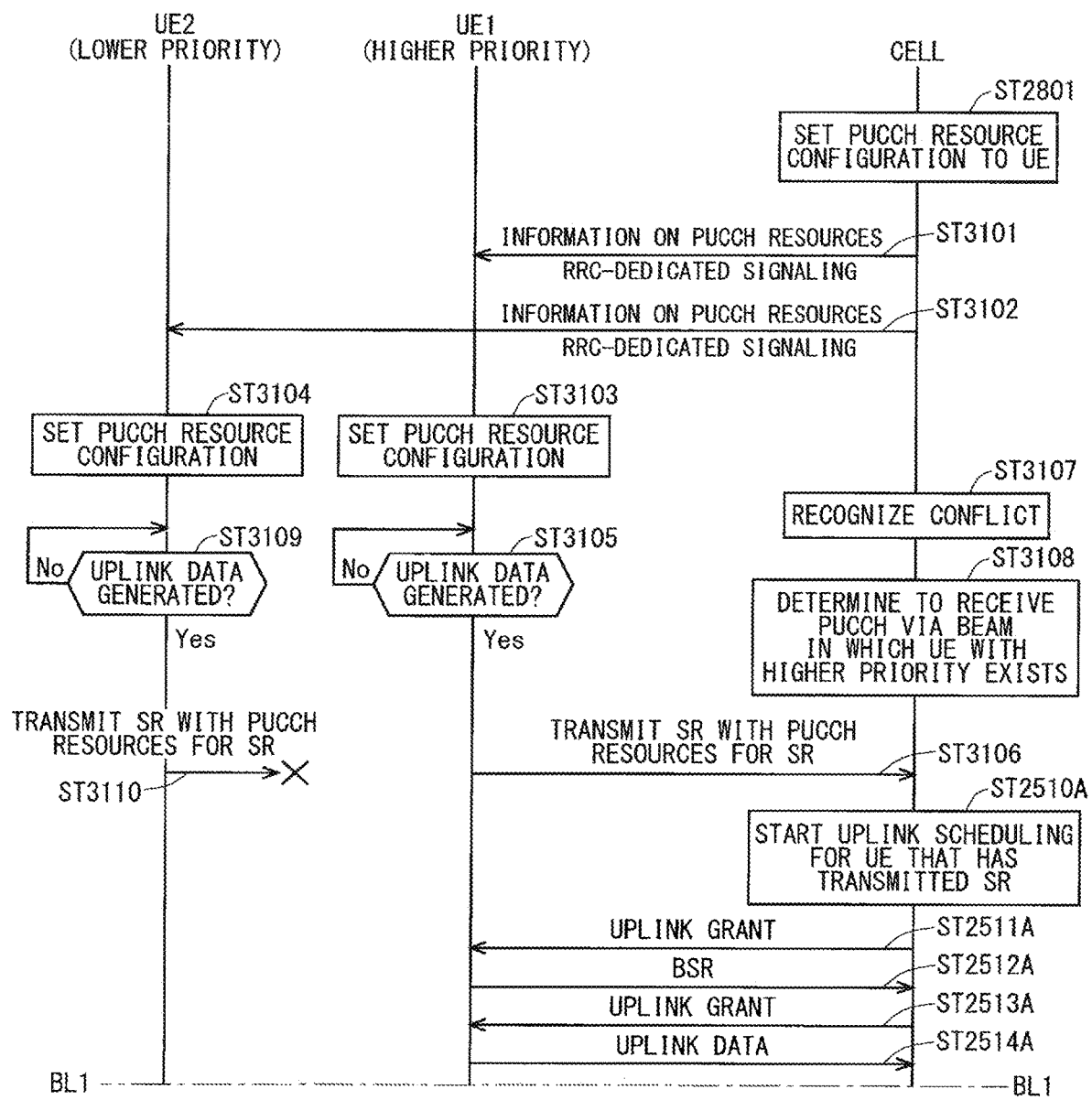
FIG. 22 illustrates one example sequence for transmitting and receiving the SR when priorities for receiving the PUCCH are assigned to beams.

FIGS. 22 and 23 illustrate one example sequence for transmitting and receiving the SR when priorities for receiving the PUCCH are assigned to beams. FIGS. 22 and 23 are connected across a location of a border BL1. Since the sequence illustrated in FIGS. 22 and 23 includes the same Steps as those in the sequence illustrated in FIG. 19, the same step numbers will be assigned to the same Steps and the common description thereof will be omitted. FIGS. 22 and 23 illustrate a case where a UE with a higher priority (may be hereinafter referred to as a "UE 1") and a UE with a lower priority (may be hereinafter referred to as a "UE 2") exist and a beam via which the UE with a higher priority communicates is different from a beam via which the UE with a lower priority communicates.

In Step ST2801, the cell sets, to the UE 1, a PUCCH resource configuration for each UE. In Step ST2801, the cell also sets, to the UE 2, a PUCCH resource configuration for each UE.

In Step ST3101, the cell notifies the UE 1 of the information on the PUCCH resources for each UE. The cell may notify the information on the PUCCH resources via a beam via which the cell communicates with the UE 1. The cell notifies the information on the PUCCH resources via the RRC-dedicated signaling.

In Step ST3102, the cell notifies the UE 2 of the information on the PUCCH resources for each UE. The cell may notify the information on the PUCCH resources via a beam via which the cell communicates with the UE 2. The cell notifies the information on the PUCCH resources via the RRC-dedicated signaling.

Upon receipt of the information on the PUCCH resources for each UE in Step ST3101, the UE 1 sets the PUCCH resource configuration in Step ST3103.

Upon receipt of the information on the PUCCH resources for each UE in Step ST3102, the UE 2 sets the PUCCH resource configuration in Step ST3104.

In Step ST3105, the UE 1 determines whether the uplink data has been generated. When the uplink data is not generated in Step ST3105, the UE 1 returns to Step ST3105 to repeat the determination on whether the uplink data has been generated. When the uplink data has been generated in Step ST3105, the UE 1 proceeds to Step ST3106.

In Step ST3106, the UE 1 transmits the SR to the cell via the serving beam with the set PUCCH resource configuration for the SR.

In Step ST3107, the cell recognizes a conflict between the UE 1 and the UE 2 with the PUCCH resource timing.

In Step ST3108, the cell determines to receive, with the PUCCH resource timing, the PUCCH via a beam via which the cell communicates with the UE with a higher priority, here, the UE 1. In other words, the cell determines not to receive, with the PUCCH resource timing, the PUCCH via a beam via which the cell communicates with the UE with a lower priority, here, the UE 2.

In Step ST3106, the cell receives, with the PUCCH resources set to the UE 1, the SR transmitted from the UE 1.

Upon receipt of the SR from the UE 1, the cell starts, in Step ST2510A, the uplink scheduling for the UE that has transmitted the SR, that is, the UE 1.

In Step ST2511A, the cell transmits, to the UE 1, an uplink grant, specifically, the uplink scheduling information including the uplink grant.

Upon receipt of the uplink grant in Step ST251TA, the UE 1 transmits a Buffer Status Report (BSR) to the cell using the uplink grant in Step ST2512A. Here, the UE 1 may transmit the uplink data.

Upon receipt of the BSR in Step ST2512A, the cell performs the uplink scheduling for the UE 1 according to the BSR.

In Step ST2513A, the cell transmits the uplink grant to the UE 1. Upon receipt of the uplink grant in Step ST2513A, the UE 1 transmits the uplink data to the cell using the uplink grant in Step ST2514A. In Step ST2514A, the cell receives the uplink data transmitted from the UE 1.

As described above, the cell performs processes for starting the uplink communication with the UE 1 from Steps ST2511A to ST2514A. Consequently, the uplink communication is started between the UE 1 and the cell.

In Step ST3109, the UE 2 determines whether the uplink data has been generated. When the uplink data is not generated in Step ST3109, the UE returns to Step ST3109 to repeat the determination on whether the uplink data has been generated. When the uplink data has been generated in Step ST3109, the UE proceeds to Step ST3110.

In Step ST3110, the UE 2 transmits the SR to the cell via the serving beam with the set PUCCH resource configuration for the SR.

However, the cell determines in Step ST3108 to receive, with the PUCCH resource timing, the PUCCH via the beam via which the cell communicates with the UE 1. Then in Step ST3108, the cell receives, with the PUCCH resources set to the UE 1, the SR transmitted from the UE 1.

Thus, the cell cannot receive the SR transmitted from the UE 2 via the beam via which the cell communicates with the UE 2 in Step ST3110.

In Step ST3111, the cell determines whether the BSR of the UE 1 that is a UE with a higher priority is being received. When the cell is not receiving the BSR in Step ST3111, the cell returns to Step ST3111 to determine again whether the BSR is being received. When the cell is receiving the BSR in Step ST3111, the cell proceeds to Step ST3112.

When the cell is receiving the BSR in Step ST3111, the cell determines that the UE 1 need not transmit the SR because the cell is performing the process for scheduling the resources for transmitting the uplink data to the UE 1. In Step ST3112, the cell assigns the lowest priority to the UE 1.

In Step ST3113, the cell recognizes again a conflict between the UE 1 and the UE 2 with the PUCCH resource timing.

In Step ST3114, the cell determines to receive, with the PUCCH resource timing, the PUCCH via the beam via which the cell communicates with the UE with a higher priority, here, the UE 2. In other words, the cell determines not to receive, with the PUCCH resource timing, the PUCCH via the beam via which the cell communicates with the UE with a lower priority, here, the UE 1.

Although the UE 2 cannot receive the uplink grant in spite of the transmission of the SR in Step ST3110, the UE 2 retransmits, with the PUCCH resource timing, the SR to the cell via the serving beam with the set PUCCH resource configuration for the SR in Step ST3115.

In Step ST3115, the cell receives, with the PUCCH resources set to the UE 2, the SR transmitted from the UE 2.

Upon receipt of the SR from the UE 2, the cell starts, in Step ST2510A, the uplink scheduling for the UE that has transmitted the SR, that is, the UE 2.

In Step ST2511B, the cell transmits, to the UE 2, an uplink grant, specifically, the uplink scheduling information including the uplink grant.

Upon receipt of the uplink grant in Step ST2511B, the UE 2 transmits the BSR to the cell using the uplink grant in Step ST2512B. Here, the UE 2 may transmit the uplink data.

Upon receipt of the BSR in Step ST2512B, the cell performs the uplink scheduling for the UE 2 according to the BSR.

In Step ST2513B, the cell transmits the uplink grant to the UE 2. Upon receipt of the uplink grant in Step ST2513B, the UE 2 transmits the uplink data to the cell using the uplink grant in Step ST2514B. In Step ST2514B, the cell receives the uplink data transmitted from the UE 2.

As described above, the cell performs processes for starting the uplink communication with the UE 2 from Steps ST2511B to ST2514B. Consequently, the uplink communication is started between the UE 2 and the cell.

Even when the PUCCH resource timings of a plurality of UEs with different beams for communication conflict with each other, the cell can receive the PUCCHs of the plurality of UEs.

Consequently, the conventional methods for setting the PUCCHs can be applied regardless of the beams. Thus, it is possible to avoid complexity in the processes that is caused by, for example, addition of a process for the UE. Reassigning the lowest priority to the UE to which the cell has transmitted the uplink grant enables reception of the PUCCH from the UE with a lower priority via the beam. Thus, it is possible to avoid increase in the power consumption and increase in the uplink interference power due to repetition of unnecessary transmission of the PUCCH from the UE with a lower priority.

Fourth Embodiment

The second to the third embodiments disclose allocating symbols as the smallest unit of resources to which the PUCCH is allocated. As the number of times the beam sweeping is performed increases, the number of symbols necessary for the PUCCH resources also increases. Thus, configuring the PUCCH resources for many beams within one subframe will cause problems of reduction in the resources for data and decrease in the communication rate. Alternatively, configuring the PUCCH resources for fewer beams within one subframe requires the PUCCH resources over a plurality of subframes, and increases intervals at which the PUCCH resources for each beam are generated. These create a problem of increase in the latency.

The fourth embodiment will disclose a method for solving such problems.

A plurality of symbols are configured within one symbol duration, and the PUCCH resources of a plurality of beams are time-division multiplexed. The number of the plurality of symbols to be configured within one symbol duration may be $2^n$ times (n is a natural number). Consequently, the symbol duration during which the PUCCH resources are allocated can be shortened, and the PUCCH resources for many beams can be configured. The symbol that has been shortened may be referred to as a shortened symbol in the following description.

Larger subcarrier spacing (see 3GPP R1-166566 (hereinafter referred to as "Reference 7")) approach proposed by 3GPP may be applied as a method for configuring a plurality of symbols within one symbol duration. Reference 7 discloses that four symbols are configured within one symbol duration and that the UE performs transmission using the four symbols by sweeping beams in each of the symbols. Reference 7 also discloses that the cell receives transmission from one UE in the four symbols.

According to the fourth embodiment, each shortened symbol is allocated as a PUCCH resource for each UE. Upon receipt of a plurality of shortened symbols configured within one symbol duration, the cell can receive the PUCCHs from a plurality of UEs communicating via different beams.

Shortening one symbol duration widens the subcarrier spacing. Since the MBF requiring the beam sweeping does not allow transmission and reception with the same timing via a plurality of beams, the time-division multiplexing is necessary. Conversely, since the transmission and reception can be performed with a given timing only via a beam in a specific direction, the frequency resources over the entire bandwidth can be used with the timing. Even when the subcarrier spacing is widened and the required frequency resources increase, it is effective to shorten one symbol duration and allocate the one symbol duration to the PUCCHs for a plurality of beams.

Although disclosed is configuring, within one symbol duration, $2^n$ times of the symbols according to the aforementioned method, the duration may not include one symbol but a plurality of symbols. Each of the plurality of symbols may have $2^n$ times of the symbols within one symbol duration. The value n may be consistent among the symbols, or different in each of the symbols.

Consequently, the PUCCH resources for many more beams can be allocated to the shortened symbols.

A method for setting the resources for the PUCCH will be disclosed. Besides the information on the PUCCH resources disclosed in the second embodiment, information on the shortened symbols is provided.

The following (1) to (6) will be disclosed as specific examples of the information on the shortened symbols:
(1) a symbol number of a symbol to be a shortened symbol;
(2) the number of the shortened symbols to be configured in one symbol;
(3) a symbol length of a shortened symbol;
(4) a subcarrier spacing of a shortened symbol;
(5) a symbol number of a shortened symbol: and
(6) combinations of (1) to (5) above.

The cell notifies the UE of the information on the shortened symbols. The cell may notify the UE of the information on the PUCCH resources. The cell may notify the UE of the information on the shortened symbols and the information on the PUCCH resources in combination.

The cell may notify the UE of the information on the shortened symbols together with the information on the corresponding PUCCH resources, or include the information on the shortened symbols in the information on the corresponding PUCCH resources to notify the information on the shortened symbols.

The PUCCH resources may be set not only to the shortened symbols but to normal symbols that are not the shortened symbols. Here, the information on the PUCCH resources for the normal symbols may be provided separately from the information on the PUCCH resources for the shortened symbols.

The methods according to the second to the third embodiments may be appropriately applied to a method for allocating the resources for the PUCCH. The methods disclosed in each of the embodiments and the modifications may be applied to a method for notifying the information on the shortened symbols or the information on the corresponding PUCCH resources.

Consequently, the PUCCH resources for many more beams can be configured within one subframe for the cell or the TRP requiring the beam sweeping a large number of times. This can suppress decrease in the communication rate due to decrease in the resources for data, and increase in the latency due to increase in the intervals at which the PUCCH resources for each beam are generated.

Since the UE transmits the PUCCH in the shortened symbol, the UE can shorten the time to transmit the PUCCH. Consequently, the power consumption of the UE and the uplink interference power can be reduced.

The cell may separately use the normal symbols and the shortened symbols. The cell may determine whether to use the normal symbols or the shortened symbols, for example, according to the number of times the beam sweeping is performed. When the number of times the beam sweeping is performed is many, the cell may configure the shortened symbols. Consequently, when the number of times the beam sweeping is performed is less, the shortened symbols are unnecessary. Thus, the settings and the processes in the cell and the UE can be facilitated.

The cell may determine whether to use the normal symbols or the shortened symbols, for another example, according to the number of UEs communicating with each of the beams. The shortened symbols are configured for and allocated to the beams with a few number of UEs for communication. The normal symbols are allocated to the beams with a large number of UEs for communication. The shortened symbols increase the subcarrier spacing. Consequently, the number of UEs that can be multiplexed with one shortened symbol decreases more than that using the normal symbol. Thus, it is effective to allocate the normal symbols to the beams with a large number of UEs for communication.

Separately using the normal symbols and the shortened symbols can increase the use efficiency of the radio resources according to, for example, the beam structure and a load of each beam.

First Modification of Fourth Embodiment

The fourth embodiment discloses a method for solving the problem of increase in the number of symbols necessary for the PUCCH resources as, for example, the number of times the beam sweeping is performed increases.

The first modification will disclose another method for solving such a problem.

One symbol duration is divided into a predefined number. In the following description, a duration obtained by dividing the one symbol duration by the predefined number may be referred to as a divided duration. The predefined number is denoted by n. The UE multiplies the PUCCH data timing within one symbol by n, and repeats the PUCCH data within the one symbol n times. The UE transmits the PUCCH in this manner. The cell shortens intervals at which the beams are switched. The cell switches between the beams for a divided duration of 1/n obtained by dividing one symbol duration to receive the PUCCH.

The UE transmits the PUCCH for one symbol duration via a beam via which the UE communicates, whereas the cell receives the PUCCH for the divided duration via the beam. The cell receives the PUCCH transmitted from the UE via a plurality of beams, for the divided duration via each of the beams. Consequently, the cell can receive, for the divided duration, the PUCCH transmitted for one symbol duration via a plurality of beams.

Interleaved Frequency Domain Multiple Access (IF-DMA) based approach (see "Reference 7") proposed by 3GPP may be applied as a method for multiplying the PUCCH data timing within one symbol by n and repeating the PUCCH data within the one symbol n times. Reference 7 discloses multiplying the data timing within one symbol by four and repeating the data within the one symbol four times.

Reference 7 discloses a case where in one symbol, one UE repeats data and switches between beams for each data to transmit the data. The cell receives the data via the same beams for one symbol duration. Although one UE repeats data in one symbol n times in the first modification, it never switches between beams. The cell switches between the beams for a divided duration of 1/n obtained by dividing one symbol duration to receive the data. The cell receives one piece of the data repeated n times.

Subcarriers are discretely used at n intervals to accelerate the data timing n times. Transmitting data using seemingly n times as many sub-carriers can accelerate the data timing n times. Since the data timing is accelerated n times within one symbol duration, the same data is repeated n times. Cyclic Prefix (CP) may be added to the beginning of one symbol. Alternatively, CP may be added to the end of one symbol. Alternatively, CP may be added to both the beginning and the end of one symbol. The cell and the UE may mutually recognize the CP.

The UE repeatedly transmits data for PUCCH n times in a symbol set for the PUCCH resources for one symbol duration. UEs with different beams each repeatedly transmit the data for PUCCH n times in a symbol set for the PUCCH resources for one symbol duration. Here, the UEs with different beams may transmit the data for PUCCH in the same symbol.

The cell switches between the beams for a divided duration of 1/n obtained by dividing one symbol duration to receive the data. The cell receives one piece of the data for PUCCH to be transmitted from the UE with each beam and repeated n times. Consequently, the PUCCH resources for many more beams can be allocated to one symbol. Moreover, discrete Fourier transform spread (DFT-s)-OFDM can be used. Thus, an uplink Peak-to-Average Power Ratio (PAPR) of the UE and the power consumption of the UE can be reduced.

A method for setting the resources for the PUCCH will be disclosed. Besides the information on the PUCCH resources disclosed in the second embodiment, information on the divided duration is provided.

The following (1) to (7) will be disclosed as specific examples of the information on the divided duration:

(1) the number of divisions in one symbol;
(2) how many times a frequency range is increased;

(3) frequency resources;
(4) the number of times data is repeated;
(5) a method for inserting the CP;
(6) the position into which the CP is inserted; and
(7) combinations of (1) to (6) above.

The cell notifies the UE of the information on the divided duration. The cell may notify the UE of the information on the PUCCH resources. The cell may notify the UE of the information on the divided duration and the information on the PUCCH resources in combination.

The cell may notify the UE of the information on the divided duration together with the information on the corresponding PUCCH resources, or include the information on the divided duration in the information on the corresponding PUCCH resources to notify the information on the divided duration.

The PUCCH resources may be set not only to the divided duration but to normal symbols that are not divided. Here, the information on the PUCCH resources for the normal symbols may be provided separately from the information on the PUCCH resources for the divided symbols.

The methods according to the second to the third embodiments may be appropriately applied to a method for allocating the resources for the PUCCH. The methods disclosed in each of the embodiments and the modifications may be applied to a method for notifying the information on the divided duration or the information on the corresponding PUCCH resources.

Consequently, the PUCCH resources for many more beams can be configured within one subframe for the cell or the TRP requiring the beam sweeping a large number of times. This can suppress decrease in the communication rate due to decrease in the resources for data, and increase in the latency due to increase in the intervals at which the PUCCH resources for each beam are generated.

The cell may separately use the normal symbols and the divided symbols. The methods disclosed in the fourth embodiment may be applied thereto. Consequently, the use efficiency of the radio resources can be increased according to, for example, the beam structure and a load of each beam.

Fifth Embodiment

Upon receipt of the SR, the cell transmits an uplink grant as a response signal for the SR. 3GPP has never discussed the transmission timing of the uplink grant for the SR in the MBF requiring the beam sweeping. When the beam sweeping is required, the timing of each beam is limited. Thus, the cell and the UE need to mutually recognize the transmission timing of the uplink grant for the SR.

The fifth embodiment will disclose the transmission/reception timing of a response signal to the SR.

After the UE transmits the SR, the cell receiving the SR makes the timing to transmit the uplink grant to the UE asynchronous. The cell transmits the uplink grant for the SR to the UE with an arbitrary timing via a serving beam of the UE via which the SR has been transmitted. After transmitting the SR, the UE receives the L1/L2 control signal in each subframe.

Even when the cell performs transmission and reception via the other beams from receipt of the SR to the transmission timing of the uplink grant, the UE receives the L1/L2 control signal in each subframe. In the case where the cell performs transmission and reception via the other beams, the UE can determine the absence of the uplink grant because the UE cannot receive the L1/L2 control signal. Consequently, the UE can receive the uplink grant transmitted with an arbitrary timing.

The cell determines the timing to transmit the uplink grant for the SR via the beam via which the SR has been received. The examples of the judgment indicators for allocating the PUCCH resources that are disclosed in the second embodiment may be applied to examples of a judgment indicator for the determination.

As such, making the timing to transmit the uplink grant for the SR asynchronous enables the cell to determine the timing to transmit the uplink grant according to a state indicated by the judgment indicator. Even when the timing is asynchronous, the UE can receive the uplink grant for the transmitted SR, and start the uplink communication.

Another method on the transmission/reception timing of the uplink grant for the SR will be disclosed.

When the timing to transmit the uplink grant for the SR is made asynchronous, the UE has to receive the L1/L2 control signal in each subframe after transmitting the SR. However, since the MBF requiring the beam sweeping has the timing to perform transmission and reception via the other beams, a problem for the UE to perform unnecessary reception in each subframe occurs.

A method for solving such a problem will be disclosed.

Assume N+L as the transmission timing of the uplink grant for the SR. Here, N denotes the SR transmission timing. L denotes one value larger than or equal to 0. N and L may be represented per scheduling. Examples of the unit of scheduling include per subframe, per slot, and per mini-slot.

Consequently, the UE need not receive the L1/L2 control signal in each subframe. Thus, the power consumption of the UE can be reduced due to no unnecessary reception operation.

Another method will be disclosed.

In the method previously disclosed, L denotes one value. L may denote a plurality of values. The cell sets, to the UE, a plurality of timings for the SR, for example, L1, L2, L3, . . . . The maximum value for the number of Ls may be determined.

A range (duration) for setting the value L may be determined. The range (duration) for setting the value L is denoted by, for example, K. For example, when the unit of scheduling is per subframe, the value L is set within K subframes. After a lapse of the K subframes, the setting for a duration denoted by K may be further repeated. For example, K=6 and L=1, 3 are set.

N may be a starting point as a starting point for the duration denoted by K. Alternatively, an offset value may be provided, and a point after the offset from N may be set as a starting point.

When N is the starting point in the aforementioned example, the setting of L=1, 3 is repeated every 6 subframes with respect to N as the starting point.

The transmission timing of the uplink grant for the SR is set to the (L+1)-th subframe from the first subframe during a duration from subframe (N+0) to subframe N+(K−1) with respect to N as the starting point.

Here, the transmission timing of the uplink grant for the SR is set in the (N+1)-th and the (N+3)-th subframes. After a lapse of K=6, the setting for the duration denoted by K may be further repeated.

The setting of a plurality of values enables the cell to select the transmission timing of the uplink grant for the SR. The cell does not have to transmit the uplink grant with all the set plurality of timings. The cell may transmit and receive the other beams. The cell can determine the transmission timing of the uplink grant for the SR according to a state for each beam.

The UE receives the L1/L2 control signal with the set plurality of timings.

Consequently, the power consumption of the UE can be more reduced and the transmission timing can be more appropriate for a state of the cell than those when the transmission timing is made asynchronous. This can increase the use efficiency of the radio resources of the cell.

Another method will be disclosed.

The value L may be set differently between odd and even numbers. When L is an even number (may include 0), the transmission timing of the uplink grant for the SR is generated in the even-numbered subframe with respect to N as a starting point. When L is an odd number, the transmission timing of the uplink grant for the SR is generated in the odd-numbered subframe with respect to N as a starting point.

The cell selects the set N+L transmission timings, and transmits the uplink grant for the SR. The cell does not have to transmit the uplink grant with all the N+L transmission timings. The cell may transmit and receive the other beams. The cell can determine the transmission timing of the uplink grant for the SR according to a state for each beam.

The UE receives the L1/L2 control signal with the N+L transmission timings according to L set to either an odd number or an even number. Consequently, the power consumption of the UE can be half and the transmission timing can be more appropriate for a state of the cell than those when the transmission timing is made asynchronous. This can increase the use efficiency of the radio resources of the cell.

Although disclosed is setting L to either an odd number or an even number, the setting may be made similarly using a remainder of A. A is an integer larger than or equal to 1. L is set to 0, 1, 2, . . . , or (A−1). For example, when A=6, L is set to 0, 1, 2, 3, 4, or 5.

Here, the transmission timings denoted by N+(A×(n−1)+L) are generated.

The cell selects the set transmission timings, and transmits the uplink grant for the SR. The cell does not have to transmit the uplink grant with all the set transmission timings. The cell may transmit and receive the other beams. The cell can determine the transmission timing of the uplink grant for the SR according to a state for each beam.

The UE receives the L1/L2 control signal with the set timings according to the set L. Consequently, the power consumption of the UE can be half and the transmission timing can be more appropriate for a state of the cell than those when the transmission timing is made asynchronous. This can increase the use efficiency of the radio resources of the cell.

Although disclosed is setting with the timing with respect to N as the starting point, the setting may be made by a subframe number given in the cell. This is effective when a subframe number is given to indicate via which beam transmission and reception is performed.

Another method will be disclosed.

A duration during which the uplink grant for the SR is not transmitted may be set to L. The cell transmits the uplink grant for the SR with an arbitrary timing later than N+L. The UE receives the L1/L2 control signal with the timing later than N+L.

For example, assume the processing time by the cell as n, the setting when L>n is made. Here, the cell does not transmit the uplink grant for the SR with the timing from N to N+L. The cell transmits the uplink grant for the SR with an arbitrary timing later than N+L. The UE does not receive the L1/L2 control signal with the timing from N to N+L. The UE receives the L1/L2 control signal with the timing later than N+L.

When the unit of scheduling is per subframe, the cell does not transmit the uplink grant for the SR in subframes from N to N+L. The cell transmits the uplink grant for the SR in arbitrary subframes later than N+L. The UE does not receive the L1/L2 control signal in the subframes from N to N+L. The UE receives the L1/L2 control signal in each subframe later than N+L.

Consequently, the UE does not have to receive the L1/L2 control signal in some subframes after transmitting the SR.

Moreover, a reception duration later than N+L may be set. The reception duration is denoted by W. The cell transmits the uplink grant for the SR with an arbitrary timing for a duration denoted by W later than N+L. The UE receives the L1/L2 control signal with the timing for the duration denoted by W later than N+L.

Consequently, the UE does not have to receive the L1/L2 control signal in some subframes after transmitting the SR. The UE has only to receive the L1/L2 control signal for the duration denoted by W later than N+L. Thus, the power consumption of the UE can be reduced.

Consequently, the cell can make the transmission timing more appropriate for a state of the cell while reducing the power consumption of the UE. This can increase the use efficiency of the radio resources of the cell.

Another method will be disclosed.

The method is to follow the timing to perform the downlink scheduling for the UE when the timing is predetermined. The UE receives the L1/L2 control signal with the timing to perform the downlink scheduling subsequent to the transmission of the SR. The methods disclosed in the first embodiment may be applied to a method for presetting the timing to perform the downlink scheduling to the UE.

This enables application of a method consistent not only with that for the uplink grant for the SR but also with that for the normal scheduling. Thus, processes in the cell and the UE can be facilitated.

Among the methods previously disclosed, methods for the cell to set information (may be hereinafter referred to as "information on an SR response") to the UE and notify the UE of the information will be disclosed.

The methods may be fixed in a system. The methods may be statically predetermined in, for example, a standard.

As an alternative method, the setting may be made for at least one of each cell and each beam. The method for the cell to notify the UE of the information may be the same as the method for notifying the information on the PUCCH resources for each beam that is disclosed in the second embodiment. For example, the information for each cell may be included in the system information to be broadcast, or included in an RRC message to be notified individually to each UE.

As an alternative method, the setting may be made for each UE. The method for the cell to notify the UE of the information may be the same as the method for notifying the information on the PUCCH resources for each UE that is disclosed in the second embodiment. For example, the information for each UE may be included in the RRC message to be notified individually to each UE.

These setting and notification methods may be performed in combination. These methods may be separately used for each piece of the information on the SR response. For example, when a remainder is used, A is fixed in a system, and L is set for each UE, etc. Alternatively, K is set for each cell, and L is set for each beam, etc. Consequently, the cell can notify the UE of the timing with which the uplink grant for the SR is to be generated.

Another method will be disclosed.

The cell and the UE derive the timing to transmit the uplink grant for the SR, using a UE identifier of the UE that has transmitted the SR. For example, when N+L denotes the timing to transmit the uplink grant for the SR, the cell and the UE derive L using an identifier of the UE that has transmitted the SR. For example, when the identifier of the UE is odd, the cell and the UE determine L to be odd. For example, when the identifier of the UE is even, the cell and the UE determine L to be even.

An identifier of a beam may be used instead of the identifier of the UE. The cell and the UE derive the timing to transmit the uplink grant for the SR, using an identifier of the beam via which the UE that has transmitted the SR is communicating. For example, when N+L denotes the timing to transmit the uplink grant for the SR, the cell and the UE derive L using the identifier of the beam via which the UE that has transmitted the SR is communicating. For example, when the identifier of the beam is odd, the cell and the UE determine L to be odd. For example, when the identifier of the beam is even, the cell and the UE determine L to be even.

Consequently, the cell does not have to set the information on the SR response to the UE. This can reduce the signaling load.

Figure 24:
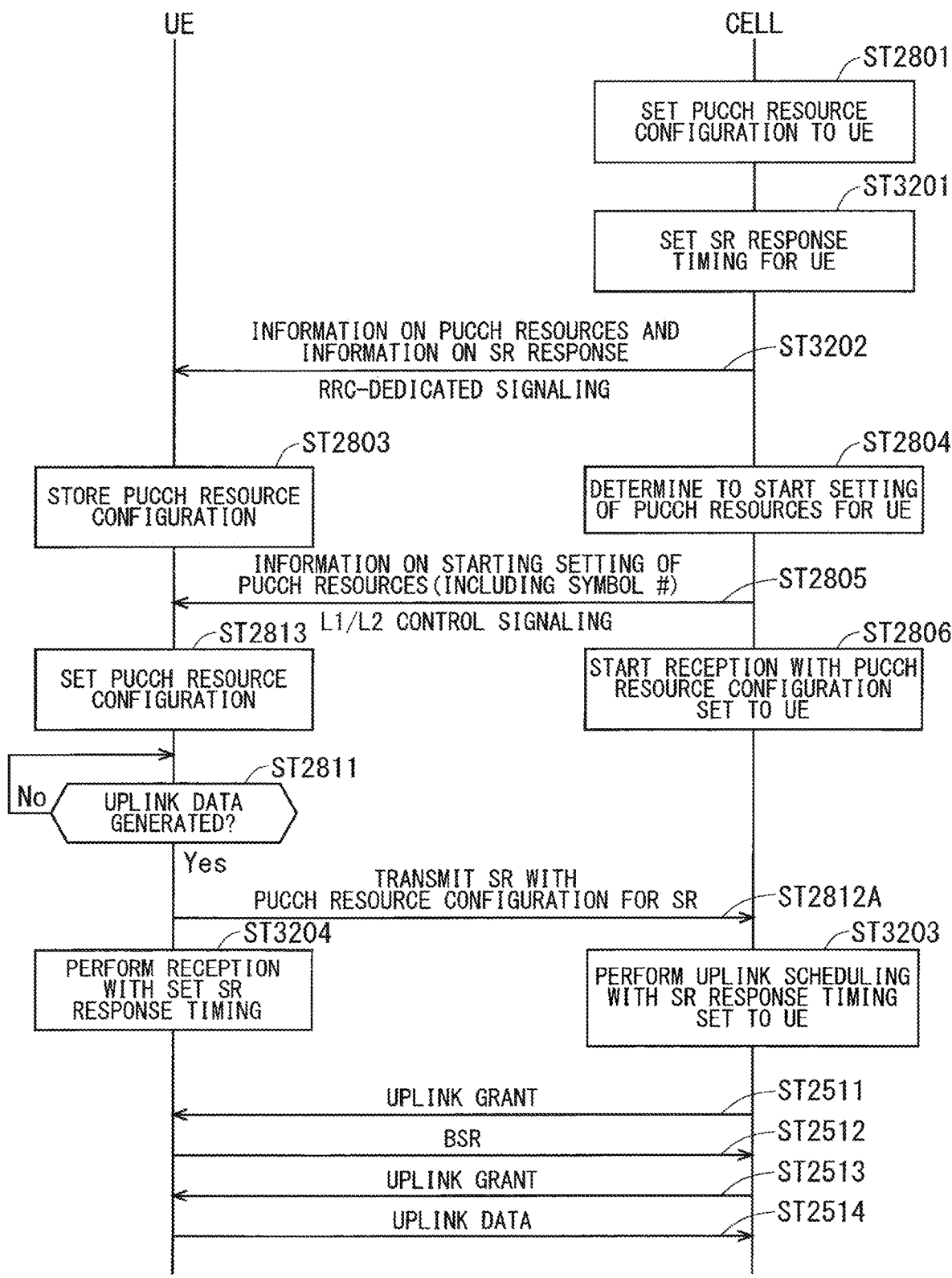
FIG. 24 illustrates one example sequence for setting the transmission/reception timing of the uplink grant for the SR.

FIG. 24 illustrates one example sequence for setting the transmission/reception timing of the uplink grant for the SR. Since the sequence illustrated in FIG. 24 includes the same Steps as those in the sequence illustrated in FIG. 19, the same step numbers will be assigned to the same Steps and the common description thereof will be omitted.

In Step ST2801, the cell sets, to the UE, a PUCCH resource configuration for each UE.

In Step ST3201, the cell sets, to the UE, an SR response timing for the UE.

In Step ST3202, the cell notifies the UE of the information on the SR response together with the information on the PUCCH resources. The cell may notify the information on the PUCCH resources and the information on the SR response via a beam via which the cell communicates with the UE. The cell notifies the information on the PUCCH resources and the information on the SR response via the RRC-dedicated signaling.

After performing the process in Step ST3202, the cell performs the processes in Steps ST2804, ST2805, and ST2806.

Upon receipt of the information on the PUCCH resources and the information on the SR response in Step ST3202, the UE performs the process in Step ST2803. Then, the UE performs the process in Step ST2813.

In Step ST2811, the UE determines whether the uplink data has been generated. When the uplink data has been generated, the UE proceeds to Step ST2812A.

In Step ST2812A, the UE transmits the SR to the cell via the serving beam with the set PUCCH resource configuration for the SR.

Upon receipt of the SR from the UE in Step ST2812A, the cell performs the uplink scheduling with the SR response timing set to the UE in Step ST3203.

Upon transmission of the SR in Step ST2812A, the UE derives the SR response timing using the information on the SR response, and performs reception with the SR response timing in Step ST3204.

In Step ST2511, the cell notifies the UE of the uplink grant with the set SR response timing.

In Step ST2511, the UE obtains the uplink grant from the cell with the set SR response timing.

Upon receipt of the uplink grant for the SR from the cell, the UE performs processes for starting the uplink communication with the cell from Steps ST2512 to ST2514. Consequently, the uplink communication is started between the UE and the cell.

Application of the methods disclosed in the fifth embodiment enables the cell to notify the UE of the information on the SR response, and the cell and the UE to mutually recognize the transmission timing of the uplink grant for the SR.

Sixth Embodiment

When the transmission of the SR is undelivered, the cell does not transmit the uplink grant for the SR to the UE. Alternatively, even when the cell transmits the uplink grant to the UE, the UE may not be able to receive the uplink grant due to the worse radio propagation environment. In these cases, the UE cannot determine whether the cell does not transmit the uplink grant due to the undelivered transmission of the SR, or whether the cell cannot communicate via the serving beam while communicating via another beam and thus does not transmit the uplink grant for the SR.

Since the UE receives the uplink grant for the SR with the SR response timing, the UE continues to receive the L1/L2 control signal. 3GPP has never discussed the undelivered transmission of the SR in the MBF requiring the beam sweeping.

The sixth embodiment will disclose a method for solving such a problem.

A timer for setting a duration from transmission of the SR to wait for the uplink grant is provided. In the following description, the timer may be referred to as an "SR-response wait timer". Upon transmission of the SR, the UE starts the SR-response wait timer. Upon receipt of the uplink grant before expiration of the SR-response wait timer, the UE resets the SR-response wait timer. When the UE cannot receive the uplink grant during the duration of the SR-response wait timer and the SR-response wait timer expires, the UE retransmits the SR.

The value of the SR-response wait timer may be predetermined in, for example, a standard. Alternatively, the cell may set the value of the SR-response wait timer, and notify it to the UE. The method for notifying the information on the SR response that is disclosed in the fifth embodiment may be applied thereto. The SR-response wait timer may be set per time unit or per scheduling. Examples of the unit of scheduling include subframe, slot, and mini-slot.

Consequently, it is possible for the UE to assume that the cell transmits the uplink grant for the SR during the duration of the SR-response wait timer upon transmission of the SR. When the SR-response wait timer expires, the UE can retransmit the SR because the transmission of the SR is undelivered. Thus, the UE, which cannot determine whether the cell is communicating via another beam, never continues to receive the L1/L2 control signal with the SR response timing.

The SR response timing may be set for each beam or for each UE. Thus, the SR response timing may be different for each beam or for each UE. When the value of the SR-response wait timer is set as a duration from the transmission of the SR, a different value needs to be set for each beam or for each UE, which will cause a problem of complexity in the setting.

A method for solving such a problem will be disclosed.

The SR-response wait timer is set to the number of transmission timings of the uplink grant for the SR. The SR-response wait timer is set to, for example, X times. When starting the SR-response wait timer upon transmission of the SR and receiving the uplink grant within the X transmission timings of the uplink grant for the SR, the UE resets the SR-response wait timer. When the UE does not receive the uplink grant within the X transmission timings of the uplink grant for the SR, the UE retransmits the SR.

When a range for setting the value L (K) is determined in the setting of the transmission timing of the uplink grant for the SR that is disclosed in the fifth embodiment, the SR-response wait timer may be set to the number of repetitions of K. The SR-response wait timer is set to, for example, X times. When the UE starts the SR-response wait timer upon transmission of the SR and receives the uplink grant while the number of repetitions of K falls within the X times, the UE resets the SR-response wait timer. When the UE does not receive the uplink grant while the number of repetitions of K falls within the X times, the UE retransmits the SR.

Consequently, the SR-response wait timer can be set according to the number of times the uplink grant is generated. Thus, when the SR-response wait timer is set with equal opportunities for each beam or for each UE according to the number of times the uplink grant is generated, the setting need not be made using a different timer value. Consequently, the cell can easily perform the processes of setting the SR-response wait timer to the UE and notifying the UE of the setting.

When the UE cannot receive the uplink grant for the SR from the cell according to the aforementioned method, the UE continues to retransmit the SR. For example, when the UE is out of the uplink synchronization via the beam via which the UE communicates, the cell cannot receive the SR transmitted from the UE. No matter how many times the UE retransmits the SR in such a continued state, the cell can neither receive the SR transmitted from the UE, nor transmits the uplink grant for the SR. Thus, the UE repeats retransmission of the SR.

A method for solving such a problem will be disclosed.

The maximum number of times the SR is retransmitted may be provided. The maximum number of times is set to, for example, Y times. When the number of times the UE retransmits the SR exceeds Y times, the UE stops retransmitting the SR. Consequently, the UE can avoid continuing to retransmit the SR due to, for example, the movement of the UE and the worse radio propagation environment. Thus, the power consumption of the UE can be reduced.

When the number of times the UE retransmits the SR exceeds Y times, the UE may start from the RA procedure. The RA procedure initiates the uplink synchronization. The beam sweeping block may be used for the RA procedure. Consequently, the UE can again achieve the uplink synchronization via the beam via which the UE communicates.

When the number of times the UE retransmits the SR exceeds Y times, the settings for the PUCCH resources, the SR response, and the undelivered SR that are made for the UE may be reset. Since the reset can release the set resources to the others, the use efficiency of the radio resources can be increased.

Seventh Embodiment

A beam coverage in the MBF is narrower than a coverage of the cell. When the beam sweeping is necessary in the MBF, the cell may communicate via the other beams while the UE transmits the SR and receives the uplink grant for the SR. Here, the duration from the transmission of the SR to the reception timing of the SR response signal is longer than that when the beam sweeping is unnecessary.

Thus, while transmitting the SR and receiving the SR response signal, the UE may move across beam coverages. In other words, the UE may move (have mobility) between beams. The cell configures one or more TRPs, and each of the TRPs forms one or more beams. Although the movement between beams will be mainly described herein, the description is applicable to the movement between TRPs.

The description may be applied to the movement between beams formed by the TRP. A Distributed Unit (DU) may form one or more beams. Here, the description is applicable to the movement between DUs. The description may be applied to the movement between beams formed by the DUs.

The fifth embodiment discloses a method for setting the timing to receive the SR response signal via the beam via which the UE has transmitted the SR. However, when the UE moves between beams after transmitting the SR, the method according to the fifth embodiment cannot be simply applied thereto because the UE moves from the beam via which the UE has transmitted the SR. Under such a state, how to transmit and receive the SR response signal between the cell and UE will be a problem.

The seventh embodiment will disclose a method for solving such a problem.

In the case where the UE moves between beams after transmitting the SR, even when the UE waits for the uplink grant for the SR via the same beam via which the UE has transmitted the SR, the communication quality of the UE via the beam will worsen. Thus, the UE may not be able to receive the uplink grant. The seventh embodiment will disclose a method for solving such a problem.

The UE receives the uplink grant in response to the transmitted SR via a moving target beam, when the UE moves between beams after transmitting the SR. After receiving the SR from the UE, the cell transmits the uplink grant in response to the received SR to the UE via the moving target beam of the UE. Consequently, the SR response signal can be transmitted and received via a beam with superior communication quality for the UE. Thus, the reception error rate of the SR response signal in the UE can be reduced.

The transmission timing of the uplink grant for the SR will be disclosed.

When the cell transmits, via a moving target beam, the uplink grant for the SR transmitted via a moving source beam, the setting of the transmission timing of the uplink grant via the moving target beam will be a problem because the beams are different. Examples of the problem include whether the setting of the moving source beam (may be hereinafter referred to as a "source beam (S-beam)") is used as it is, whether the new setting of the moving target beam (may be hereinafter referred to as a "target beam (T-beam)") will be made, and how to make the new setting if the new setting is made.

The seventh embodiment will disclose a method for solving such a problem.

When the transmission timing of the uplink grant for the SR is fixed in a system or is set equal for each cell via all the beams in the cell, the UE may follow the setting after moving between the beams. The transmission timing of the SR may be used as the starting point. The transmission timing of the uplink grant for the SR may also be set equal among a plurality of beams in the cell. The transmission timing of the SR may be used as the starting point to obtain the transmission timing of the uplink grant for the SR.

To address the sudden worsening of the radio propagation situation, a proposal is made for the UE to receive physical control channels of a plurality of beams. Such a plurality of beams may form a beam group. The UE may set, as a beam group, the moving target beams due to the sudden worsening of the radio propagation situation of a beam via which the UE is communicating. For example, the transmission timing of the uplink grant for the SR may be set equal in the beam group.

Consequently, the UE can receive the SR response signal via the target beam after moving between the beams. Since the UE does not change the reception timing of the SR response signal even after moving between the beams, the UE can easily perform the processes of moving between the beams.

Although using the transmission timing of the SR as the starting point to obtain the transmission timing of the SR response signal is disclosed, the timing of the SR response signal may be determined using the timing of the UE to move between beams or the timing for the cell to instruct the UE to move between beams as an alternative method.

Consequently, the need for the SR transmission timing via the source beam can be eliminated for the target beam. Moreover, since the timing of an instruction for moving between beams is used as the starting point, new information need not be informed. Thus, the processes required for the UE and between the beams can be facilitated.

A method to be applied when the transmission timing of the uplink grant for the SR is set for each beam or for each UE and each beam will be disclosed. When the transmission timing is set for each beam, the cell presets, to the UE, the transmission timings of the uplink grant for the SR via all the beams or a plurality of beams in the cell. When the transmission timing is set for each beam and each UE, the cell presets, to the UE, the transmission timings of the uplink grant for the SR for each UE via the target beam or a plurality of beams.

The plurality of beams may form the beam group. The plurality of beams may form a group of a plurality of beams that may be target beams.

After moving between beams, the UE performs reception with the transmission timing of the uplink grant for the SR via a target beam. After the UE moves between beams, the cell performs transmission with the transmission timing of the uplink grant for the SR via the target beam.

Consequently, the UE can receive the SR response signal via the target beam after moving between the beams.

When the cell notifies the UE of a moving instruction for the UE to move between beams, the UE may perform reception with the transmission timing of the uplink grant for the SR via a target beam after receiving the moving instruction for moving between beams from the cell. After transmitting the moving instruction for moving between beams to the UE, the cell may perform transmission with the transmission timing of the uplink grant for the SR via the target beam.

When the transmission timing of the SR is used as the starting point to obtain the transmission timing of the uplink grant for the SR, the transmission timing of the SR via the source beam may be used as the starting point. Consequently, the cell and the UE can determine the transmission timing of the uplink grant for the SR. Upon reception with the transmission timing, the UE can receive the SR response signal transmitted by the cell with the transmission timing.

When a duration from the transmission timing of the SR via a target beam to the reception timing of the SR response signal is longer than a duration from the transmission timing of the SR via a source beam to the reception timing of the SR response signal, the reception timing of the SR response signal via the target beam may end before the UE moves between the beams. If the cell transmits the uplink grant with the transmission timing of the SR response signal via the target beam, the UE cannot receive the uplink grant for the SR.

A method for solving such a problem will be disclosed.

With regard to the transmission timing of the uplink grant for the SR, the UE follows the transmission timing of the uplink grant for the SR via a source beam when the UE moves between beams. When the UE that has transmitted the SR receives the moving instruction before receiving the uplink grant for the SR, the UE performs reception with the transmission timing of the uplink grant set via the source beam, using the transmission timing of the SR via the source beam as the starting point.

When instructing the UE that has transmitted the SR to move between the beams before transmitting the uplink grant for the SR, the cell transmits the transmission timing of the uplink grant for the SR to the UE with the transmission timing of the uplink grant set via the source beam, using the transmission timing of the SR via the source beam as the starting point. Since the timing of the SR response signal can be set to the transmission timing of the uplink grant for the SR via the source beam even when the UE moves between the beams, the reception timing of the SR response signal never ends before the UE moves between the beams, and the UE can receive the SR response signal via the target beam.

Another method will be disclosed.

With regard to the transmission timing of the uplink grant for the SR, the cell follows a longer duration from transmission of the SR to the transmission timing of the uplink grant for the SR when the UE moves between beams. The cell presets, to the UE, the reception timings of the SR response signal via all the beams or a plurality of beams in the cell. The plurality of beams may form the beam group.

When the UE that has transmitted the SR receives the moving instruction before receiving the uplink grant for the SR, the UE compares a duration from transmission of the SR via the source beam to the reception timing of the uplink grant for the SR with a duration from transmission of the SR via the target beam to the reception timing of the uplink grant for the SR, selects and sets the reception timing of the uplink grant for the SR in the longer duration, and performs reception with the reception timing.

When the cell transmits the instruction for moving between beams to the UE that has transmitted the SR, before transmitting the uplink grant for the SR, the cell compares a duration from transmission of the SR via the source beam to the transmission timing of the uplink grant for the SR with a duration from transmission of the SR via the target beam to the transmission timing of the uplink grant for the SR, selects and sets the transmission timing of the uplink grant for the SR in the longer duration, and performs transmission with the transmission timing.

Since the timing of the SR response signal can be set to the transmission timing of the uplink grant for the SR in the longer duration even when the UE moves between the beams, the reception timing of the SR response signal never ends before the UE moves between the beams, and the UE can receive the SR response signal via the target beam.

Another method will be disclosed.

Upon movement between beams or upon receipt of the instruction for moving between beams from the cell, the UE resets the timing of the SR response signal via the source beam.

The UE performs reception with the timing of the SR response signal via the target beam, using, as a starting point (N), the movement between beams or a subframe in which the instruction for moving between beams has been received from the cell. The cell performs transmission with the timing of the SR response signal via the target beam, using, as a starting point (N), the movement of the UE between beams or a subframe in which the instruction for moving between beams has been transmitted.

Since the timing of the SR response signal can be set using, as a starting point, the movement of the UE between beams, the reception timing of the SR response signal via the target beam never ends before the UE moves between the beams, and the UE can receive the SR response signal via the target beam.

Another method to be applied when the transmission timing of the uplink grant for the SR is set for each beam or for each UE and each beam will be disclosed. The cell sets the timing of the SR response signal via the target beam together with a moving instruction to the UE. The cell sets the timing of the SR response signal via the target beam, and notifies the UE of the timing of the SR response signal as well as transmitting, to the UE, the instruction for moving between the beams. When transmitting the instruction for moving between beams to the UE, the cell resets the timing of the SR response signal via the source beam, and performs transmission with the timing of the SR response signal via the target beam.

The UE receives the timing of the SR response signal via the target beam as well as receiving the instruction for moving between beams from the cell. When receiving the instruction for moving between beams from the cell, the UE resets the timing of the SR response signal via the source beam, and performs reception with the timing of the SR response signal via the target beam.

The cell may newly set the timing of the SR response signal after the UE moves to the target beam.

Consequently, the need for the SR transmission timing via the source beam can be eliminated for the target beam. Thus, the processes required between the beams can be facilitated.

Another method to be applied when the transmission timing of the uplink grant for the SR is set for each beam or for each UE and each beam will be disclosed. The transmission timing of the SR response signal via the target beam is set dynamically since transmission of the instruction for the UE to move between beams. The cell dynamically sets the transmission timing of the SR response signal via the target beam as well as transmitting, to the UE, the instruction for the UE to move between beams.

Upon receipt of the instruction for moving between beams from the cell, the UE resets the reception timing of the SR response signal via the source beam. The UE consecutively receives the SR response signals via the target beam after receiving the instruction for moving between beams from the cell. For example, when the transmission timing of the SR response signal is set per subframe, the UE receives, in each subframe, the SR response signal via the target beam. The cell may newly set, to the UE, the timing of the SR response signal after the UE moves to the target beam.

Consequently, when the cell notifies the UE of the instruction for the UE to move between beams or before the UE moves between beams, the cell does not have to notify, in advance, the UE of the transmission timing of the SR response signal via the target beam. This can reduce the amount of information necessary for signaling.

Another method to be applied when the transmission timing of the uplink grant for the SR is set for each beam or for each UE and each beam will be disclosed. Even after the cell instructs the UE to move, the timing of the SR response signal via the source beam is maintained. Even after transmitting, to the UE, the instruction for moving between beams, the cell performs transmission with the transmission timing of the SR response signal via the source beam. After transmitting, to the UE, the instruction for moving between beams, the cell sets the transmission timing of the SR response signal via the source beam to the transmission timing of the SR response signal via the target beam.

Also after receiving the instruction for moving between beams from the cell, the UE performs reception with the reception timing of the SR response signal via the source beam. After receiving the instruction for moving between beams from the cell, the UE sets the transmission timing of the SR response signal via the source beam to the transmission timing of the SR response signal via the target beam.

The cell notifies the target beam of the timing setting for the SR response signal via the source beam, after determining to move the UE between beams and before the next transmission timing of the SR response signal via the source beam. This is effective when the source beam and the target beam are formed by different nodes.

Alternatively, the node that forms the source beam notifies the node that forms the target beam of the timing setting for the SR response signal via the source beam, after the source beam notifies the UE to move between beams and before the next transmission timing of the SR response signal via the source beam. This is effective when the source beam and the target beam are formed by the different nodes and each of the nodes sets the timing of the SR response signal.

Examples of the nodes include a TRP and a DU. The cell may newly set, to the UE, the timing of the SR response signal after the UE moves to the target beam.

A method to be applied when the transmission timing of the uplink grant for the SR is set for each UE in the cell will be disclosed. After the UE moves between beams, the cell and the UE follow the timing setting for the SR response signal for each UE that has been set before the move. The transmission timing of the SR response signal may be determined using the transmission timing of the SR as a starting point. The cell sets, to the UE, the reception timing of the SR response signal for each UE.

After moving between beams or receiving the instruction for moving between beams from the cell, the UE performs reception with the set reception timing of the SR response signal for each UE. The UE performs reception with the timing of the SR response signal for each UE, using, as a starting point (N), the transmission timing of the SR before moving between beams or before receiving the instruction for moving between beams from the cell.

Consequently, a process of moving between beams can be separated from a process of setting the transmission timing of the SR response signal. Thus, malfunctions in a practical operation can be reduced.

Even after the UE moves between beams or after the cell transmits the instruction for moving between beams, the cell performs transmission with the timing of the SR response signal set for each UE. The cell performs transmission with the timing of the SR response signal for each UE, using, as a starting point (N), the reception timing of the SR before the UE moves between beams or before the cell transmits the instruction for moving between beams.

Consequently, the SR response signal timing set for each UE need not be changed in moving between beams. Thus, the process of moving between beams can be facilitated.

Although using the transmission timing of the SR as the starting point is disclosed, the timing of the SR response signal may be determined using, as a starting point, the timing of the UE to move between beams or the timing for the cell to instruct the UE to move between beams as an alternative method. The UE performs reception with the timing of the SR response signal for each UE, using, as a starting point (N), the movement between beams or the reception timing of the instruction for moving between beams from the cell. The cell performs transmission with the timing of the SR response signal for each UE, using, as a starting point (N), the movement of the UE between beams or the transmission timing of the instruction for moving between beams.

Consequently, the need for the SR transmission timing via the source beam can be eliminated for the target beam. Thus, the processes required between the beams can be facilitated.

Another method to be applied when the transmission timing of the uplink grant for the SR is set for each UE will be disclosed. The method to be applied when the transmission timing of the uplink grant for the SR is set for each beam or for each UE and each beam may be applied. This is effective when the transmission timing of the uplink grant for the SR for each UE is set in consideration of the timing to be applied to the beam via which the UE communicates.

Figure 25:
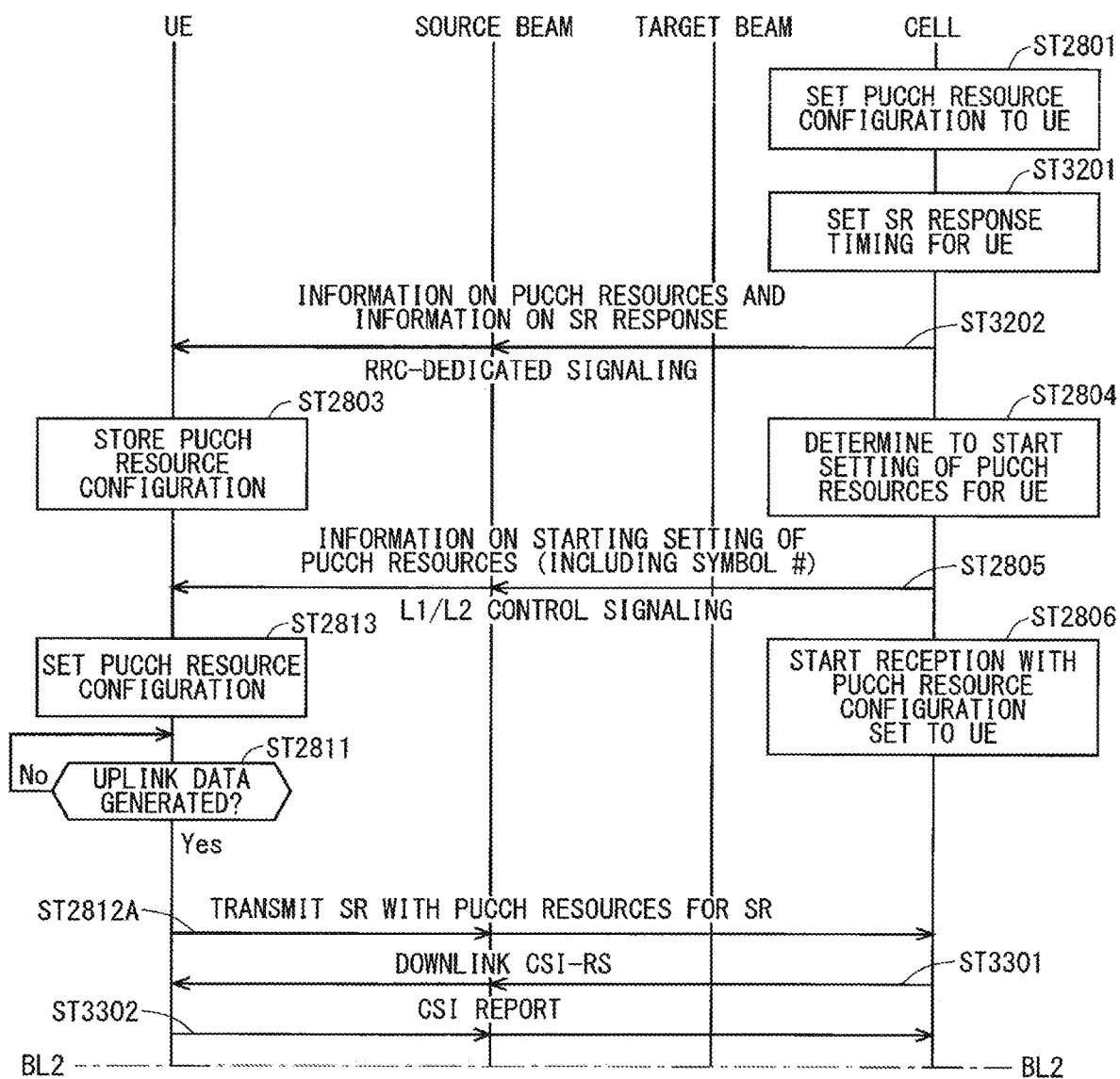
FIG. 25 illustrates one example sequence for setting the transmission/reception timing of the uplink grant for the SR upon movement between beams after transmission of the SR.

FIGS. 25 and 26 illustrate one example sequence for setting the transmission/reception timing of the uplink grant for the SR upon movement between beams after transmission of the SR. FIGS. 25 and 26 are connected across a location of a border BL2. Since the sequence illustrated in FIGS. 25 and 26 includes the same Steps as those in the sequence illustrated in FIG. 24, the same step numbers will be assigned to the same Steps and the common description thereof will be omitted.

In Step ST2801, the cell sets, to the UE, a PUCCH resource configuration for each UE.

In Step ST3201, the cell sets, to the UE, an SR response timing for the UE.

In Step ST3202, the cell notifies the UE of the information on the SR response together with the information on the PUCCH resources. The cell may notify the information on the PUCCH resources and the information on the SR response via a beam via which the cell communicates with the UE. The cell notifies the information on the PUCCH resources and the information on the SR response via the RRC-dedicated signaling. Here, the beam via which the cell communicates with the UE is the source beam.

After performing the process in Step ST3202, the cell performs the processes in Steps ST2804, ST2805, and ST2806.

Upon receipt of the information on the PUCCH resources and the information on the SR response in Step ST3202, the UE performs the process in Step ST2803. Then, the UE performs the process in Step ST2813.

In Step ST2811, the UE determines whether the uplink data has been generated. When the uplink data has been generated, the UE proceeds to Step ST2812A.

In Step ST2812A, the UE transmits the SR to the cell via the serving beam with the set PUCCH resource configuration for the SR. Here, the serving beam is the source beam.

Upon transmission of the SR in Step ST2812A, the UE starts reception with the SR response timing derived from the information on the SR response notified in Step ST3202.

In Step ST2812A, the cell receives the SR from the UE. Upon receipt of the SR from the UE, the cell performs a process for the uplink scheduling with the SR response timing set in Step ST3201.

During this time, the cell transmits a downlink CSI-RS to the UE via the source beam in Step ST3301.

Upon receipt of the downlink CSI-RS in Step ST3301, the UE reports a measurement result of the CSI-RS to the cell via the source beam in Step ST3302. Specifically, the UE reports the measurement result of the CSI-RS to the cell as the CSI.

Here, the cell may transmit the CSI-RS via a plurality of beams. The UE may notify the cell of a measurement result of the CSI-RS transmitted via the plurality of beams. Alternatively, the UE may derive a beam superior in the reception quality to the serving beam from the measurement result of the CSI-RS, and notify an identifier of the derived beam. Consequently, the amount of information can be reduced.

Upon obtainment of the CSI report from the UE in Step ST3302, the cell determines to move the UE to the target beam in Step ST3303.

In Step ST3304, the cell determines whether the cell can transmit, to the UE, an SR response with the SR response timing set via the source beam.

When determining that the cell can transmit the SR response with the SR response timing in Step ST3304, the cell proceeds to Step ST3305.

In Step ST3305, the cell notifies the UE of an instruction for moving to the target beam. The instruction for moving to the target beam may include a beam identifier of the target beam. The moving instruction may be notified via the L1/L2 control signaling. Alternatively, the notification may be made via the MAC signaling. The cell can notify the UE of the instruction for moving the beam via the MAC signaling with lower latency than that via the RRC signaling. The cell does not notify an instruction for changing to the SR response timing, together with the moving instruction.

When determining that the cell cannot transmit the SR response with the SR response timing in Step ST3304, the cell proceeds to Step ST3306.

In Step ST3306, the cell changes the setting to the SR response timing via the target beam for the UE.

In Step ST3307, the cell notifies the UE of the instruction for moving to the target beam and an instruction for changing to the SR response timing whose setting has been changed. The instruction for changing the setting to the SR response timing may include information on the SR response via the target beam.

In Step ST3308, the UE determines whether to have received the instruction for changing the setting of the SR response timing, together with the moving instruction received from the cell.

When determining that the UE does not receive the instruction for changing the setting to the SR response timing in Step ST3308, the UE proceeds to Step ST3309.

In Step ST3309, the UE continues to perform reception with the SR response timing via the source beam.

Upon receipt of the instruction for changing the setting of the SR response timing in Step ST3308, the UE proceeds to Step ST3310.

In Step ST3310, the UE derives the SR response timing using the received information on the SR response, and performs reception with the setting changed to the derived SR response timing.

In Step ST3311, the cell performs the uplink scheduling via the target beam with the SR response timing set to the UE.

In Step ST3312, the cell notifies the UE of the uplink grant via the target beam with the SR response timing set to the UE.

In Step ST3312, the UE obtains the uplink grant from the cell via the target beam with the set SR response timing.

In Step ST3313, the UE transmits a Buffer Status Report (BSR) to the cell via the target beam using the obtained uplink grant.

Upon receipt of the BSR in Step ST3313, the cell performs the uplink scheduling for the UE according to the BSR.

In Step ST3314, the cell notifies the UE of the uplink grant via the target beam.

Upon receipt of the uplink grant for the SR from the cell, the UE transmits the uplink data to the cell in Step ST3315. Consequently, the uplink communication is started between the UE and the cell via the target beam.

In the case where the UE moves between beams after transmitting the SR, even when the SR response timing is changed in the target beam, the UE can receive the SR response signal via the target beam.

Figure 27:
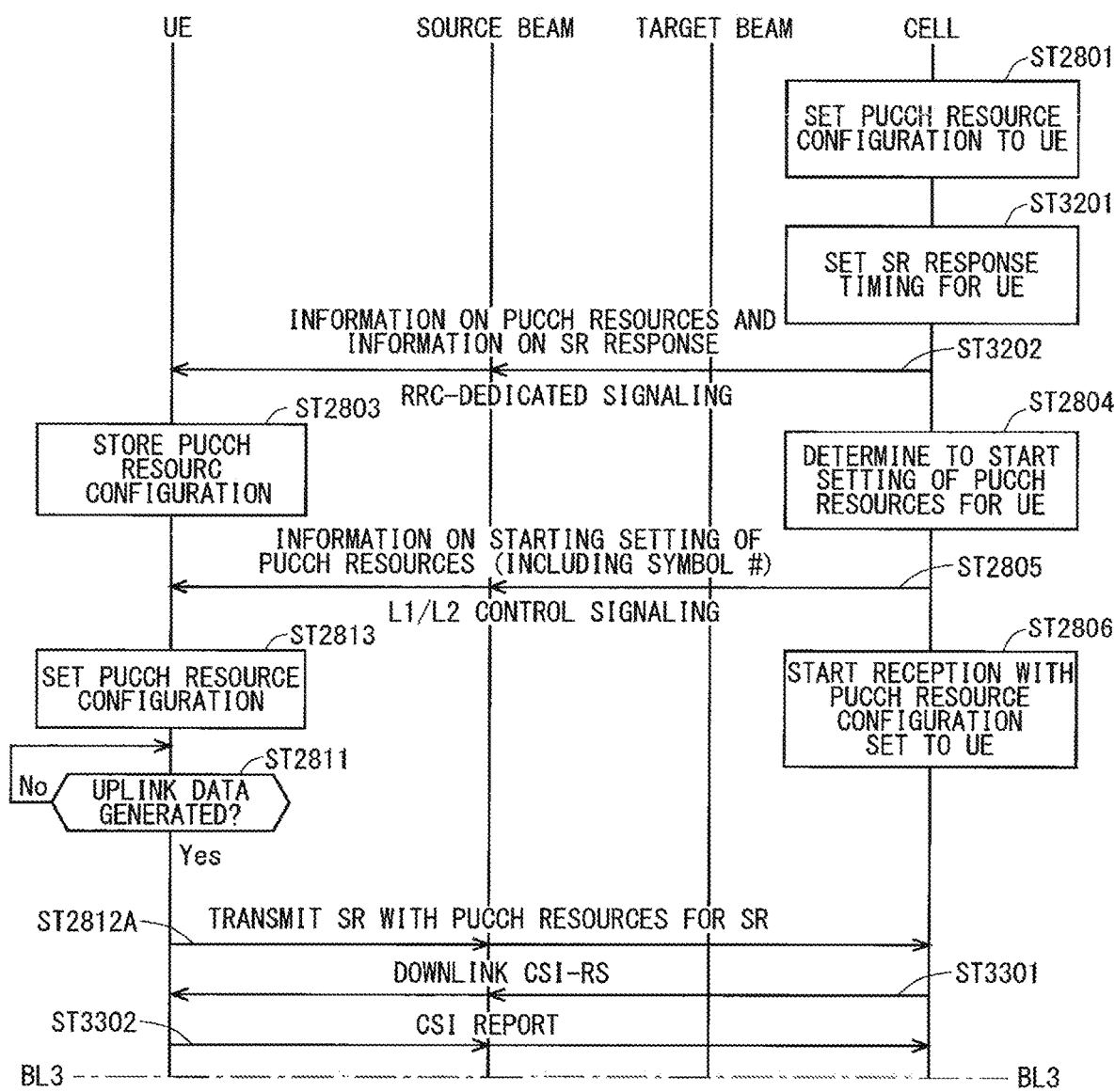
FIG. 27 illustrates another example sequence for setting the transmission/reception timing of the uplink grant for the SR upon movement between beams after transmission of the SR.

FIGS. 27 and 28 illustrate another example sequence for setting the transmission/reception timing of the uplink grant for the SR upon movement between beams after transmission of the SR FIGS. 27 and 28 are connected across a location of a border BL3. Since the sequence illustrated in FIGS. 27 and 28 includes the same Steps as those in the sequence illustrated in FIGS. 25 and 26, the same step numbers will be assigned to the same Steps and the common description thereof will be omitted.

In Step ST2801, the cell sets, to the UE, a PUCCH resource configuration for each UE.

In Step ST3201, the cell sets, to the UE, an SR response timing for the UE.

In Step ST3202, the cell notifies the UE of the information on the SR response together with the information on the PUCCH resources. The cell may notify the information on the PUCCH resources and the information on the SR response via a beam via which the cell communicates with the UE. The cell notifies the information on the PUCCH resources and the information on the SR response via the RRC-dedicated signaling. Here, the beam via which the cell communicates with the UE is the source beam.

After performing the process in Step ST3202, the cell performs the processes in Steps ST2804, ST2805, and ST2806.

Upon receipt of the information on the PUCCH resources and the information on the SR response in Step ST3202, the UE performs the process in Step ST2803. Then, the UE performs the process in Step ST2813.

In Step ST2811, the UE determines whether the uplink data has been generated. When the uplink data has been generated, the UE proceeds to Step ST2812A.

In Step ST2812A, the UE transmits the SR to the cell via the serving beam with the set PUCCH resource configuration for the SR. Here, the serving beam is the source beam.

Upon transmission of the SR in Step ST2812A, the UE starts reception with the SR response timing derived from the information on the SR response notified in Step ST3202.

In Step ST2812A, the cell receives the SR from the UE. Upon receipt of the SR from the UE, the cell performs a process for the uplink scheduling with the SR response timing set in Step ST3201.

During this time, the cell transmits the downlink CSI-RS to the UE via the source beam in Step ST3301.

Upon receipt of the downlink CSI-RS in Step ST3301, the UE reports a measurement result of the CSI-RS to the cell via the source beam in Step ST3302. Specifically, the UE reports the measurement result of the CSI-RS to the cell as the CSI.

Here, the cell may transmit the CSI-RS via a plurality of beams. The UE may notify the cell of a measurement result of the CSI-RS transmitted via the plurality of beams. Alternatively, the UE may derive a beam superior in the reception quality to the serving beam from the measurement result of the CSI-RS, and notify an identifier of the derived beam. Consequently, the amount of information can be reduced.

Upon obtainment of the CSI report from the UE in Step ST3302, the cell determines to move the UE to the target beam in Step ST3303.

In Step ST3305, the cell notifies the UE of an instruction for moving to the target beam.

Upon receipt of the moving instruction in Step ST3305, the UE resets the SR response timing via the source beam, and sets reception in each subframe in Step ST3403.

Upon transmission of the moving instruction to the UE in Step ST3305, the cell resets the SR response timing via the source beam that has been set to the UE, and dynamically sets the SR response timing in Step ST3401.

In Step ST3402, the cell performs the uplink scheduling for the UE with an arbitrary timing.

In Step ST3312, the cell transmits the uplink grant to the UE. The cell transmits the uplink grant via the target beam.

The UE, which has been set to perform reception in each subframe upon receipt of the moving instruction in Step ST3403, performs reception in each subframe via the target beam from then onward.

Consequently, the UE can receive the uplink grant transmitted from the cell in Step ST3312.

Upon receipt of the uplink grant for the SR from the cell, the UE performs processes for starting the uplink communication with the cell via the target beam from Steps ST3313 to ST3315. Consequently, the uplink communication is started between the UE and the cell.

In the case where the UE moves between beams after transmitting the SR, even when the SR response timing is changed in the target beam, the UE can receive the SR response signal via the target beam.

The cell can perform the uplink scheduling for the SR from the UE and transmit the uplink grant, with an arbitrary timing via the target beam. The UE can receive the uplink grant even when the uplink grant is transmitted with the arbitrary timing. The cell can perform the uplink scheduling for the SR with appropriate timing where appropriate, according to, for example, a load state of each beam and a radio propagation environment.

A problem occurs when the transmission of the SR is undelivered via the target beam. Examples of the problem include whether the setting of the source beam is used as it is, whether the new setting is made via the target beam, and how to make the new setting if the new setting is made.

The setting of the transmission timing of the uplink grant for the SR via the target beam and its setting method that are previously disclosed may be applied to the case where the transmission of the SR is undelivered. The cell and the UE can perform coordinated operations via the target beam even when the transmission of the SR is undelivered.

The retransmission of the SR from the UE via the target beam will cause another problem. For example, when the UE performs uplink transmission via the target beam and a transmission/reception point for the source beam (hereinafter may be referred to as an "S-TRP") is different from a transmission/reception point for the target beam (hereinafter may be referred to as a "T-TRP"), a radio propagation time from the UE to the S-TRP is different from a radio propagation time from the UE to the T-TRP.

Even when the UE performs the uplink transmission via the target beam, using the timing advance (TA) in the source beam, the cell has a problem of failing to receive the uplink transmission in the T-TRP.

The retransmission of the SR from the UE via the target beam causes the similar problem. No matter how many times the UE repeatedly retransmits the SR via the target beam, the cell can neither receive the retransmitted SR nor transmit the uplink grant to the UE. Consequently, the UE has a problem of failing to start the uplink transmission.

A method for solving such a problem will be disclosed.

The cell instructs the UE to start the RA procedure dedicated to the UE via the target beam, together with the moving instruction. In the RA procedure dedicated to the UE, a configuration dedicated to the UE is used as an RA preamble. Thus, the RA procedure can be reliably performed without any conflict.

The RA preamble configuration dedicated to the UE includes a sequence of signals to be used for radio resources and the preamble. The cell notifies the UE of information on the RA preamble via the target beam. The cell may include the information in signaling for the moving instruction via the source beam to notify the UE of the information. The notification of the information may initiate the RA procedure dedicated to the UE.

Upon receipt of the information on the RA preamble via the target beam together with the moving instruction, the UE performs the RA procedure dedicated to the UE via the target beam. This RA procedure enables the UE to obtain the timing advance from the cell via the target beam. Upon obtainment of the timing advance via the target beam, the UE performs uplink transmission using the timing advance.

Consequently, the cell can receive the uplink transmission from the UE via the target beam. Similarly, the UE retransmits the SR using the timing advance. Consequently, the cell can receive the SR retransmitted from the UE via the target beam.

When the cell determines that the timing advance for the UE via the source beam is different from that via the target beam, the cell may start the RA procedure dedicated to the UE for the UE. The cell starts the RA procedure dedicated to the UE for the UE when, for example, positions of the S-TRP and the T-TRP are different. When the positions of the S-TRP and the T-TRP are the same or when the same TRP configures the source beam and the target beam, the cell does not start the RA procedure dedicated to the UE for the UE.

When the positions of the S-TRP and the T-TRP are the same or when the same TRP configures the source beam and the target beam, the radio propagation times from the UE are almost equal to each other. Thus, there is no need to reset the timing advance via the target beam, and the timing advance via the source beam may be continuously used.

This eliminates the need for always initiating the RA procedure when the UE moves between beams. Thus, the processes in the UE and the cell can be facilitated, and the power consumption can be reduced.

Another method will be disclosed. A Timing Advance Group (TAG) for each beam or for each TRP is set. Conventionally, the TAG is set for each cell. What is being studied in the NR is that one or more TRPs are configured in a cell and each of the TRPs forms one or more beams. When positions of the TRPs that form beams are different, the timing advances are different as described above. Setting the TAG for each beam or for each TRP enables the TAG to be set according to a difference in position between the TRPs each of which forms beams.

The cell may determine whether the target beam is within the same TAG as that of the source beam to start the RA procedure dedicated to the UE for the UE. When the target beam is within the same TAG as that of the source beam, the cell does not start the RA procedure dedicated to the UE for the UE. When the target beam is within a TAG different from that of the source beam, the cell starts the RA procedure dedicated to the UE for the UE. Consequently, the same advantages as those in the seventh embodiment can be produced.

Although the cell determines to start the RA procedure for the UE, the UE may determine to start the RA procedure. The cell notifies, in advance, the UE of the TAG setting information for each beam or for each TRP. The method for notifying the TAG setting information may be the RRC signaling. Alternatively, the notification may be made via the MAC signaling.

Upon receipt of the instruction for moving between beams from the cell, the UE determines whether the target beam is within the same TAG as that of the source beam, from the identifier of the target beam included in the moving instruction with reference to the TAG setting information. When the target beam is within the same TAG as that of the source beam, the UE does not start the RA procedure dedicated to the UE. When the target beam is within a TAG different from that of the source beam, the UE starts the RA procedure. The cell may notify the UE of the information on the RA preamble via the target beam, together with the moving instruction.

The UE may perform an RA procedure that is not dedicated to the UE. The cell need not notify the UE of the information on the RA preamble via the target beam, together with the moving instruction. The UE may apply information on the RA preamble that is set for each cell or for each beam to the RA procedure. The information may be predetermined in, for example, a standard, or notified in advance from the cell to the UE. The method for notifying the information on the RA preamble may be the RRC signaling. Consequently, the UE can start the RA procedure.

Upon start of the RA procedure via the target beam in such a manner, the UE retransmits the SR via the target beam using the timing advance obtained in the RA procedure. The UE that does not start the RA procedure via the target beam retransmits the SR via the target beam, continuously using the timing advance via the source beam.

Consequently, the UE can retransmit the SR via the target beam, even when the transmission of the SR via the source beam is undelivered. Moreover, starting from the RA procedure in the retransmission of the SR via the target beam enables the UE to avoid earlier a situation where the transmission of the SR continues to be undelivered due to different TAs. Thus, the UE can start the uplink transmission earlier.

Such a method further enables the UE to retransmit the SR via the target beam, even when the transmission of the SR via the source beam and retransmission of the SR at least once are undelivered.

The maximum number of times the SR is retransmitted may be reset upon issuance of the instruction for moving between beams. Assuming the first retransmission of the SR via the target beam as the initial retransmission of the SR or the initial transmission of the SR, the UE may retransmit the SR again until the maximum number of times the SR is retransmitted. This can provide sufficient opportunities for retransmitting the SR via the target beam. Thus, the undelivered transmission of the SR can be reduced.

The maximum number of times the SR is retransmitted may be reset only for the UE that has started the RA procedure via the target beam. Assuming the first retransmission of the SR via the target beam as the initial retransmission of the SR or the initial transmission of the SR, the UE may retransmit the SR again until the maximum number of times the SR is retransmitted. This can provide only the UE whose TA has been changed with sufficient opportunities for retransmitting the SR. Thus, the undelivered transmission of the SR can be reduced. The RA procedure can be performed again earlier without unnecessarily increasing a duration until reaching the maximum number of times for the UE whose TA has not been changed yet.

When starting the RA procedure, the UE may reset the SR procedure. After starting the RA procedure, the UE may start the SR procedure. The UE may start from the setting of the PUCCH resources in the target beam. Here, the information on the PUCCH resources identical to that in the source beam may be omitted. Consequently, the UE can start the SR procedure via a target beam with the different TA.

Eighth Embodiment

In the NR, the analog beamforming and the hybrid beamforming are being studied. One cell forms a plurality of beams, and forms a coverage for each of the beams. Thus, the coverage of the beam is narrower than the coverage of the cell.

Unless the coverage of the beam is appropriately formed, a problem of a high probability of disconnection in communication during the movement of the UE between beams occurs. When a new obstacle is formed, problems such as a coverage hole and decrease in the received power depending on a location occur.

In the LTE, minimization of drive tests (MDT) is supported as an evaluation function of the coverage by the UE (see 3GPP TS 37.320 V13.1.0 (hereinafter referred to as "Reference 8"), 3GPP TS 36.331 V14.0.0 (hereinafter referred to as "Reference 5"), and Non-Patent Document 1).

The conventional MDT is a function causing the UE to measure, record, and report how much received power can be obtained from the cell in a geographical point in order to evaluate how the cell forms the coverage. The cell obtains, from the UE, the report of the received power from one or more cells in a measurement point to use the report for forming the coverage of the cell. This can form, for example, a coverage that reduces a zone where communication is disconnected due to a handover failure, etc.

Since the conventional MDT aims at forming a coverage of a cell, it has a problem of being inapplicable to appropriate formation of a coverage for each beam which is being studied in the NR.

The eighth embodiment will disclose a method for solving such a problem.

An identifier of a beam is introduced into the MDT. In the presence of an identifier of a TRP, the identifier of the TRP may be introduced into the MDT. The identifier of the TRP and the identifier of the beam may be introduced into the MDT in combination. Such a method may be referred to as MDT for each beam in the following description.

A specific example of introducing a beam identifier into the MDT will be disclosed.

An identifier of a beam at the time of measurement is logged into a log in which the UE records a measurement result. The identifier of the beam at the time of measurement may be logged in a measurement result for each cell according to the conventional MDT. The identifier of the beam is associated with a reference signal (RS) to be transmitted for each beam (may be hereinafter referred to as a "BRS"). Examples of the identifier of the beam may include a beam number.

Upon receipt of the BRS transmitted for each beam, the UE obtains the identifier of the beam. The UE records, in the log, an identifier of the cell, information on a measurement point, and a measurement result of the received power at the measurement point. The identifier of the beam via which reception is being performed at the measurement point is added to this log.

The received power of the BRS may be measured as the received power at the measurement point.

The UE records, in the log, the identifier of the cell, information on the measurement point, and a measurement result of the received power or the reception quality at the measurement point based on the conventional MDT. Further adding, to this, the identifier of the beam via which reception is being performed at the measurement point shows from which beam the reception is being performed at the measurement point. The UE adds the identifier of the beam via which reception is being performed at the measurement point to the log for recording to report the identifier of the beam to the cell. Consequently, the cell can recognize from which beam the UE can perform reception at the measurement point, and determine how the coverage of the beam is formed.

Since mere addition of the identifier of the beam to the conventional MDT is necessary, a change can be easily made.

Another method will be disclosed.

The UE measures the received power for each beam, and records the measurement result in a log. The UE notifies the cell of the log. The UE records the measurement result in the log in association with an identifier of a measured beam. The identifier of the beam may be derived by receiving the BRS for each beam as previously described. The UE records, in the log, an identifier for each beam, information on a measurement point, and a measurement result of the received power (or may be the reception quality) for each beam at the measurement point.

The number of beams to be measured may be one or more. A beam to be measured may be not limited to a serving beam. The beams to be measured may include another beam in the same TRP, another beam in the same cell, a beam in another TRP, and a beam in another cell. The cell may determine a beam to be measured by the UE, and notify the UE of the beam. Alternatively, the beam to be measured by the UE may be a beam that can be measured by the UE.

The maximum value may be set to the number of beams that the UE records in the log. The maximum value of the number of beams that the UE records in the log may be provided for each cell. Alternatively, the maximum value of the number of beams that the UE records in the log may be provided for each TRP. Alternatively, the maximum value of the number of beams that the UE records in the log may be provided for each frequency. When the number of measurable beams is excessive, the beams to be recorded in the log can be restricted. Thus, increase in the recording capacity of the UE can be suppressed. These maximum numbers may be predetermined in a standard, or notified from the cell to the UE. The maximum numbers may be notified via the RRC-dedicated signaling.

The following (1) to (5) will be disclosed as specific examples of a signal for measuring the received power for each beam:

(1) a synchronization signal (SS);
(2) a BRS;
(3) a Demodulation RS (DMRS);
(4) channel status information-RS (CSI-RS); and
(5) combinations of (1) to (4) above.

The SS in (1) can be used irrespective of an RRC connected state of the UE. The UE can measure the SS both in an RRC_Idle state and in an RRC_Connected state. The UE may measure the SS as Radio Resource Management (RRM) measurement. In the NR, transmitting, as the SS, a signal common to all beams in a cell via each of the beams is being studied. The UE may store, in a log, a measurement result of the SS for each beam and an identifier of the beam via which the SS has been measured in association with each other.

The BRS in (2) can be used irrespective of an RRC connected state of the UE. The UE can measure the BRS both in an RRC_Idle state and in an RRC_Connected state. The UE may measure the BRS as the RRM measurement. Alternatively, the UE may measure the BRS as the RLC measurement or the PHY measurement. In the NR, transmitting the BRS for each beam is being studied. The UE may store, in a log, a measurement result of the BRS for each beam and an identifier of the beam via which the BRS has been measured in association with each other.

The DMRS in (3) can be used when the UE is in an RRC connected state. The UE can measure the DMRS in an RRC connected state. The UE may measure the DMRS as the RLC measurement. Alternatively, the UE may measure the DMRS as the PHY measurement. In the NR, transmitting the DMRS for demodulation together with the downlink data or a downlink control signal of the UE is being studied. The UE may store, in a log, a measurement result of the DMRS and an identifier of the beam via which the DMRS has been measured in association with each other.

The CSI-RS in (4) can be used when the UE is in an RRC connected state. The UE can measure the CSI-RS in an RRC connected state. The UE may measure the CSI-RS as the RLC measurement. Alternatively, the UE may measure the CSI-RS as the PHY measurement. In the NR, transmitting the CSI-RS for each beam or each antenna to evaluate a channel state of the beam is being studied. The UE may store, in a log, a measurement result of the CSI-RS and an identifier of the beam via which the CSI-RS has been measured in association with each other.

The cell or the TRP may form, using a single beam, a coverage almost equivalent to all the coverages formed by a plurality of beams. The UE may measure, also for the single beam, the received power via the single beam, and record the measurement result in a log. The aforementioned method is appropriately applicable to this case. Besides (1) to (4) above, the received power of an RS to be transmitted as a single beam may be measured as a signal for measuring the received power for each beam. (1) to (4) above may be combined.

Although forming multi-beams in the UE is being studied in the NR, a single beam may be formed in measurement by the UE. The UE measures the received power for each beam formed by the cell via a single beam, and records the result in a log. The influence of the beam formed by the UE can be eliminated from the measurement result of the received power for each beam formed by the cell.

When the UE cannot form a single beam, a measurement result via the multi-beams may be converted into a measurement result via the single beam according to a predefined conversion method. The UE may perform measurement by the multi-beams using beam sweeping. The predefined conversion method may be statically determined in, for example, a standard. This can avoid increase in the signaling required for notifying the conversion method, and facilitates the conversion. Alternatively, the predefined conversion method may be semi-statically or dynamically notified to the UE. This is effective when, for example, the number of beams in the multi-beams and an association with a single beam are changed semi-statically or dynamically.

When the notification is made to the UE semi-statically or dynamically, it is possible to predetermine a plurality of conversion methods and give an indication indicting each of the methods, so that the cell may notify the UE of the indication. This can reduce the amount of information to be signaled.

The conventional MDT has been performed using the RRM measurement. In the NR, however, measuring beams using not the RRM measurement but the RLC measurement or the PHY measurement is being studied. When beams are measured using the RLC measurement or the PHY measurement, the received power for each beam may be measured using the RLC measurement or the PHY measurement. This can eliminate the need for the RRM measurement in measuring beams.

Methods for measuring the received power for each beam and recording the received power in a log will be disclosed.

A predefined condition may be set to the measurement result of the received power. If the predefined condition is met, the measurement result is recorded in a log. If the predefined condition is not met, the measurement result is not recorded in a log.

For example, a threshold is set to the measurement result of the received power. For example, the measurement result may be recorded in a log when the measurement result is larger than the threshold. The measurement result may not be recorded in a log when the measurement result is smaller than or equal to the threshold.

The cell may notify the UE of the predefined condition. For example, the cell may include the predefined condition in a message for notifying the MDT setting to notify the predefined condition.

As an alternative method, the received power may be periodically measured, and the measurement result may be recorded in a log. The cell may notify the UE of a preset period. For example, the cell may include the preset period in a message for notifying the MDT setting to notify the preset period. The period may be a measurement period for the MDT.

The period may be set in synchronization with an operation duration (an active duration) of the DRX. The synchronization with the active duration saves the reception operation for measuring the received power during an inactive duration in the DRX. Thus, the power consumption of the UE can be reduced.

A method for notifying a log from the UE to the cell will be disclosed.

In an RRC_Idle state, the cell may notify the UE of a request for reporting the MDT result. Upon receipt of the request, the UE notifies the cell of the log. These notifications may be made via the RRC signaling.

The UE information procedure existing in the LTE may be used for requesting a report of the MDT result and for reporting the MDT result. A UE Information Request is used for requesting the report of the MDT result, and a UE Information Response is used for reporting the MDT result.

This is effective because no additional signaling is necessary when the methods disclosed in the eighth embodiment are applied to the LTE.

In an RRC connected state, a log may be included in a measurement report to be notified. The cell makes the setting for the UE to cause the UE to perform a measurement report. The cell may set a measurement report of the MDT result. Upon receipt of the setting for the measurement report, the UE includes the log in the measurement report to notify the cell of the log, according to the setting.

Alternatively, the log may be notified as a CSI report. The cell makes the setting for the UE to cause the UE to perform the CSI report. The cell may set the CSI report of the MDT result. Upon receipt of the setting for the CSI report, the UE includes the log in the CSI report to notify the cell of the log, according to the setting. This is effective when the measurement result of the CSI-RS is logged.

Alternatively, a new message may be provided for notifying the log. The cell makes the setting of a report of the log for the UE, in a message requesting the report of the log. Upon receipt of the setting for requesting the report of the log, the UE includes the log in a message reporting the log to notify the cell of the log, according to the setting. These new messages may be notified via the RRC signaling.

Consequently, the cell can recognize from which beam and to what extent the UE can perform reception at a measurement point of the UE. Consequently, how the coverage of the beam is formed can be more precisely determined. This can form, for example, a coverage that reduces a zone where communication is disconnected due to a handover failure, etc.

Conventionally, a CN can request the MDT from an eNB in the LTE. The CN may request the MDT for each beam or the MDT for each TRP from a gNB so that the MDT is compatible with a coverage for each beam that is being studied in the NR. The CN notifies the gNB of a message requesting the MDT for each beam or for each TRP. The CN may make the notification using an interface to be set between the CN and the gNB in the 5G.

A conventional MDT request message may be used. Since the conventional MDT request message is "Trace Start" and the S1 signaling is used, the CN may make the notification using the interface to be set between the CN and the gNB in the 5G to enable the gNB to be notified.

The CN includes the MDT configuration in the "Trace Start" message to notify the eNB of the MDT configuration. Upon receipt of the MDT configuration in the "Trace Start" message, the eNB instructs the cell to cause the UE to execute the MDT.

Information in the MDT configuration in the "Trace Start" message includes setting information on a MDT area. The setting information on the MDT area is "CHOICE Area Scope of MDT". Conventionally, "CHOICE Area Scope of MDT" enables only the setting in the cell or in a tracking area.

A new beam setting may be added to "CHOICE Area Scope of MDT". The TRP setting may be added thereto. For example, information indicating whether the MDT for each beam is performed or information indicating whether the MDT for each TRP is performed can be set. Moreover, an identifier of a beam to be set in the MDT or an identifier of a TRP to be set in the MDT may be set.

Consequently, the CN can cause the gNB to execute the MDT for each beam or for each TRP.

The CN may set, for example, a signal for measuring the received power for each beam, a predefined condition, and a threshold. The information in the MDT configuration in the "Trace Start" message includes setting information on, for example, a measurement signal. The setting information on, for example, the measurement signal is "CHOICE MDT Mode". The settings of the signal for measuring the received power for each beam, the predefined condition, and the threshold may be newly added. For example, information indicating which signal is measured, information indicating a predefined condition for recording a measurement result of the received power in a log, or information indicating a threshold can be set as a signal for measuring the received power for each beam.

Consequently, the CN can set, to the gNB, which signal is measured and based on which condition the log is obtained in the MDT for each beam or for each TRP.

Ninth Embodiment

In the LTE channel coding, a data block to be channel coded, that is, a transport block is divided into code blocks of a certain size or less that is predefined in a standard. Then, the coding is performed for each of the code blocks. It is expected in the NR that the broadening of use frequency band increases the size of the transport block and as a result, increases the number of code blocks.

In the LTE channel coding, a CRC bit is provided for each of the code blocks and for the whole transport block. In the Ack/Nack feedback of the LTE, a receiver transmits Nack to a transmitter when even one of the code blocks in the received transport block has a CRC error. The transmitter retransmits the whole transport block to the receiver. Thus, simultaneous retransmission of the code blocks received with CRC=OK wastes communication.

In the NR, 3GPP R1-1609744 (hereinafter referred to as "Reference 9") proposes that the receiver should feed back the number of the code block that cannot be accurately decoded and the transmitter should perform HARQ retransmission of only the code block that has been fed back to perform efficient HARQ retransmission. Reference 9 also proposes that the gNB should set, to each UE, the number of bits in the feedback semi-statically via a control signaling, or dynamically according to the transport block size via a control signaling.

Further in the NR, 3GPP R1-1612072 (hereinafter referred to as "Reference 10") proposes bundling or grouping code blocks by a predefined number to save the number of bits in the feedback from the receiver to the transmitter, and proposes that the receiver should feed back the bundling number of the code blocks including the code block that cannot be accurately decoded. Reference 10 also proposes that the gNB should determine the predefined number.

However, Reference 10 fails to disclose details on determining the number of code blocks per bundling in feeding back the bundling number of the code blocks.

When a specific symbol has a reception error, the number of code blocks to be fed back is two or more, or the number of bundles of the code blocks is two or more. Thus, a problem of increase in the number of feedbacks occurs. Examples of the reception error in the specific symbol include a URLLC interrupt.

FIG. 29 illustrates reception errors in code blocks due to the URLLC interrupt. In FIG. 29, one transport block is transmitted in one subframe. The transport block is divided into code blocks (hereinafter may be referred to as "CBs") #1 to #19. The code blocks are mapped from the first symbol in the one subframe in order.

As illustrated in FIG. 29, the CBs to be mapped to each symbol vary among the symbols. For example, if a URLLC interrupt occurs in the fourth symbol, the original CBs #9 and #10 cannot be transmitted at all, and the CB #11 can be transmitted only partially as illustrated in FIG. 29. Here, the total three CBs of the CB #9 to the CB #11 have reception errors. On the other hand, since the total four CBs of the CB #11 to the CB #14 are mapped to the fifth symbol, the four CBs will have reception errors if a URLLC interrupt occurs in the fifth symbol. The number of CBs per bundling is constant according to the conventional method. Thus, it is necessary to feed back a plurality of bundling numbers to the feedback of the reception errors in the CBs caused by the URLLC interrupt. This creates a problem of increase in the number of bits required for the feedback.

The ninth embodiment will disclose a method for solving such a problem.

The maximum number of code blocks per code block group (may be hereinafter referred to as "CBG") may be determined when code blocks in a transport block are grouped. The number of CBGs may be determined using the maximum number of code blocks per CBG. For example, dividing the number of code blocks by the maximum number of code blocks per CBG and rounding up decimal places may give a value indicating the number of CBGs.

Thus, in the feedback on the CBGs from the receiver to the transmitter, the number of times code blocks that have been accurately received (the reception result shows OK) are wastefully retransmitted can be reduced to lower than or equal to a certain value.

The HARQ feedback according to the ninth embodiment differs from the ARQ in the RLC in grouping the code blocks with the reception errors and feeding back the result to the transmitter.

How to allocate the number of code blocks to each CBG may be, for example, to group the code blocks into a CBG with the maximum number of code blocks and a CBG with the remaining number of code blocks. The CBG with the remaining number of code blocks may include the first code block or the last code block. Including the first code block in the CBG with the remaining number of code blocks enables reduction in the number of code blocks to be allocated to a CBG including the MAC header placed in the beginning of a transport block, and reception of such a CBG with a fewer number of retransmissions. Consequently, the receiver can obtain the MAC header earlier.

As a specific example, assuming that the number of code blocks is 50 and the maximum number of code blocks per CBG is 8, the number of CBGs is 7. How to allocate the number of code blocks to each CBG is to allocate 8 code blocks to 6 CBGs and allocate 2 code blocks to the remaining one CBG.

For another example of the allocation, the number of code blocks may be evenly allocated to each CBG. The CBG with the maximum number of code blocks may be placed in the beginning or at the end. When the number of code blocks are evenly allocated in the aforementioned specific example, 1 CBG consists of 8 code blocks and the remaining 6 CBGs each consist of 7 code blocks. This can prevent a bias between the CBGs in the number of times code blocks are wastefully retransmitted.

Another method for grouping the code blocks may include determining the number of CBGs. The maximum number of code blocks per CBG may be determined using the number of CBGs. For example, dividing the number of code blocks by the number of CBGs and rounding up decimal places may give a value indicating the maximum number of code blocks per CBG. Consequently, the number of bits required for the feedback per CBG can be constant.

The code blocks may be allocated similarly as the grouping of the code blocks for which the maximum number of code blocks per CBG has been determined, in grouping the code blocks for which the number of CBGs has been determined. For example, the code blocks may be grouped into a CBG with the maximum number of code blocks and a CBG with the remaining number of code blocks. The CBG with the remaining number of code blocks may include the first code block or the last code block. When the CBG with the remaining number of code blocks includes the first code block, the receiver can obtain the MAC header earlier.

As a specific example, assuming that the number of code blocks is 50 and the number of CBGs is 8, the maximum number of code blocks per CBG is 7. How to allocate the number of code blocks to each CBG is to allocate 7 code blocks to 7 CBGs and allocate 1 code block to the remaining one CBG.

For another example of the allocation, the number of code blocks may be evenly allocated to each CBG. When the number of code blocks are evenly allocated in the aforementioned specific example, 2 CBGs each consist of 7 code blocks and the remaining 6 CBGs each consist of 6 code blocks. This can prevent a bias between the CBGs in the number of times code blocks are wastefully retransmitted.

In grouping of code blocks, the number of CBGs or the maximum number of code blocks per CBG may have a default value. The positioning of the CBGs may have a default setting. For example, the default value of the number of CBGs may be 1. As an alternative example, the maximum number of code blocks per CBG may be identical to the number of code blocks in a transport block. Alternatively, the CBG with the maximum number of code blocks or with the minimum number of code blocks may be placed in the beginning as an example default setting for positioning the CBGs.

A method for grouping the CBGs may be determined in a standard. For example, a fixed value may be used. As an example of the fixed value, the number of CBGs may be fixed to, for example, 16. As an alternative example of determining the method in a standard, the method may be determined using the maximum number of code blocks that the UE can transmit or receive. The maximum transport block size that the UE can transmit or receive, or the UE category may be used.

A propagation environment may be used as an alternative example of determining the method in a standard. The propagation environment may be indicated by the CQI/CSI. For example, when the CQI/CSI is superior, the maximum number of code blocks per CBG may be reduced. This can reduce the overhead incurred by retransmission of code blocks that have accurately been received among the CBGs having reception errors when the CBGs are fed back.

A reception error rate may be used as an alternative example of determining the method in a standard. For example, when the reception error rate is high, the CBGs having reception errors can be fed back to the transmitter with less number of bits by increasing the maximum number of code blocks per CBG.

The gNB may determine the method for grouping the CBGs. Information necessary for the gNB to group the CBGs may be the same as that when the method is determined in a standard.

Alternatively, the gNB may determine the method using the number of bits that the gNB can use to perform the HARQ feedback for the UE.

As an example of using the number of bits in the HARQ feedback, the number of bits may be identical to the number of CBGs, and the gNB may feed back information on Ack/Nack for each CBG. Assume a case where, for example, the number of bits is 4, 1 is associated with a CBG having a reception error, and 0 is associated with a CBG without a reception error. In the case where a code block belonging to a CBG #3 has a reception error, the bit string that the gNB feeds back to the UE may be "0010". For another example, combinations of the CBGs having reception errors may be associated with values indicated by the bit string. For example, a value 0 may be associated with the absence of a reception error. Values 1, 2, 3, and 4 may be associated with cases where only a CBG #1, only a CBG #2, only the CBG #3, and only a CBG #4 have reception errors, respectively. A value 5 may be associated with a case where the CBGs #1 and #2 have reception errors. A value 6 may be associated with a case where the CBGs #1 and #3 have reception errors. A value 11 may be associated with a case where the CBGs #1, #2, and #3 have reception errors. A value 12 may be associated with a case where the CBGs #1, #2, and #4 have reception errors. A value 15 may be associated with a case where all the four CBGs have reception errors.

The UE may find a code block belonging to a CBG that cannot be received, using the number of bits in the HARQ feedback and the values of the bit string. Since the gNB need not notify the UE of the information necessary for grouping the CBGs in the uplink communication, the amount of signaling can be reduced. Even when the number of CBGs including the code blocks having reception errors increases, the number of bits to be fed back to the UE can be constant without any increase.

The method for grouping the CBGs may be determined using the number of bits that the UE can use to perform the HARQ feedback for the gNB. For example, the method may be determined using the number of bits that the UE can use to perform the HARQ feedback as previously described. Consequently, the same advantages can be produced in the downlink communication.

The following (1) to (5) will be disclosed as specific examples of a means for the gNB to notify the UE of the method for grouping the CBGs:

(1) broadcasting to the UEs being served thereby;
(2) the control signaling for each UE, for example, the RRC-dedicated signaling;
(3) the MAC control information;
(4) the L1/L2 signaling; and
(5) combinations of (1) to (4) above.

Since application of (1) enables simultaneous notification of the method for grouping the CBGs to a plurality of UEs, the amount of signaling can be reduced.

Since application of (2) allows the semi-static notification to each UE, the setting appropriate for a UE-dedicated state can be made with less signaling.

With application of (3), for example, the HARQ retransmission control enables the notification to the UE with high reliability, according to short-term variations in the propagation environment.

Application of (4) enables the dynamic notification even in the absence of user data to be transmitted from the gNB to the UE.

The maximum number of code blocks per CBG may be used as a detail to be notified from the gNB to the UE in the method for grouping the CBGs. Alternatively, the number of CBGs may be used. An identifier indicating a method for allocating code blocks to the CBGs may be notified together with the maximum number of code blocks per CBG or the number of CBGs. The identifier may indicate, for example, whether the CBGs are grouped into the CBG with the maximum number of code blocks and the CBG with the remaining number of code blocks, whether the number of code blocks is evenly allocated to each CBG, and whether the CBG with the maximum number of code blocks is placed in the beginning or at the end in each of the previous two cases.

With regard to the number of bits to be used in the HARQ feedback, Ack may be represented by 1 bit, and Nack may be represented by a plurality of bits. Information on the CBGs having reception errors may be represented by using the plurality of bits. Consequently, the bits remaining in transmitting the Ack can carry the other information.

The UE may transmit, to the gNB, the HARQ feedback in response to the downlink communication using, for example, the PUCCH. With regard to the PUCCH, the UE may transmit the HARQ feedback using, for example, physical resources in a frequency direction. Alternatively, the UE may transmit the feedback using, for example, the MAC control information. Since application of the MAC control information enables multi-level modulation, the transmission is possible with less physical resources.

When the MAC control information is used, the gNB may notify the UE of a grant for transmitting the feedback. Alternatively, the UE may transmit the feedback using, for example, a new channel. When transmitting the MAC control information, the UE may perform the HARQ feedback as when transmitting the uplink user data.

The UE may transmit, to the gNB, the HARQ feedback in response to the uplink communication using, for example, the L1/L2 signaling. Alternatively, the structure of the Enhanced Physical Downlink Control Channel (EPDCCH) may be used. Alternatively, information on the CBG with NG may be placed somewhere in the same subframe. Alternatively, the MAC control information may be used. Since application of the MAC control information enables multi-level modulation, information with more bits can be fed back. When transmitting the MAC control information, the UE may perform the HARQ feedback similarly as when transmitting the downlink user data. Alternatively, the gNB may transmit the HARQ feedback to the UE using, for example, the PHICH.

Similarly as the first embodiment, the gNB may include the feedback information in response to the uplink communication in an uplink grant for the UE. Alternatively, the gNB may not notify the UE of Ack feedback. The UE may regard the absence of receiving the HARQ feedback on the uplink data for a predefined time as accurate reception of the uplink data by the gNB. Alternatively, the method for including the feedback information in the uplink grant may be used in combination with the method for preventing notification of Ack feedback to the UE. Consequently, the UE does not have to receive the grant from the gNB even when finishing transmitting the uplink user data, and can know that the gNB has successfully received the last uplink user data. Since the gNB need not notify the UE of the HARQ feedback information in response to the last uplink user data, the communication resources are saved.

Alternatively, a plurality of methods for the HARQ feedback in each of the downlink communication and the uplink communication may be used in combination. For example, in the HARQ feedback in the downlink communication, the UE may notify the gNB of the presence or absence of a reception error using the PUCCH and of the CBG number to which the code block including the reception error belongs, using the MAC control information. Consequently, the reliability of the HARQ feedback can be increased.

Information on the CBG including the code block having the reception error may be transmitted as a detail of the HARQ feedback according to the ninth embodiment. Examples of the information may include the CBG number and the number of CBGs. Alternatively, the information may be transmitted as, for example, a bitmap indicating whether the CBG can be received or indicating an error. Assume the bitmap where, for example, the number of CBGs is 4, 1 is associated with a CBG with a reception error, and 0 is associated with a CBG without a reception error. When a code block belonging to the CBG #3 has a reception error, the bit string that the gNB will feed back to the UE may be "0010".

In grouping the CBGs according to the ninth embodiment, there may be a code block belonging to a plurality of CBGs. For example, code blocks to be mapped to each symbol may be grouped into one CBG. Consequently, when, for example, communication with higher priority, e.g., communication requiring the URLLC service interrupts a given symbol, the receiver feeds back information on the CBG corresponding to the symbol to the transmitter, so that the transmitter can retransmit the code blocks mapped to the symbol.

The code blocks to be mapped to a plurality of symbols may be grouped into one CBG. Consequently, the number of bits required for the HARQ feedback can be reduced to small.

The associations between code blocks and CBGs in the grouping may be predefined in a standard. Alternatively, the gNB may notify the UE of the associations. Information on the associations may be, for example, the numbers of the first code block and the last code block belonging to each of the CBGs. The notification may be semi-statically made via the RRC-dedicated signaling.

The receiver may notify the transmitter of a reception error of a code block belonging to a plurality of CBGs, as a CBG including another code block having a reception error among the plurality of CBGs. Alternatively, the receiver may notify the transmitter of the reception error as a CBG with a preceding number or as a CBG with a subsequent number among the plurality of CBGs. The notification of the reception error as a CBG including another code block having a reception error can reduce the number of CBGs to be fed back.

Alternatively, the receiver may notify the transmitter of a symbol number including the code block having a reception error. Since the gNB need not notify the UE of the associations between code blocks and CBGs in advance, the amount of signaling can be reduced. A plurality of symbols may be integrated into one group, and the receiver may feed back an identifier indicating the group to the transmitter.

FIG. 30 illustrates associations between code blocks and a plurality of CBGs when the code blocks belong to the plurality of CBGs. FIG. 30 illustrates a case where the code blocks to be mapped to one symbol are grouped into one CBG in the downlink communication.

Since a code block #h (CB #h), a code block #(h+1) (CB #(h+1)), and a code block #(k−1) (CB #(k−1)) that belong to the symbol #2, that is, the CBG #2 have reception errors in FIG. 30, the UE performs, on the gNB, HARQ feedback to indicate that the CBG #2 has the reception errors. The gNB retransmits, to the UE, the code block #h (CB #h) to the code block #k (CB #k) using the HARQ feedback.

Notification of information on consecutive code blocks (may be hereinafter referred to as a "code block cluster") including a code block having a reception error may replace the grouping of CBGs, according to the ninth embodiment. The code block cluster may include a code block where the reception result has been OK.

The receiver finds the code block cluster from a reception result of each code block. The receiver includes information on the code block cluster in the HARQ feedback information to notify the transmitter of the information. The transmitter retransmits, to the receiver, code blocks belonging to the code block cluster.

The information on the code block cluster may be information indicating the first code block or information indicating the last code block. Alternatively, the information on the code block cluster may be information indicating the number of code blocks. Alternatively, at least two of these may be used in combination.

The information indicating the first code block may be, for example, the first code block number, or a value obtained by dividing the code block number by a predetermined constant. The value may be obtained by truncating the decimal places. The constant may be defined in a standard, or notified from the gNB to the UE via the RRC-dedicated signaling in advance. Alternatively, the receiver may determine the constant and notify it to the transmitter. The receiver may dynamically make the notification. The dynamic notification may be made, for example, using the MAC control information or via the L1/L2 signaling. Consequently, the receiver can transmit the HARQ feedback to the transmitter with less number of bits, according to a state in which the reception error occurs. The gNB may dynamically notify the UE of the constant.

Application of the value obtained by dividing the first code block number by the constant can reduce the number of bits for the HARQ feedback. The information indicating the last code block may be handled similarly as the information indicating the first code block.

The information indicating the number of code blocks may be handled similarly as the information indicating the first code block. Alternatively, the number of code blocks may be rounded to a value of a power of a predefined integer, and a value of the exponent of the power may be used. The value of the power is preferably larger than or equal to the number of code blocks. The integer may be defined in a standard, or notified from the gNB to the UE via the RRC-dedicated signaling in advance. Alternatively, the receiver may determine the integer and notify it to the transmitter. The receiver may dynamically make the notification. The dynamic notification may be made, for example, using the MAC control information or via the L1/L2 signaling. Consequently, the receiver can transmit the HARQ feedback to the transmitter with less number of bits, according to a state in which the reception error occurs. The gNB may dynamically notify the UE of the integer.

FIG. 31 illustrates a relationship between a code block cluster and consecutive code blocks including reception errors. In FIG. 31, a code block #2 (CB #2), and a code block #4 (CB #4) to a code block #6 (CB #6) have the reception errors.

In FIG. 31, assuming a code block #3 (CB #3) where the reception result has been OK as having a reception error, the receiver notifies the transmitter that the code block #2 (CB #2) to the code block #6 (CB #6) have the reception errors. In the notification, the receiver may notify the transmitter of identifiers of the code block #2 (CB #2) and the code block #6 (CB #6), or information indicating the identifier of the code block #2 (CB #2) and the number of reception errors. In FIG. 31, the number of reception errors to be notified from the receiver to the transmitter is 5.

The transmitter obtains information on the code blocks having the reception errors, from the notification. The transmitter retransmits, to the receiver, the code block #2 (CB #2) to the code block #6 (CB #6).

Notification of information on the code block cluster from the receiver to the transmitter can reduce, to small, information on the HARQ feedback to be notified from the receiver to the transmitter when the code blocks having the reception errors are consecutive or slightly apart, particularly when the code blocks having the reception errors straddle a boundary of CBGs.

The CBGs may replace the code blocks in notification of the information on the code block cluster according to the ninth embodiment. In the HARQ feedback from the receiver to the transmitter, for example, the first CBG number including the reception error and the number of CBGs may be used. Consequently, information on the HARQ feedback to be notified from the receiver to the transmitter can be further reduced to small.

A predefined pattern may be used for the feedback from the receiver to the transmitter, according to the ninth embodiment. The predefined pattern may be, for example, a pattern in which the first quarter and the last quarter of the whole code blocks in a transport block have reception errors. The predefined pattern may be, for example, a pattern in which the first quarter to the last quarter of the code blocks have reception errors, or a pattern in which the first one-eighth and the last one-eighth of the code blocks have reception errors.

The predefined pattern may not be symmetrical. The predefined pattern may be a pattern in which among the whole code blocks in a transport block, for example, the first 5 code blocks have reception errors or the first 3 code blocks and the fifth and the seventh code blocks from the beginning have reception errors.

Alternatively, the predefined pattern may be a pattern corresponding to, in a physical channel, a symbol number of each symbol to which a code block having a reception error is mapped.

A list of predefined patterns may be defined in a standard, or notified from the gNB to the UE in advance. The list of the predefined patterns may include a pattern of Ack, that is, a pattern in which no code block has a reception error.

The list of the predefined patterns may include a pattern in which no code block has a reception error. The gNB and the UE may use the pattern in notification of accurate receipt of all the code blocks.

The receiver determines a pattern for feeding back to the transmitter, using a reception result of each code block. In the list of the predefined patterns, the pattern preferably includes all the code blocks having reception errors. The receiver notifies the transmitter of an identifier indicating the pattern. The transmitter retransmits, to the receiver, a code block having the reception error in the pattern indicated by the identifier.

Figure 32:
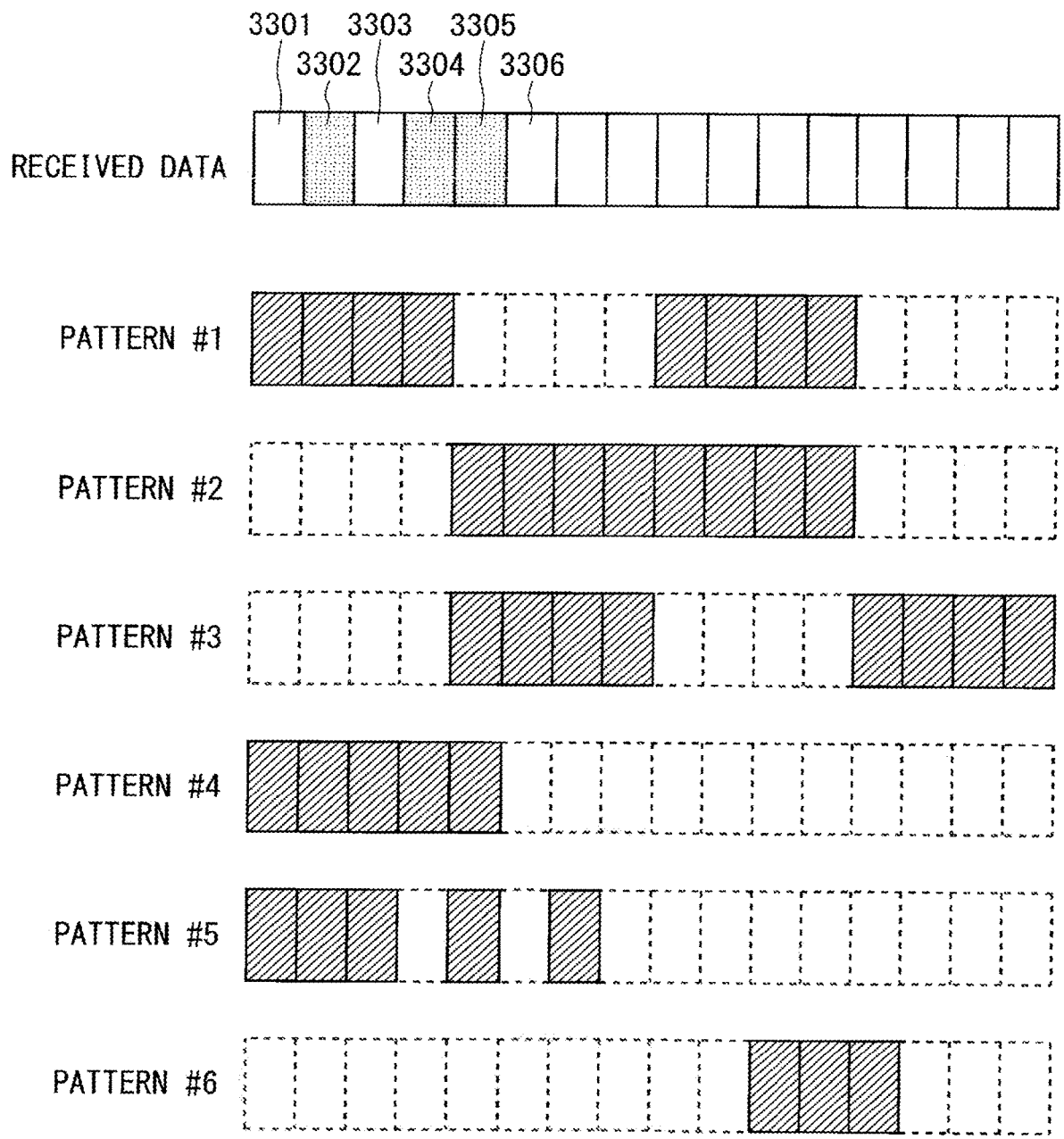
FIG. 32 illustrates patterns of code blocks including reception errors.

FIG. 32 illustrates patterns of code blocks including reception errors. FIG. 32 illustrates a case where received data includes reception errors 3302, 3304, and 3305. In FIG. 32, portions excluding the reception errors 3302, 3304, and 3305, for example, portions denoted by references 3301, 3303, and 3306 are portions that have successfully been received without any reception error.

Upon detection of the reception errors 3302, 3304, and 3305 as indicated in the received data in FIG. 32, the receiver feeds back an identifier indicating a pattern #4 to the transmitter. The transmitter retransmits, to the receiver, the code block #1 (CB #1) to the code block #5 (CB #5) according to the pattern #4.

Notification of information on the code block cluster from the receiver to the transmitter can reduce, to small, information on the HARQ feedback to be notified from the receiver to the transmitter, even when the code blocks having the reception errors are distributed in a transport block.

The gNB may switch between levels of the HARQ feedback, according to the ninth embodiment. Examples of the HARQ levels may include feedback for each code block, feedback for each CBG, and feedback on the whole transport block. The feedback for each CBG may have a plurality of levels. The feedback for each CBG may have, for example, a level of feedback to be performed by CBGs with less number of code blocks per CBG, and a level of feedback to be performed by CBGs with larger number of code blocks per CBG. With regard to the number of code blocks in each level, the number of code blocks included in a CBG to be used in a given level may or may not be an integer multiple of the number of code blocks included in a CBG to be used in another level. In the given level, a plurality of CBGs may or may not include the same code block.

The gNB notifies the UE of the feedback levels. The details to be notified may be details of the feedback levels, for example, the number of code blocks per CBG or identifiers of the levels. A list of the feedback levels may be defined in a standard, or notified from the gNB to the UE in advance so that the identifiers are used. The notification may be made via, for example, the RRC signaling.

The following (1) to (5) will be disclosed as a method for the gNB to notify the HARQ feedback level;
(1) broadcasting to the UEs being served thereby;
(2) the control signaling for each UE, for example, the RRC-dedicated signaling for each UE;
(3) the MAC control information;
(4) the L1/L2 signaling; and
(5) combinations of (1) to (4) above.

Since application of (1) enables simultaneous notification to a plurality of UEs, the amount of signaling can be reduced.

Application of (2) enables semi-static setting to each UE. For example, when a UE using the URLLC service is connected under the gNB, the HARQ feedback level can be switched for a UE using the eMBB service from a feedback level of the whole transport block to a feedback level for each symbol. Consequently, when the UE using the URLLC service interrupts a symbol to be used by the UE using the eMBB service, the UE can feed back the symbol number to the gNB, and the transmission efficiency for the UE using the eMBB service can be increased.

With application of (3), the level can be switched according to dynamic changes in a propagation environment, etc. with high reliability. Since application of the MAC control information enables multi-level modulation, the number of bits to be used for the notification can be reduced to small.

Application of (4) enables prompt switching of the level corresponding to dynamic changes in a propagation environment, etc. even when there is no user data.

In grouping the CBGs according to the ninth embodiment, a series of CBG numbers may be allocated to a plurality of HARQ feedback levels. For example, after the CBG numbers configured with the predefined maximum number of code blocks are allocated to the whole code blocks in a transport block, CBG numbers configured with the maximum number of code blocks larger than the predefined maximum number of code blocks may be allocated thereto.

The receiver may determine which CBG number allocated to which level is used, according to the distribution of code blocks having the reception errors. The receiver may feed back, to the transmitter, the CBG number determined by the receiver.

For example, in a transport block consisting of 20 code blocks, the gNB and the UE may allocate, using a CBG whose maximum number of code blocks is 3, the CBG #1 to the code blocks #1 to #3 and the CBG #2 to the code blocks #4 to #6, similarly to the following code blocks, and finally allocate the CBG #6 to the code blocks #15 to #18, and the CBG #7 to the code blocks #19 and #20. Alternatively, the gNB and the UE may allocate, using a CBG whose maximum number of code blocks is 5, the CBG #7 to the code blocks #1 to #5 and the CBG #8 to the code blocks #6 to #10, similarly to the following code blocks, and finally allocate the CBG #10 to the code blocks #16 to #20.

When the receiver have reception errors in the code blocks #3 and #4 in the example, the receiver may feed back to the transmitter that the CBG #7 has the reception errors.

Since the gNB need not notify the UE of the HARQ feedback level, the amount of signaling from the gNB to the UE can be reduced.

In the HARQ feedback according to the ninth embodiment, the receiver may feed back, to the transmitter, information on the code block where the reception result has been OK. The receiver may feed back information on the CBG consisting of only the code blocks where the reception results have been OK. The receiver may include, in the feedback, an identifier indicating, as the feedback, that the reception result has been OK or indicating a reception error.

The receiver may determine which one of the feedbacks, i.e., indicating that the reception result has been OK or a reception error the receiver itself will perform, using the number of code blocks having the reception errors, information on the number of CBGs, or the number of bits required to feed back that the reception result has been OK or the reception error.

Consequently, the receiver can perform feedback to the transmitter with less number of bits, according to a reception result of a transport block.

The following (1) to (5) will be disclosed as information to be used by the gNB to determine the HARQ feedback level;
(1) a propagation environment, for example, the CQI/CSI;
(2) a load in the downlink communication, for example, buffer occupancy in the gNB;
(3) a load in the uplink communication, for example, buffer occupancy in the UE;
(4) information on the UE, for example, a UE category or a use service of the UE; and
(5) combinations of (1) to (4) above.

In (1), for example, when the CQI/CSI is superior, the level may be switched so that the maximum number of code blocks per CBG is increased. Consequently, the number of bits of the feedback for notifying Ack can be reduced.

In (2), for example, when the buffer occupancy in the gNB is larger, reduction in the maximum number of code blocks per CBG can reduce the overhead incurred by retransmission of the code block where the reception result has been OK in the feedback of the CBG having the reception error in the downlink communication. This can increase the transmission efficiency in the downlink communication.

In (3), the Buffer Status Report (BSR) to be notified from the UE to the gNB or another value may be used.

In (3), for example, when the buffer occupancy in the UE is larger, reduction in the maximum number of code blocks per CBG can reduce the overhead incurred by retransmission of the code block where the reception result has been OK in the feedback of the CBG having the reception error in the uplink communication. This can increase the transmission efficiency in the uplink communication.

In (4), for example, reduction in the maximum number of code blocks per CBG for the UE using the eMBB can reduce the overhead incurred by retransmission of the code block where the reception result has been OK in the feedback of the CBG having the reception error. This can increase the transmission efficiency of the UE using the eMBB.

The receiver may assume that all the code blocks have reception errors, using a predefined threshold, according to the ninth embodiment. The receiver may notify the transmitter that all the code blocks have reception errors. The transmitter may retransmit all the code blocks. The transmitter may exclude, from the retransmission, the code blocks that have already successfully been received. The code blocks that have already successfully been received may be obtained by the feedback from the receiver.

The predefined threshold may be determined in a standard, or notified from the gNB to the UE.

The threshold may be determined using the number of code blocks having reception errors, the number of CBGs including the code blocks having reception errors, or the number of bits that can be used for the HARQ feedback from the receiver. For example, when the number of bits is 2 and the code blocks having reception errors straddle the center of the transport block, the receiver may notify the transmitter of all the code blocks as reception errors. Consequently, the number of bits of the feedback for notifying the transmitter of the reception errors can be reduced.

The maximum number of times a CBG, a code block cluster, or a pattern of code blocks is retransmitted may be the same as the maximum number of HARQ retransmissions, according to the ninth embodiment. In other words, the retransmission according to the ninth embodiment may be assumed as the HARQ retransmission. Thus, the implementation of the gNB and the UE can be facilitated.

The receiver may discard and receive again the code block where the reception result has been OK, according to the ninth embodiment. The transmitter may retransmit the code block where the reception result in the receiver has been OK. The transmitter may retransmit the code block when the maximum number of HARQ retransmissions is exceeded.

Upon completion of a data unit of an upper layer, for example, an RLC layer, e.g., the RLC PDU, the receiver may transmit received data to the upper layer, according to the ninth embodiment. The received data may be data some of whose code blocks are accurately received in a transport block. This can reduce the latency in transmitting and receiving the data.

The receiver may obtain, from the transmitter, the size of the MAC header, and the size of the data unit of the upper layer in advance. Alternatively, the sizes may be determined in a standard.

The transmitter may add a parity check bit to each CBG, according to the ninth embodiment. The parity check bit may be, for example, the CRC. The parity check bit for each CBG and the parity check bit for the whole transport block may coexist.

The gNB may notify the UE of whether the parity check bit for each CBG is used. The notification may be made semi-statically via the RRC-dedicated signaling or dynamically via the L1/L2 signaling. Alternatively, whether the parity check bit for each CBG is used may be determined in a standard.

Figure 33:
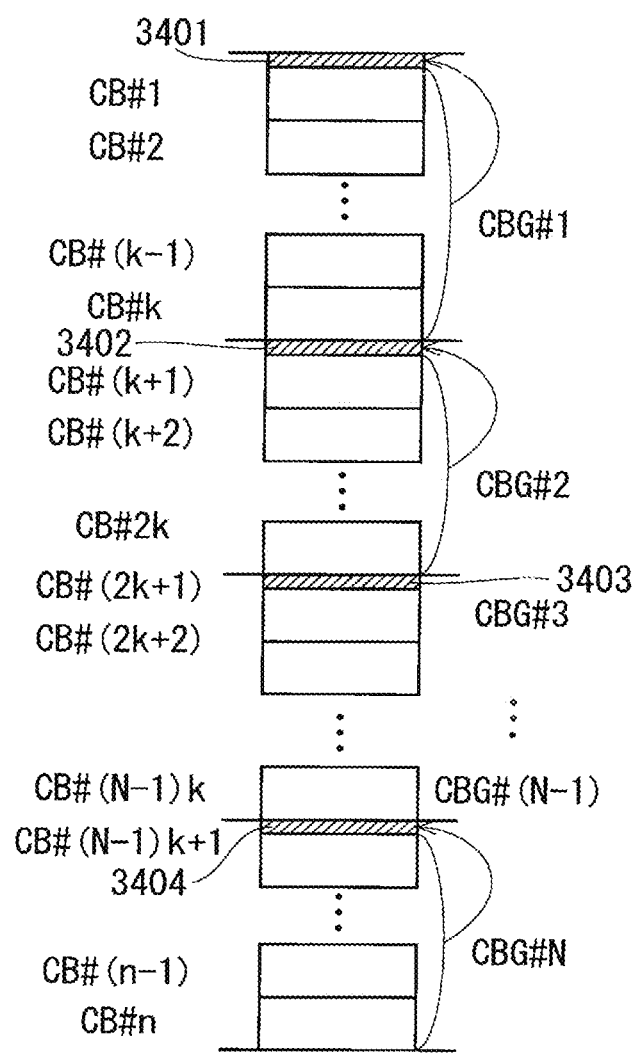
FIG. 33 illustrates the assignment of parity checks 3401 to 3404 to the respective CBGs.

FIG. 33 illustrates the assignment of parity checks 3401 to 3404 to the respective CBGs. In FIG. 33, the transmitter calculates a parity bit based on code blocks #1 to #k included in the CBG #1, and assigns the parity check 3401 to the code block #1 (CB #1). Similarly in the CBG #2 and the subsequent CBGs, the transmitter assigns the parity checks 3402, 3403, and 3404 to the code block #k+1 (CB #(k+1)), . . . the code block #2k+1 (CB #(2k+1)), . . . the code block #(N−1) k+1 (CB #((N−1) k+1)), respectively.

Application of the method can increase the reliability of the parity checks in the whole transport block.

Since the receiver can feed back information on the code blocks having the reception errors with less number of bits according to the ninth embodiment, the communication can be efficiently performed.

The embodiments and the modifications are merely illustrations of the present invention, and can be freely combined within the scope of the present invention. Any constituent elements of the embodiments and the modifications can be appropriately modified or omitted.

A subframe is an example time unit in communication in the fifth-generation base station communication system in the embodiments and the modifications. The example time unit may be the unit of scheduling. The process described per subframe may be performed per TTI, per slot, per sub-slot, or per mini-slot in the embodiments and the modifications.

While the invention has been described in detail, the foregoing description is in all aspects illustrative and not restrictive. It is therefore understood that numerous modifications and variations can be devised without departing from the scope of the invention.

DESCRIPTION OF REFERENCES

701 coverage of macro cell, 702 coverage of small cell, 703, 813 user equipment (UE), 801 downlink beam sweeping block, 802, 804, 806, 811 resources, 803 uplink beam sweeping block, 805 DL/UL data subframe, 812 beam, 901, 905, 909 subframe, 902, 906, 910 downlink control signal, 903, 907, 911 a piece of user data, 904, 908, 912 information on the next reception timing.

The invention claimed is:

1. A communication system comprising:
a base station comprising a processor and a memory device; and
a communication terminal, comprising a processor and a memory device, and configured to perform radio communication with the base station, wherein
the base station transmits resource information related to a physical uplink control channel allocated by a symbol, the resource information including first information about an orthogonal code and second information related to a symbol number to which the physical uplink control channel is allocated, the symbol number being different from the first information about the orthogonal code and indicating a position in time domain of a symbol to which the physical uplink control channel is allocated,
the base station transmits gap information related to a gap between reception of a downlink signal and transmission of the physical uplink control channel,
the communication terminal receives the resource information and the gap information,
the communication terminal receives, from the base station, downlink control information instructing the communication terminal to use a symbol position in time domain indicated by the symbol number to transmit the physical uplink control channel,
the communication terminal transmits the physical uplink control channel using the resource information and the gap information,
the communication terminal repeats the transmission of the physical uplink control channel in two or more consecutive slots, and
the communication terminal performs the transmission of the physical uplink control channel on a same symbol position in time domain indicated by the symbol number in each of the two or more consecutive slots.

2. A base station in a communication system comprising the base station and a communication terminal, wherein
the base station comprises a processor and a memory device,
the communication terminal comprises a processor and a memory device, and is configured to perform radio communication with the base station,
the base station transmits, to the communication terminal, resource information related to a physical uplink control channel allocated by a symbol, the resource information including first information about an orthogonal code and second information related to a symbol number to which the physical uplink control channel is allocated, the symbol number being different from the first information about the orthogonal code and indicating a position in time domain of a symbol to which the physical uplink control channel is allocated,
the base station transmits, to the communication terminal, gap information related to a gap between reception of a downlink signal and transmission of the physical uplink control channel,
the base station transmits, to the communication terminal, downlink control information instructing the communication terminal to use a symbol position in time domain indicated by the symbol number to transmit the physical uplink control channel,
the communication terminal repeats the transmission of the physical uplink control channel in two or more consecutive slots, and
the communication terminal performs the transmission of the physical uplink control channel on a same symbol position in time domain indicated by the symbol number in each of the two or more consecutive slots.

3. A communication terminal in a communication system comprising a base station and the communication terminal, wherein
the base station comprises a processor and a memory device,
the communication terminal comprises a processor and a memory device, and is configured to perform radio communication with the base station,
the communication terminal receives, from the base station, resource information related to a physical uplink control channel, the resource information including first information about an orthogonal code and second information related to a symbol number to which the physical uplink control channel is allocated, the symbol number being different from the first information about the orthogonal code and indicating a position in time domain of a symbol to which the physical uplink control channel is allocated, the communication terminal receives, from the base station, gap information related to a gap between reception of a downlink signal and transmission of the physical uplink control channel, the communication terminal receives, from the base station, downlink control information instructing the communication terminal to use a symbol position in time domain indicated by the symbol number to transmit the physical uplink control channel, the communication terminal transmits the physical uplink control channel using the resource information and the gap information, the communication terminal repeats the transmission of the physical uplink control channel in two or more consecutive slots, and the communication terminal performs the transmission of the physical uplink control channel on a same symbol position in time domain indicated by the symbol number in each of the two or more consecutive slots.

4. The communication system according to claim 1, wherein the communication terminal receives, from the base station, information on a period and an offset for uplink control information (UCI) transmitted in the physical uplink control channel.

5. The base station according to claim 2, wherein the base station transmits, to the communication terminal, information on a period and an offset for uplink control information (UCI) transmitted in the physical uplink control channel.

* * * * *